(12) United States Patent
Perlegos

(10) Patent No.: US 10,218,665 B2
(45) Date of Patent: Feb. 26, 2019

(54) SYSTEM RELATING TO 3D, 360 DEGREE OR SPHERICAL FOR REFERING TO AND/OR EMBEDDING POSTS, VIDEOS OR DIGITAL MEDIA WITHIN OTHER POSTS, VIDEOS, DIGITAL DATA OR DIGITAL MEDIA AND POSTS WITHIN ANYPART OF ANOTHER POSTS, VIDEOS, DIGITAL DATA OR DIGITAL MEDIA

(71) Applicant: Pixured, Inc., Zephyr Cove, NV (US)

(72) Inventor: Nick John Perlegos, Zephyr Cove, NV (US)

(73) Assignee: Pixured, Inc., Zephyr Cove, NV (US)

( * ) Notice: Subject to any disclaimer, the term of this patent is extended or adjusted under 35 U.S.C. 154(b) by 40 days.

(21) Appl. No.: 15/225,407

(22) Filed: Aug. 1, 2016

(65) Prior Publication Data

US 2017/0034112 A1 Feb. 2, 2017

Related U.S. Application Data

(60) Provisional application No. 62/282,396, filed on Jul. 30, 2015.

(51) Int. Cl.
*H04L 12/58* (2006.01)
*H04L 29/08* (2006.01)

(52) U.S. Cl.
CPC .............. *H04L 51/32* (2013.01); *H04L 51/10* (2013.01); *H04L 51/18* (2013.01); *H04L 67/02* (2013.01); *H04L 67/306* (2013.01)

(58) Field of Classification Search
CPC .. H04L 51/10; H04L 51/18; G06T 2201/0052
See application file for complete search history.

(56) References Cited

U.S. PATENT DOCUMENTS

2010/0048242 A1* 2/2010 Rhoads ............. G06F 17/30244
455/556.1

* cited by examiner

*Primary Examiner* — Ranodhi Serrao
(74) *Attorney, Agent, or Firm* — Wood, Phillips, Katz, Clark & Mortimer

(57) ABSTRACT

There is disclosed herein a system of managing posts for interacting with web based digital video. The system comprises a user interface application operating on one or more user devices which are operative to view web based digital video, the user interface application creating posts that refer to 3d, 360 degree, geocoded or spherical digital image and video. A database system stores user created posts. A programmed processing system is in operative communication with user devices and the database system for creating and managing programmed links between user created posts and one or more select locations in select web based digital video, wherein users interacting with the user interface application can access user created posts.

20 Claims, 35 Drawing Sheets

SYSTEM RELATING TO 3D, 360 DEGREE OR SPHERICAL FOR REFERING TO AND/OR EMBEDDING POSTS, VIDEOS OR DIGITAL MEDIA WITHIN OTHER POSTS, VIDEOS, DIGITAL DATA OR DIGITAL MEDIA AND POSTS WITHIN ANYPART OF ANOTHER POSTS, VIDEOS, DIGITAL DATA OR DIGITAL MEDIA

BACKGROUND OF THE INVENTION

The present inventions relates to a system for embedding the manipulation or addition of information, digital media and/or data relating to posts, videos, digital media, video spaced in a 3D or spherical environment. Users interacting with the disclosed system will be able to identify (locate), refer and/or embed information, digital media, and/or data (using the system or various APIs). People engage, discover, watch and share originally-created videos. Providing a forum for people to connect, inform, and inspire others across the globe and acts as a distribution platform for original content creators and advertisers large and small. With the greater social impact from various technologies, devices, software and influencers any person who chooses to share on the internet can share at anticipated and unanticipated levels. Trendy videos or post to go viral and to be seen around the world by millions and even billions of people in the matter minutes or days. New platforms must be created to support the growing demand of information and data, advertising within these platforms continues to grow as better more effective methods allow none intrusive and native ways for these platforms to grow.

The disclosed system allows for users to find meaningful information, photos or videos can be taken and shared from anywhere with information traveling faster and becoming more reliable. Users who take photos or videos with the said invention embark on a very unique experience, taking what a photo says (photo is a thousand words) or amazing videos whereby the meaning, the feelings, the experience of the past (the photo or video), and redefining how the photo associates with users supporting and producing additional meaning/value to users. Media makes it simpler for users to express themselves while sharing towards new means of communication. The disclosed system also makes use of videos, sound, links, objects, locations, proximity whereby embedding to posts or tags.

While there are many applications where the present invention could be implemented, this method would be used to create a platform that users and business can use while also providing additional resources that allow developers and advertisers to expand the use and implement development tools into their own technologies.

SUMMARY OF THE INVENTION

The system relates to computer implemented software and methods whereby embedding the manipulation or addition of information to digital media, posts and video, comprising of a method relating to a database system storing a plurality of digital media items each having associated data relating to features of the digital media item. The system can also make use of a social graph of users, posts, posts of other posts, objects, video and digital media.

The scope of the invention and disclosure is embedding and/or referencing posts within digital media where disclosure primarily refers to video. The disclosed invention may relate to connecting people within their lives and businesses with their customers, while enabling faster and easier communication between people, advertisers, developers and businesses. Where video may relate while not limiting to an electronic medium relating to the recording, storing, copying and/or broadcasting of moving visual images. The system may be referred to as a platform that embed posts within other posts, content (like images, news articles, links, videos, sounds, etc.) within other content, creating a dynamic search and social experience. A simple platform for anyone to use, connecting everything and anything, from people to businesses, places to things, traveling to food; showing the top trending to searched information. The system may also offer advertisements that are useful, relevant and natural without impacting user experience. Referrals will run alongside booking and product sales. Subscription will embody various levels of services that support business and services provided by business to people. In some embodiments services are defined as socially driven by users and data. The disclosed invention may include or be considered a network and platform that simplifies data by capturing relationships that are extremely complicated thru an easy to use interface where users can engage at any level of the social experience. For example the system enables users to create a post also known as post (posts comprise of text and/or content like photos, videos, links, audio, etc.) or posts another users post (post comprise of text and/or content like photos, videos, links, audio, etc.), or simply share the posts with followers and networks. The methods include implementing and/or create a dynamic search for objects, images, and words, while also establishing a strong community where users can contribute by embedding posts within posts, posts within any part of another post and content within content.

BRIEF DESCRIPTION OF THE DRAWINGS

Any references with the following drawings as well as additional embodiments thereof, with like references numerical refer to corresponding parts of figures.

DETAILED DESCRIPTION OF THE INVENTION

Figure 1:
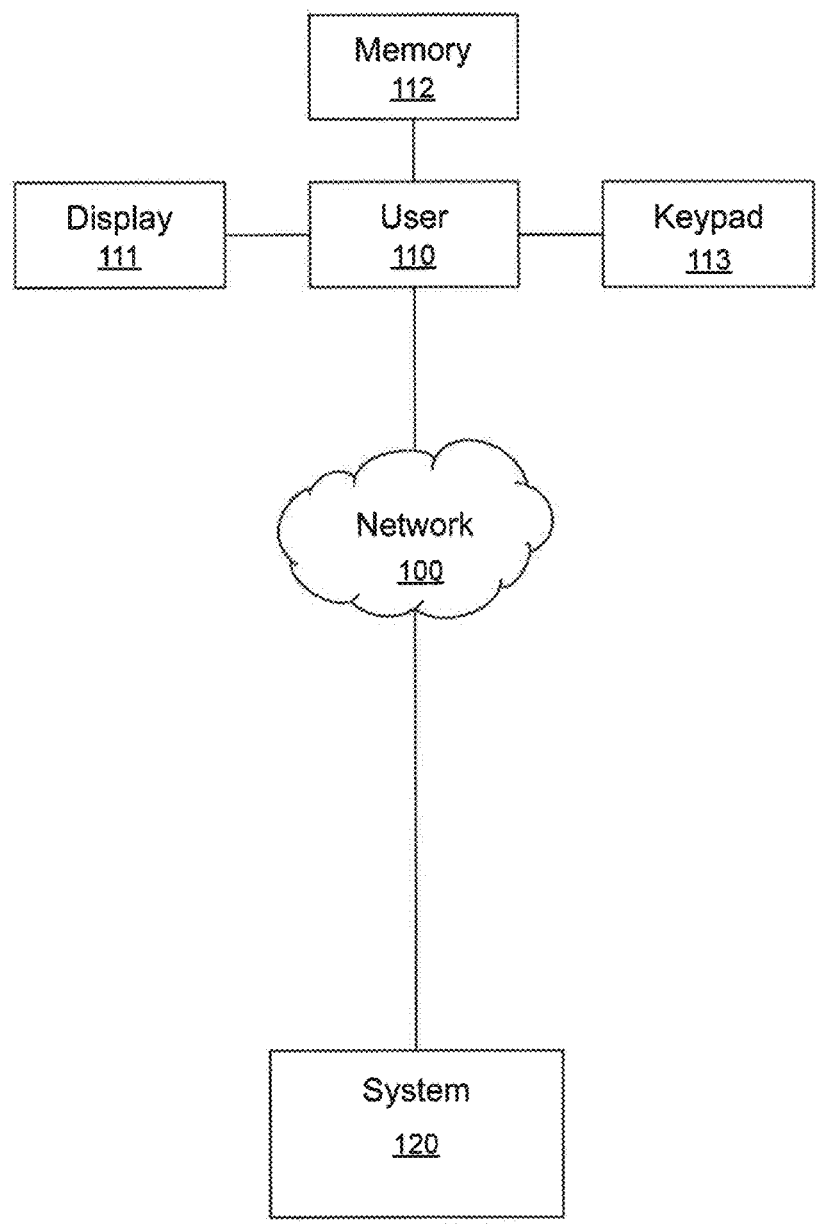
FIG. 1 illustrates a method for showing digital data to users and communication through networks.

The embodiments disclosed below is/are not intended to be exhaustive or limit the invention to the precise form disclosed in the following detailed description. Rather, the embodiment is chosen and described so that others skilled in the art may utilize its teachings.

This application describes a method for creating and/or embedding or referring one or more posts to one or more and/or combination of digital media (photo, albums, video), documents, posts, objects and users, shared with the system whereby further comprising of users where the method adds ease, convenience, and enhanced results (or relationships) to mobile devices, PC's, websites, social networks, third party platforms and databases. Methods may include adding, creating and/or embedding one or more posts and/or tags to a digital media may include methods automatic recognition software, user selection from a person/persons, or information derived by social networks, and not limiting to other methods that regions within digital media may be identified. In some embodiments a business or place where a user will be able (when applies) to have features that call, linking via email, messages, social networks, sharing, search and location. In some embodiments the invention is to help find things faster and in context. In some example a business can communicate with the disclosed invention or aided by other tools, effectively and consumers can find what they want, while also displaying a banner to their profile for upcoming events, sales, and product lines to be easily found. The method may further include deals or advertisement that users may take advantage of.

The system can automatically return clusters of embedded data that shows nearby data that is also embedded. The said embedded data could be used alongside with artificial intelligent to generate expected number of tags within each region of the associate image, video or digital media.

The system in some embodiments include methods that may also include calculating a rating, price, relationship and/or answer to a request with or without data and/or information from a social entity and/or objects. Additionally product, services, application, solution, digital media, data, and/or data may in some embodiments relate to traits/categories, proximity, habits, insight, ideal prospects, attributes, behaviors, topic, interest, keywords, remarketing, education, work place, origin, location targeting, demographics, adaptive profiling, participation, feeds, trends, postings, photos, blogs, topics, stories, advertisements, comments, current ratings, ownership, values are determined from the identified and/or selected points of one more users, groups, data and/or digital media. In some embodiments include timing components. The system and said method may implement distribution (Gaussian, logistic, lognormal, Weibull), likelihood functions, Bayesian inference and/or timing (decay) to calculating and/or determine a rating, machine learning, price and/or answer based on multiple variables aided by social ranking. In some embodiments a combinations of and multi-deviations of implemented distribution (Gaussian, logistic, lognormal, Weibull), likelihood functions, Bayesian inference and/or timing. Other algorithms also include Birch, k-mean or similar. In some embodiments the system may also use SVM (support vector machine) that include various learning models and/or algorithms that analyze data and recognize patterns that are commonly uses for regression analysis. Other examples include approaches like node wise similarities analysis, pattern based approaches additionally the value and/or generated distributions or values (together with) variations and width including providing simplified objects or values. In some embodiments include using calculated and/or mathematical techniques to analyze and/or display variables, digital media, data and information. Social networks provide a number of ways to analyze social ranking whereby the said method enlists code to perform operations and analysis while also data relating to values, ranking and scores. The system may include embodiments that calculate the probability that a user or where the user would like and/or relate to and may be within one or more standard deviation and/or deviations (may comprise to include a mean) which may include products, services, applications, solutions, digital media, data, digital media data and/or data.

The system that includes search is not limited to photos or videos or any user input and past interaction with the disclosed invention could be used in search query through a communication network to locate and present the most accurate information to users on their user devices.

If available location services of an area, this could be a static or a live location of an area, features may connect with many other popular features like internet based maps to provide mapping of the area. Users may be presented with deals, offers, advertisements, and additional information. These features may also be extended through the communication network to the user devices, with the addition of other applications and platforms. Users may edit, copy, share, communicate, or change one or more items made available to the said user. In some embodiments, the effects on the network and collected data, may be defined as a user profile to show the changes and updates. Additionally updating data throughout our network for viable data based regarding large amounts of data, values and weights; efficiency throughout our network, where distant social connection may take longer to update than adjacent social connections or nearby social web connections, including advertisements and deals friends help friends (or followers help followers) receives deal and/or save. Business may offer features that can provide and link to the storefront page, or any other ecommerce site that the business is associated with. User, businesses and entities may provide objects to sell while also searching a database of items the business sells, while also showing items that are localized and are sold by a particular seller, providing a link or location where users may find out more or buy products. For example a company advertises a product, if it is something a user can buy a user can link a user to somewhere it can be bought, whether or not being on a social network site, online retailer, or any other storefront whereby being made available. If it is a place we can find out how to get there, while also viewing data and other information that would be associated with digital media. Using an example of a restaurant, a user may be connected through other social platforms that offer reservations, rating and reviews, information, order, ability to takeout, while also finding more information and also providing addition services that enhance users. From restaurants users will be able to view menu's or food, various posts of food served, storing information and provide rating for those seeking the information (query) who are within your network and/or who are not within your network whereby third parties can embed within othering their own services. With food users can search for restaurants that serve food that looks appealing, while also showing images posted that are listed with greater value within a user network and presenting any relevant information not in a user network. Features in the said invention may be presented to users surfing the web, using applications or viewing digital media where there is no social connections.

In any of the figures or language relating to the system or method or geography, or variations of design do not limit the said invention. Users will be able to favorite associated regions in digital media and photos while also allowing users to share these favorites. Users will be able to comment on associated regions and keep favorites privately or socially. The said invention allows users to manipulate photos, adding various filters or making adjustments to contrast, brightness, saturations, hue, etc. in some embodiments users are connected with the ability to associate regions digital media of another user. With the said inventions users will be able create profiles that may be searchable with other platforms.

Generally relating to video (from capturing, recording, processing, storing, and transmitting a sequence of still images representing scenes in motion additionally with sound effects and dialogue recorded) may be broken down into components. One or more components of still images and/or sound (various processes sound wave).

Hashtags could also be added to photos, videos or posts that contain photos, said hashtag would allow people to pick up trending digital media in social web, throughout the web and communication network. Hashtags could be added automatically from the recognized areas while also have a list of preset hashtags that the user could select (these has posts could be created automatically from the points).

Embodiments may include equations, algorithms, logic and software, the said invention could also license and/or use additional technology, equation, algorithms, and software. The said invention would in some embodiments automatically or have one or more users manually input data for associations or allocations. Identifications made automatically of one or more association from digital media or search queries are performed within a server system that has one or more processors and memory storage. The server system can be broken up and processes data with a plurality of processor and memory while also running in the foreground or background. The disclosed server system can receive and make the associations automatically and identify while also providing data available to a user.

On a user device some embodiments may include buttons or features that may link the viewing users with additional photos, data, digital media of a particular user, users, business, place, object, or relating and or ranked data and content; for example user selects an identification of a another user where one or more features are made available, here user can select a feature to view photos associated with user. When relating to other application a user could be searching for an article of clothing, where from the digital media for a user taken photo or viewing a web page, a user features may include "where to buy" the article of clothing, photos of the article of clothing that have been taken, or from an online store a photo could do more than just showing the user a picture. Containing photos or videos could also be organized by association, for example if a user adds a certain association to the said users favorites list, then any photo with that same association has an importance to a user. That may create a more automated feed and more in the context search results.

Tags, retags, posts of another post and posts are treated the same of the disclosed system but in the front-end whereby dealing with user interface. In some embodiment as used herein, the system includes objects or entities generally refer to one or more local business or place, company, organization or institution, brand, product artist, professional & public figure, entertainment cause & community. the system also includes local businesses and places that may defined by, categorized by and/or relate to one or more (or combination of) but not limited to airport, arts, attractions, automotive, bank, bar, book store, business services, church, club, community, concert venue, doctor, education, entertainment, event planning & services, financial services, food, government, grocery, health, medicine & pharmacy, hospital clinic, hotels, landmarks, lawyer, library, movie theater, museum & art gallery, nightlife, outdoor & sporting goods, pet services, professional services, public places, real estate, religious organization, restaurants, schools, shopping & retail, spas, beauty & personal care, sport venue, sports, recreation & activities, things to do, tours & sightseeing, transportation, university, and other relating to local business or place. a company, organization or institution may further comprise of, defined by, categorized by and/or relate to one or more (or combination of) but not limited to aerospace & defense, automobiles & parts, bank & financial institution, biotechnology, cause, chemicals, church & religious groups, community organization, computer hardware, computers & technology, consulting & business services, energy & utility, engineering & construction, farming & agriculture, fashion and beauty, food & beverages, foundation, government organization, health, medical & pharmaceuticals, industrial, insurance, internet, software, legal & law, manufacturing, media, news & publishing, mining & materials, non-government organization, non-profit organization, political organization, political party, professional services, religious organization, retail & consumer merchandise, small business, telecommunication, transport & freight, travel & leisure, university and other relating to a company, organization or institution. The system may also incorporate a brand or product may further comprise of, defined by, categorized by and/or relate to one or more (or combination of) but not limited to antiques & collection, apparel & accessories, appliances, arts & entertainment, auto, baby & kids, bags, building materials, business & industrial, camera & photo, commercial equipment, computers and hardware, education, electronics, fashion and beauty, financial services, food & beverages, furniture, games & toys, gifts & occasions, health & beauty, home décor, household supplies, jewelry & watches, kitchen & cooking, luggage, media, music, office supplies, outdoor & sporting goods, patio & garden, pet supplies and services, phone & table, product & services, public figure, software, tools & equipment, travel, video games, vitamins & supplements, website, wine & sprites and other relating to a brand or product. The system may also incorporate artist, professional & public figure may further comprise of, defined by, categorized by and/or relate to one or more (or combination of) but not limited to an actor, artist, athlete, author, business person, chef, coach, comedian, dancer, entertainer, fictional character, government official, journalist, monarch, movie character, musician & band, news personality, pet, politician, politician, producer, public figure, teacher, writer and other relating to an artist, professional & public figure. entertainment may further comprise of, defined by, categorized by and/or relate to one or more (or combination of) but not limited to book series, book store, concert, tour, concert venue, fictional character, library, magazine, movie, movie character, movie theater, music award, music chart, music video, professional sports team, radio station, record label, school sports team, song, studio, TV show and other relating to entertainment, the system may also incorporate a cause or community may further comprise of, defined by, categorized by and/or relate to one or more (or combination of) but not limited to animals, charitable, education, environment, foundation, health, human services, international, public benefit, religion and other relating to a cause or community.

The system may also incorporate or can also be embodied with subscriptions, purchases etc. current systems or systems with advancements in technology allow and enable users to access and share information throughout the web and through mobile devices through various types of networks.

In most cases and from what is currently available, social networks allow for one or more users through a structure of organized data, to interact with one another whereby organizing and enabling individuals, groups and entities to be connected throughout one or more networks integrated into a software platform that can connect with other third-party application.

With various connections and interactions a social network (when applicable) can collect data within the system and through other third-party systems. This data can be organized in a social graph whereby the data can be collected, organized to relate whereby serving better results to one or more users of the system and third party systems.

In some embodiments the system may graph illustrates relationships used within the system the includes one or more users, entities, objects, posts, posts of another post, viewed content, locations, proximity, and virtually anything shared with the system and other third-party systems. Anything within the system can be represented by a webpage whereby linking any information while also enabling the user interface in a social environment. Some parts of the system may react to data in real-time component or ticks.

The system also includes the ability for video compression or various format compression techniques or a video compression specification is a specification for digitally representing a video as a file or a bit stream. Examples of video compression formats include MPEG-2 Part 2, MPEG-4 Part 2, H.264 (MPEG-4 Part 10), HEVC, Theora, Dirac, RealVideo RV40, VP8, VP9 and VP10. In some embodiments an MPD or HLS (or similar) is created to stream video of varying quality based on bandwidth. Examples of a video codec is Xvid, which implements encoding and decoding videos using the MPEG-4 Part 2 video compression format in software. A video encoded according to a video compression format is normally bundled with an audio stream (encoded using an audio compression format) inside a multimedia container. The system also includes and managed media or video formats such as AVI, MP4, FLV, RealMedia, HLS, MGPEG-DASH, mpd, VP9, 3d Video, spherical video, augmented reality video, WEBRTC or Matroska. Multimedia container formats can contain any one of a number of different video compression formats; for example the MP4 container format can contain video in either the MPEG-2 Part 2 or the H.264 video compression format, among others. Another example is the initial specification for the file type WebM, which specified the container format (Matroska), but also exactly which video (VP8) and audio (Vorbis) compression format is used inside the Matroska container, even though the Matroska container format itself is capable of containing other video compression formats (VP9 video and Opus audio support was later added to the WebM specification). Other sizes and resolutions include 4K, 8K, 2K, 1080i, 1080p, 2160p, 24p, 4320p 480i, 480p, 576i, 576p, 720i, 720p, CCIR System A, A-MAC, CCIR Isystem B, B-MAC, C-MAC, D-MAC, D2-MAC, DVB-T, Effio, CCIR System G, CCIR System H, High frame rate, CCIR System I, IFrame (video format), Interlaced video, IRE (unit), Joint Level Interface Protocol, CCIR System M, MovieCD, Moving image formats, Naraloop, NTSC, NTSC-C, PAL, PAL region, PAL-M, PALplus, SECAM, SMPTE 292M, Sound-in-Syncs, Ultra high definition television, VF bandwidth, Video, or other Video compression format.

In some embodiments, a user may be present with one or more results that connect or relates the one or more past interactions with the system. Additionally the results may also include one or more results that may include one or more and/or combination of users, posts, digital media, answers to relating search, proximity, objects and/or advertisements. Whereby shown to the user in one or combination of lists, grids, image views, or cards. The user may be presented with one or more buttons or symbols resulting in the desired results. One or more servers and technologies however not limiting to may include web, http/https, FTP, application, GCI, ASP, HTML, XML, java, JSON, JavaScript, C, objective C, async Java, AJAX, PHP, Python, ruby, and similar. Other data collected would include electronic belongings comprising of software and hardware device. The disclosed system may track posts that are linked to one or more objects or users. An affinity may be determined between one or more users, objects, posts and entities. In some embodiments a post may be performed on any part of a user's profile, purchase, travel, etc, whereby in some embodiments rewarding users for reviewing a product, or stay at a hotel, dining, or service, travel flight, etc. whereby these rewards may be redeemable or used toward real world items, stays, purchase, services, of gifting one or more points. Posts may also interact with a user's experience on a game or animation. Endorsement of products, restaurants, travel (etc.) to other users, friends, followers, followees, relationships and networks may offer more significance which can be measured than a regular advertisement. Post are not limited to the type of or items embedded referred, referenced to or any attachments like digital media, text, objects, metadata, (etc.) Any post to the system may be linked to analytics showing performance to include both natural and paid. Backlinks for posts may include one or more posts refer to other posts. Embedding any number of items or objects can also be referred to as programmable links between items or objects and act the same as embedding relating to 3d, 360 degree or spherical for referring to and/or embedding posts, videos or digital media within other posts, videos, digital data or digital media and posts within any part of another posts, videos, digital data or digital media.

In some embodiments a computer network includes various levels of servers and databases. The user device and the front-end processing server interact through the communication network. Data is sent from the user through the users device to the front-end processing server, which then the data is allocated to one or more parallel servers for processing. Each parallel server could have one specific query search process or multiple designated query search process or random query search process (i.e. remote hosted undedicated servers). In some embodiment, the servers could be broken up to specific tasks of each component. The parallel search systems individually process the data query; if and when the data is processed the information is sent to the front-end server system. Sometimes the front-end server could process one or more query on the search. The results sent back from the Parallel query server system could include any format data (i.e. textual documents, images, video, etc.) The front-end server updates processed information thought the communication network to the user device. In some embodiments, the processed data could be stored through the corresponding server databases, front-end database while also storing information on the user device. In some embodiments, parallel servers can interact directly with each other. The query could result in being a text that is found within the data. For example a digital image of writing or a phone number could be processed to determine an association. The server system as a whole will send at least one processed data back to the user. There is no limit on the number of parallel servers within the server system of. In some embodiments the server system could contain a content engine where data is processed and collected between one or more users, associations within digital media, interests, traits, preferences to aid in creating links, relationships and similarities.

Additionally the said invention in some embodiments will use, outsource, best practice, create, license, technology that will enable users through a plethora of technology like CDN, databases, indexes, object stack, cloud, API, SDK, middleware, SQL to serve content to end-users for text, graphics, URLs and scripts, media files, software, documents, applications, e-commerce, portals live streaming media, on-demand streaming media, and social networks. Furthermore some technology may extend to crawling, indexing, and sorting operations while also utilizing available space storage, whereby information and data may be stored on one or more storage systems.

The operating system for each device (i.e. IOS, ANDROID, WINDOWS MOBILE, DARWIN, LINUX, UNIX, OS X, WINDOWS, VxWorks, etc.) the software components and/or drivers that controlled and manage general system responsibilities (i.e., memory, memory management, storage device control, power management, etc.) and while also enabling interactions among various hardware and software components. The user device while also including solid state drives, non-volatile memory, magnetic disk drive, optical disk storage, flash memory.

A post may contain content whereby both the post and/or content may contain and/or share one or more image(s), video(s), audio, document(s), link(s), subscription(s), application(s), third-party application(s) and/or provider advertisement(s). In some embodiments from the post or content of the post a user can create one or more post with no content and with content. For example a post can contain content like an image (or images), video (or videos), audio (or audios), document/file (or documents/files), link (or links), subscription (or subscriptions) or an application can use any content and manipulate the content whereby defining a class for all users to view whereby the system recognizes as a dynamic content. Through an API and with some set restricts to keep data uniform and without error developers and providers may allow users to create post with Apps within the set systems user interface or through other providers or applications that interact with the system. Additionally any post created can have one or more other post created from (as a result from) or originating from the post or content.

An example when a user searches the system that can query one or more posts, content, and users while also including any entities, objects, links, and places to find information relating to a user, post, content or collections of user, posts, content from and/or may contain one or more posts, content, posts of another post, data, digital media, advertisements, while also embodying one or more or any combination images, videos, audio, documents, advertisements, links, subscriptions, applications, third-party publications, or provider advertisement. The user is presented with the through various interfaces whether in a browser or on mobile devices, whereby on different devices search and information relating to a user's, posts, contents or collections of users, collections of posts, collections of content and may also contain one or more posts, content, posts of another post, data, digital media, advertisements.

Simply how the system handles a large number of posts with or without content where any number of posts created from the post or from any part of the post or content. Post containing content whereby one or more post can be created from the content and then more posts can be created from the new posts content. For example post with image, whereby another post is created with video from the post. Similarly post with video(s) created from a post, additionally post with an app or web can create one or more posts with or without content. Additionally many posts can be created and progress whereby the system keeps posts organized and content managed. Additionally content can be created from the post and act similarly to when posts are created from content. For example posts with content like video or images can have one or more post created from the post or the content of any post. In some embodiments depending on the user interface and backend systems. In other embodiments the front end user interface may operate with restrictions different from backend systems, keeping the back end flexible to incorporate various third-party platforms.

When a user searches for and how a system can relate relations between items. Posts, content, posts of another post, data, digital media, advertisements whereby including any images, video, audio, documents, links, subscriptions, applications, third-party applications, provider advertisements managed by the system to produce related, relevant, searched and/or source content, data and other information to one or more users or other systems, whereby any post, content or anything embodied within a post can refer and relate to other post and data within the system. For example the system dealing with any number of posts while also involving other posts like posts, content, post of another post, data, digital media, advertisements whereby including any images, video, audio, documents, links, subscriptions, applications, third-party applications, provider advertisements—managed by the system to produce related, relevant, searched and/or source content, data and other information to one or more users or other systems.

The system can address posts, posts of other posts (posts referencing the parent posts) post with a series of posts and posts of another post from a plethora of users. Relationships between user's interactions aid the system in determining relevance and ranking within a system any interaction within the system. In one embodiment, a post from $user_1$ whereby the post is referred by one or more of the same user and other users. $User_1$ refers the post by adding in one embodiment images. Other users post by adding text and images. Any of the said post can have any number posts and posts of another post coupled to any post and to the original post. The same user can also post the same post multiple times, for example $user_3$ referenced the post made by $user_1$. In one embodiment the post made by $user_3$ of the post from $user_1$ can have one or more posts by any number of users and/or the same user. Additionally, posts of posts from another post may have any number of posts and posts of other posts. For example a posts of posts of another post having one or more posts of another post and another post having one or more posts coupled to that post.

In some examples a post may comprise of one or more image, video, and/or link/web content while also pointing to one or more objects and text. Objects are things in the world that may not be represented by a user. In some embodiments objects could be a city or state, government, holiday etc. An object may be available through an API for or more clients, developers, third-parties whereby defining objects within the system as objects within the system. In addition to having a post comprise of various text, objects and content of a post can also include metadata, rich text, subsets, and data whereby a post is not limited to also including and/or created by digital media, content, links, hyperlinks, meta data, meta elements (metatags), objects, apps, articles, documents, scores, ranking, API, data, backlinks and/or information. Users interacting with the said system can have the opportunity to rate or favorite and comment whereby adding to the post. Users may further define and allocate addition relationships, data and information by referencing posts coupled to posts. Additionally posts that contain and no digital media (or content) can also point to posts. Shares in some embodiments can also refer post and any data, digital media, content, information, while also including similar embodiments. In one embodiment a system interacting with one or more user through a network can focus on a post that may comprise of one or more image, video, and/or link/web content while also pointing to one or more objects and text. In addition to having a posts comprise of various texts, objects and content posts can also include metadata, rich text, subsets, and data. Whereby a post is not limited to also including and/or created by digital media, content, links, hyperlinks, meta data, meta elements (metatags), objects, apps, articles, documents, scores, ranking, API, data, backlinks and/or information. Users interacting with the said system can have the opportunity to rate, favorite on comment whereby adding to the post. Users may further define and allocate additional relationships, data and information by posting coupled posts. In one embodiment a system interacting with one or more users through a network may focus on a post may comprise of one or more links while also pointing to and including one or more objects and text. Posts may also just be a representation, re-share or a copy of the coupled post. In addition to having a posts and posts coupled to other posts comprise of various text, objects and content a post can also include metadata, rich text, subsets, and data. Whereby a post are referring to and not limited to also including and/or created by digital media, content, links, hyperlinks, meta data, meta elements (metatags), objects, apps, articles, documents, scores, ranking, API, data, backlinks and/or information. Users interacting with the said system can have the opportunity to rate or favorite and comment whereby adding to the post. Users may further define and allocate additional relationships, data and information by posting and posts coupled to posts. Additionally, posts that contain no digital media (or content) can also point to posts. Shares in some embodiments can also refer posts refers to other posts and any data, digital media, content, information, while also including similar embodiments.

In some embodiments where users can create original posts, add posts with content to posts and text to posts. For example, $user_a$ creates $post_a$ that contains one or more and/or combination of documents, photos, videos, sounds, graphics, augmented representation, links, events, articles, objects, and apps while also containing one, a plurality and/or combination of data, metadata, metatags (meta element), EXIF data, keyword, hastags, comments, favorite (like), text, links, location, entities, objects, entries, places, and users. Followed by a user creating a post where a $user_a$ or $user_n$ creates $post_{aa}$ that contains one or more and/or combination of documents, photos, videos, sounds, graphics, augmented representation, links, events, articles objects, and can contain data, metadata, metatags (meta element), EXIF data, keyword, hastags, comments, favorite (like), text, links, location, entities, objects, entries, places, and users are embedded within or refers to the $post_a$ of $user_a$. If a user creates a posts with just text from the $post_a$ created by $user_a$ will not allow other users to add content to the post, where in some embodiments from $post_{aa}$ (with content like digital media), $user_a$ or $user_n$ creates, embeds or shares $post_{aaa}$ that contains one or more and/or combination of data, metadata, metatags, EXIF data, keyword posts, hastags, comments, favorite (like), text, links, location, entities, objects, entries, places, and users are embedded within or refers to $post_{aa}$.

Embodiment of a user adding content (and/or digital media and data) to any or any part of digital media. In some embodiments adding content (and/or digital media and data) to any or any part of digital media may also include a region or set of points within digital media. Corresponding points can relate to a photo, document, video (for each frame or group of frames), and audio.

In some embodiments $user_a$ creates $post_a$ that contains one or more and/or combination of documents, photos, videos, sounds, graphics, augmented representation, links, events, articles, objects, apps while also containing one, a plurality and/or combination of data, metadata, metatags (meta element), EXIF data, keyword posts, hastags, comments, favorite (like), text, links, location, entities, objects, entries, places, and users. Additionally $user_a$ or $user_n$ creates $post_{aa}$ that contains one or more and/or combination of documents, photos, videos, sounds, graphics, augmented representation, links, events, articles and can contain data, metadata, metatags (meta element), EXIF data, keyword posts, hastags, comments, favorite (like), text, links, location, entities, objects, entries, places, and users are embedded within or refers to the $post_a$ of $user_a$. Furthermore $user_a$ or $user_n$ creates, embeds or shares $post_{aaa}$ that contains one or more and/or combination data, metadata, metatags, EXIF data, keyword posts, hastags, comments, favorite (like), text, links, location, entities, objects, entries, places, and users are embedded within or refers to $post_{aa}$.

From user $user_a$ or $user_n$ creates $post_{aa}$ that contains one or more and/or combination of documents, photos, videos, sounds, graphics, augmented representation, links, events, articles and can contain data, metadata, metatags (meta element), EXIF data, keyword posts, hastags, comments, favorite (like), text, links, location, entities, objects, entries, places, and users are embedded within or refers to the $post_a$ of $user_a$ in some embodiments $user_a$, $user_n$ or $User_{n1}$ creates $post_{ab}$ that contains one or more and/or combination of documents, photos, videos, sounds, graphics, augmented representation, links, events, articles, apps while also containing one, a plurality and/or combination of data, metadata, metatags (meta element), EXIF data, keyword posts, hastags, comments, favorite (like), text, links, location, entities, objects, entries, places, and users are embedded within or refers to a documents, photos, videos, sounds, graphics, augmented representation, links, events, articles, apps from any part of $post_{aa}$. $user_a$, $user_n$ or $user_{n1}$ creates, embeds and/or shares $post_{ab}$ a that contains one or more and/or combination data, metadata, metatags, EXIF data, keyword posts, hastags, comments, favorite (like), text, links, location, entities, objects, entries, places, and users are embedded within or refers to $post_{ab}$.

To continue creating posts from digital media and/or parts of digital media, $user_a$, $user_n$ or $user_{n1}$ or $user_{n2}$ creates $post_{ac}$ that contains one or more and/or combination of documents, photos, videos, sounds, graphics, augmented representation, links, events, articles, apps while also containing one, a plurality and/or combination of data, metadata, metatags (meta element), EXIF data, keyword posts, hastags, comments, favorite (like), text, links, location, entities, objects, entries, places, and users are embedded within or refers to a documents, photos, videos, sounds, graphics, augmented representation, links, events, articles, apps from any part of $post_{ab}$. Furthermore $user_a$, $user_n$ or $user_{n1}$ or $user_{n2}$ creates, embeds and/or shares $post_{ac}$ that contains one or more and/or combination data, metadata, metatags, EXIF data, keyword posts, hastags, comments, favorite (like), text, links, location, entities, objects, entries, places, and users are embedded within or refers to $post_{ac}$.

In some embodiments a user can create posts aided by the disclosed invention. A $user_1$ creates $post_1$ with digital media or content, and may include other data metadata and text and/or $post_1$ is created by an API. From the created $post_1$ with digital media or content, $user_1$ or another $user_n$ creates $post_{1a}$ with digital media or content. Posts that have been created from another post can be shared with no text or shared with text. Post that have been created with text and digital media or content from another post can share the post created with text. In some embodiments $user_1$ or another $user_n$ shares $post_{1a}$ with no text (or $user_n$ creates $post_{1ab}$ shared with no text) or $user_1$ or another $user_n$ creates $post_{1aa}$ with text. $Post_{1ab}$ shared with no text and $post_{1aa}$ with text originate from $post_{1a}$ with digital media. $User_1$ or another $user_n$ shares $post_{1aa}$ with no text. Shares that refer to a previous post can be place within be placed and/or pushed to one or more user, followers, networks, third-party networks, contacts, and/or personal contacts (through messaging, text messaging, email, cross platform, instant messaging or subscription).

$User_1$ or $user_2$ creates $post_{1b}$ with digital media embedded or referring to any or any part of digital media (or content) of $post_1$. From $user_1$ or $user_2$ creates $post_{1b}$ with digital media embedded or referring to any or any part of digital media (or content) of $post_1$. Posts that have been created from any part of another post (or any part of another post may include digital media and/or content) can be shared with no text or shared with text. Post that have been created with text and digital media or content from another post can share the post created with text. Additionally a user can create a post with content or digital media from posts that have been created from any part of another post (or any part of another post may include digital media and/or content). $User_1$ or another $user_n$ shares $post_{1b}$ with no text (or $user_n$ creates $post_{1bb}$ shared with no text) or $user_1$ or another $user_n$ creates $post_{1ba}$ with text. $Post_{1ba}$ shared with no text and $post_{1ba}$ with text originating from $post_{1b}$ with digital media. $User_1$ or another $user_n$ shares $post_{1ba}$ with no text. Shares that refer to a previous post can be placed within and pushed to one or more user, followers, networks, third-party networks, contacts, and/or personal contacts (through messaging, text messaging, email, cross platform, instant messaging, socket messaging or subscription).

$User_n$ creates $post_{1n}$ with digital media embedded or referring to any or any part of digital media (or content) of $post_{1b}$. From $user_n$ creates $post_{1n}$ with digital media embedded or referring to any or any part of digital media (or content) of $post_{1b}$. Posts that have been created from any part of another post (or any part of another post may include digital media and/or content) can be shared with no text or shared with text. Post that have been created with text and digital media or content from another post can share the post created with text. Additionally a user can create a post with content or digital media from posts that have been created from any part of another post (or any part of another post may include digital media and/or content). $User_1$ or another $user_n$ shares $post_{1b}$ with no text (or $user_n$ creates $post_{1nb}$ shared with no text) or $user_1$ or another $user_n$ creates $post_{1na}$ with text. $Post_{1nb}$ shared with no text and $post_{1na}$ with text originate from $post_{1n}$ with digital media. $User_1$ or another $user_n$ shares $post_{1na}$ with no text. Shares that refer to a previous post can be place within be placed and/or pushed to one or more users, followers, networks, third-party networks, contacts, and/or personal contacts (through messaging, text messaging, email, cross platform, instant messaging, socket messaging or subscription).

Posts that have been created from any part of another post (or any part of another post may include digital media and/or content) can be shared with no text or shared with text. Post that have been created with text and digital media or content from another post can share the post created with text. Additionally a user can create a post with content or digital media from posts that have been created from any part of another post (or any part of another post may include digital media and/or content). This method in some embodiment can continuously or indefinitely occur. From these posts created from any part of another post may include digital media and/or content) can be shared with no text or shared with text, in some embodiments can be indefinite and continuously performed as mentioned in the method and illustrations of and the disclosed invention.

In some embodiments one or more posts may be referred to or embedded in one or more other post or part of other posts. For example a post created with two images can have one post referring to or embedded within the first image and three posts referring to or embedded within the second image, while also not limiting any other information or data relating and post created as a result of a user creating a post from an originating post.

In some embodiments the defined by the functionality of the system and user interface, a user can create $post_1$ with digital media where the same ($user_1$) or another $user_n$ creates $post_{1a}$ with digital media. $Post_{1a}$ refers to or embedded in $post_1$ whereby one or more additional information and data may be stored for either $post_1$ or $post_{1a}$ while also containing but not limited to other information like text, metadata (or meta elements), metatags, links, strings, (or $post_{1a}$ created by meta elements).

From the created $post_1$ with digital media or content, $user_1$ or another $user_n$ creates $post_{1a}$ with digital media or content. Posts that have been created from another post can be shared with no text or shared with text. Post that have been created with text and digital media or content from another post can share the post created with text. In some embodiments $user_1$ or another $user_n$ shares $post_{1a}$ with no text (or $user_n$ creates $post_{1ab}$ shared with no text) or $user_1$ or another $user_n$ creates $post_{1aa}$ with text. $Post_{1ab}$ shared with no text and $post_{1aa}$ with text originate from $post_{1a}$ with digital media. From the share of $post_{1a}$ or the created $post_{1aa}$, are either embedded or referred to $post_{1a}$. Additionally in some embodiments $user_1$ or another $user_n$ shares $post_{1aa}$ with no text which is refer to $post_{1aa}$. Shares that refer to a previous post can be place within be placed and/or pushed to one or more user, followers, networks, third-party networks, contacts, and/or personal contacts (through messaging, text messaging, email, cross platform, instant messaging, socket message or subscription).

$User_1$ or $user_2$ creates $post_{1b}$ with digital media embedded or referring to any or any part of digital media (or content) of $post_1$. From the new $post_{1b}$ refers or embedded in (and/or data is embedded in $post_1$ or $post_{1b}$) to the $post_1$ with digital media and/or content. From $user_1$ or $user_2$ creating $post_{1b}$ with digital media embedded or referring to any or any part of digital media (or content) of $post_1$, $user_1$ or another $user_n$ shares $post_{1b}$ with no text (or $user_n$ creates $post_{1bb}$ shared with no text) or $user_1$ or another $user_n$ creates $post_{1ba}$ with text whereby both $post_{1ba}$ and shared post with no text refer to or are embedded within the created $post_{1b}$. $Post_{1ba}$ shared with no text and $post_{1ba}$ with text from $post_{1b}$ with digital media. $User_1$ or another $user_n$ shares $post_{1ba}$ with no text. Shares that refer to a previous post can be place within be placed and/or pushed to one or more user, followers, networks, third-party networks, contacts, and/or personal contacts (through messaging, text messaging, email, cross platform, instant messaging, socket message or subscription). A post created by a post of any part of content wherein some embodiments the originating post could be part of another referenced and/or embedded.

$User_n$ creates $post_{1n}$ with digital media embedded or referring to any or any part of digital media (or content) of $post_{1b}$. From the new $post_{1b}$ refers or embedded in (and/or data is embedded in $post_{1b}$ or $post_{1n}$) to the $post_1$ with digital media and/or content. From $user_n$ creating $post_{1n}$ with digital media embedded or referring to any or any part of digital media (or content) of $post_{1b}$, $user_1$ or another $user_n$ shares $post_{1b}$ with no text (or $user_n$ creates $post_{1bb}$ shared with no text) or $user_1$ or another $user_n$ creates $post_{1nb}$ with text whereby both $post_{1na}$ and shared post with no text refer to or are embedded within the created $post_{1n}$. $Post_{1nb}$ shared with no text and $post_{1na}$ with text originate from $post_{1n}$ with digital media. $User_1$ or another $user_n$ shares $post_{1na}$ with no text. Shares that refer to a previous post can be place within and/or pushed to one or more user, followers, networks, third-party networks, contacts, and/or personal contacts (through messaging, text messaging, email, cross platform, instant messaging, socket message or subscription).

In some embodiments a user can create posts, creates posts referring to or embedded in any or any part of a digital media or content within a post, posts created from other posts (with or without content) and sharing any post aided by the disclosed invention. In some embodiments $user_1$ creates $post_1$ with digital media where the same $user_1$ or one or more $user_n$ can create a post from the whole $post_1$, any digital media (or content) and/or any part of digital media (or content) contained in $post_1$, posts with text and/or shares $post_1$ to one or more networks, followers of the creating user who post and/or share. Where in some embodiment the user same, $user_1$ or one or more $user_n$ can create a post from the whole $post_1$, any digital media (or content) and/or any part of digital media (or content) contained in $post_1$, post with text and/or shares $post_{1a}$ to one or more networks, followers of the creating user who post and/or share. If a post is created with text, that same post with text can be shared to one or more networks, followers of the creating user who post and/or share. For example $user_1$ or another $user_n$ shares $post_{1aa}$ with no text.

Additionally some embodiment include the same user, $user_1$ or one or more $user_n$ creates $post_{1n}$ as a result from any digital media (or content) and/or any part of digital media (or content) contained in $post_1$, and a post created with text from $post_{1n}$ and/or shares $post_{1n}$ to one or more networks, followers of the creating user who post and/or share. If a post is created with text that same post with text can be shared to one or more networks, followers of the creating user who post and/or share. For example $user_1$ or another $user_n$ shares $post_{1na}$ with no text.

In addition some embodiment included the same user, $user_1$ or one or more $user_n$ creates a post with text from $post_1$ and/or shares $post_1$ to one or more networks, followers of the creating user who post and/or share. If a post is created with text for example $post_{1aa}$ with text can be shared to one or more networks, followers of the user who created the share. For example $user_1$ or another $user_n$ shares $post_{1aa}$ with no text.

In some cases and in some embodiments, a post and/or share can refer to and/or may embed within one or more users other posts, digital media, content, links, hyperlinks, meta data, meta elements, objects, apps, articles, documents, scores, ranking, API, data, backlinks and/or information. For example a post can refer to the posting $user_1$. Any user that creates a $post_1 a$ from a post include the same user who created the original post may have $post_{1a}$ and/or any digital media, content, links, hyperlinks, meta data, meta elements, objects, apps, articles, documents, scores, ranking, API, data, backlinks and/or information refer to or embedded in either $post_{1a}$ or $post_1$. Furthermore embodiment may also include post with text, shares of post with text and shares of posts refer to and/or embedded within one or more other posts. For example, $user_1$ or another $user_n$ shares $post_{1a}$ or $user_1$ or another $user_n$ creates $post_{1aa}$ with text where $post_{1aa}$ or share of $post_{1a}$ can refer to or embedded in $post_{1a}$, the share of $post_{1a}$ and/or $post_{1aa}$ with in some cases anything relating to post, any digital media, content, links, hyperlinks, meta data, meta elements, objects, apps, articles, documents, scores, ranking, API, data, backlinks and/or information. Additionally $user_1$ or another $user_n$ shares $post_{1aa}$. User that view the shared $post_{1aa}$ of $user_1$ or another $user_n$ can be referred to $post_{1aa}$ created $user_1$ or another $user_n$ whereby also including in some cases anything relating to post, any digital media, content, links, hyperlinks, meta data, meta elements, objects, apps, articles, documents, scores, ranking, API, data, backlinks and/or information.

Furthermore some examples from any user that creating a $post_{1aa}$ or sharing from any part $post_1$ and/or any part of any digital media or content include the same user who created the original $post_1$ may have $post_{1n}$ and/or any digital media, content, links, hyperlinks, meta data, meta elements, objects, apps, articles, documents, scores, ranking, API, data, backlinks and/or information refer to or embedded in either $post_{1aa}$, share of $post_1$ or $post_1$. Furthermore embodiment may also include post with text, shares of post with text and shares of posts refer to and/or embedded within one or more other posts. For example, $user_1$ or another $user_n$ shares $post_1$ or $user_1$ or another $user_n$ creates $post_{1na}$ with text where $post_{1na}$ or share of $post_1$ can refer to or embedded in $post_1$, the share of $post_{1n}$ and/or $post_{1aa}$ with in some cases anything relating to post, any digital media, content, links, hyperlinks, meta data, meta elements, objects, apps, articles, documents, scores, ranking, API, data, backlinks and/or information. Additionally $user_1$ or another $user_n$ shares $post_{1aa}$. User that view the shared $post_{1aa}$ of $user_1$ or another $user_n$ can be referred to $post_{1na}$ created $user_1$ or another $user_n$ whereby also including in some cases anything relating to post, any digital media, content, links, hyperlinks, meta data, meta elements, objects, apps, articles, documents, scores, ranking, API, data, backlinks and/or information.

In some embodiments the user will be given optional suggestions to the identity of the association while also providing the ability to search, add an identity while also selecting additional associations. When selecting one or more points, the user may associate points that correspond with one or more associations. Points or indicators may vary in size shape color representation while also being interchangeable with buttons and buttons with features. The corresponding association could be one or more people, places, landmarks, buildings, businesses, restaurants, objects, figures, advertisements, etc., the bounding region shows association that is manually and/or automatic recognized within digital media. In some embodiments the bounding region could be understood as just a point that could include a vicinity area surrounding. Additional method for automatic recognizing one or more associations within digital media that could take place at any time. The bounding region shows association automatic recognized and explained within digital media. For example one way one or more server systems analyze bounded points within digital media. The digital media, associations, and/or bounding points are converted into digital data that will be made available for the user. This digital may include one or more buttons or buttons with features. The corresponding association could be one or more people, places, landmarks, buildings, businesses, restaurants, objects, figures, advertisements, etc., in some embodiments the bounding region could be understood as just a point that could include a vicinity area surrounding. One or more points can be interchangeable with buttons and buttons with features, including identifiers and features that enable users to find out more, call, message, share, getting information, directions, saving for later, adding to favorites, advertisements, settings etc., while also showing a button with features of various identifiers to a corresponding association. In some embodiments the user will be given optional suggestions to the identity of the association, while also providing the ability to search, remove identities, setting tabs, while also adding an identity while also selecting additional associations. Implementing the remove identity would remove all digital data leaving the digital media unaltered; while the user implements remove identity feature which could may or may not remove the data throughout the server system and databases. The user may organize additional information and configurations.

A selection of frames from a video. In some embodiments the video is stored in a file server and given an ID and/or reference. Further describing the embodiment a video or similar digital media may show all the frames contained in the video or frames (parts of frames) in various sequences ordered/sorted or unordered/unsorted. However in most cases a video may be defined as a series of photos in order with a time sequence presented to a user in order to show the contents of the video. For example a video sequence of a vehicle at time n from start to end. In most cases a user uploads the video where the system may give the upload an ID and reference location while also creating a post for the same user or other users to add additional content like descriptions, posts and posts of other posts, comments, favorites etc., while also allowing for one or more reference to and from the post or the uploaded image. Reference may be to a link, a photo, object, post, posts of other posts place, entity, subscription, user, app or other allowed by the system, platform partners, clients etc. Additionally other posts (posts of other posts and another post) can be created from the original post or uploaded video. Whereby referencing the same video (digital media) post, or attributes of, while also adding additional digital media (or objects) and any attributes like descriptions, comments, EXIF data, sequenced, sequence reference, etc. Simply a user created another post from the referenced original post or part of the referenced original post. In some embodiments the new post may contain a time sequence and location of the position of the post. A real life example is illustrated in where a user creates a post with digital media like a video and/or just digital media the same or another user can create a post within any part of the digital media. In some embodiments the post is created referring the frame sequence and/or location (position) of the desired object. For example something referenced within part of a video with a sequence of 5 seconds through 25 seconds and the corresponding position.

A method of how a user using a touch screen can identify the location and the sequenced frames. In some embodiments a user enabling and referenced an object in a video, using a mouse, gestures, or touching (enabled by the device whether it will be a touchscreen device or other devices that we require external devices or sensors to define a referenced region. As the video passes through each frame the user defines the location of the post for the allocated frame. In some embodiments depending on the function, user interface and user interactions the use may or may not be required to keep touching a screen, keeping a mouse enabled, not looking away or other methods not restricting a user from defining a region and/or frame sequence or series of frame sequences. For example the system may limit or not limit the ability for a user to define any or any part of the video or electronic medium. Additionally a simple illustrations of a use maneuvering and using the user interface on an allocated device starts the post at 5 seconds and ends the post at 25 seconds, in this example the user continues to the post for every frame (where in some embodiments the user using a touch screen does not lift his or her finger off the screen) where the user defined one post through the interval. In other embodiment the user may just have to follow an object and defining posts with eye movements or voice commands. Other implementations may include the aid of additional systems, software or third-party providers that aid the user in tracking or identifying objects to post. Other embodiments may include referenced an objects may result in a creation of a post where the user can define the region in separate intervals at different or the same time. For example a user interface with some practical implantation would allocate a user to define a region where from the defined region the user can create one or more post to be created into the defined system.

The object with a post in a video. The user interface and how the post are presented in videos may vary depending on technology, methods and user preference and in no instance this disclosure may prohibit or limit a user posting. A simple representation of the method used to post within or any part of video (sequence of image that make up a video). Illustrating two dimensionally how a post moves across the x and/or y direction while also in some embodiments a timing component. Not limited by the preferred technology or actual method of storing the location within the video and the frame position. The position is represented in some embodiments as actual coordinates of pixels or taking the ratio position of the x in the x direction and the ratio of the y in the y direction. Another component may be added for time or the corresponding frame sequence within the ordered series of frames the make up a video. For example using the method of taking the ratio in the x direction or the ratio in the y direction, first we must calculate the points relative the screen size, image size, video size, side used in the application or system while also including orientation. Taking the ratio if the position in the x direction is 384 (pixels from the left side of the screen) and the total number of pixels in the x direction is we can simply divide 384 getting the results of 0.3 (for the x direction). Performing the same process for the Y direction, Taking the ratio if the position in the y direction is 266 (pixels from the left side of the screen) and the total number of pixels in the y direction is 720 we can simply divide 266 and 720 getting the results of 0.37 (for the y direction). By using proportion, and storing in integers or floats the system may operate with multiple platforms and user device while also allowing for one or more third-party providers to also have the same flexibility. Adding a timing component to the system to indicate the correction frame number or relative time to the video and the corresponding position or positions that the user has selected. For example from the position at the user started with (0.2, 0.5) at 15 sec and at 22 sec the user had moved to position (0.3, 0.37), where every position in between (0.2, 0.5) and (0.3, 0.37) is stored with the corresponding timing component.

Where for every position and frame we can store the values for post_field and frame sequence. Additionally the method of storing can change to be implemented in other technologies and methods. The example above illustrates a representation of using mongoDB but can also be modified to be stored in MySQL or PostgreSQL, therefore not limiting the function of storing the positions and sequence to refer or embedded digital media, posts to any other post, video or digital media.

In some embodiments the posts may be stored 3 dimensionally where the user can define a 2-dimensional or 3-dimensional post to create a post. In other embodiments a use and remove certain polygon shapes from within another polygon. For example post (0.2, 0.5) at 15 seconds, (0.3, 0.37) at 22 seconds, (0.5, 0.82) at 32 seconds, (0.875, 0.15) at 50 seconds or one or more posts, videos or digital media can be referred to and/or embedded within a video. Depending on the user interface and device anything embedded and/or reference in a video can be shown to the user and/or represented in a multitude of techniques or ways. Other examples would include (0.2, 0.5) at 15 seconds, (0.3, 0.37) at 22 seconds, (0.5, 0.82) at 32 seconds, (0.875, 0.15) at 50 seconds, (0.06, 0.92) at 5 seconds, (0.5, 0.15) at 30 seconds, (0.33, 0.75) at 25 seconds, (0.91, 0.93) at 34 seconds, (0.60, 0.15) at 55 seconds and (0.1, 0.225) for 32 seconds. The system does not limit by or from post or object posts to be made up of various types of posts. For example an object that is a post, can be classified into various types. In some embodiments the system may be classified as an image post, link post, text post, video post, app post, article post, document post, etc., where in some embodiments further contain tables for other classification or system documents like image, video, file, document, application or third-party classification, etc. The system may also limit or properly maintain a schema or structure of the system for referenced (or posting) or embedding posts, posts of other posts and/or digital media (and digital data) within digital media. Other embodiment may include an image post requiring at least one image or a video. All of which is to maintain a scene of structure within the system. Additionally how the system incorporates data fields is defined as relating technologies, platforms or design schema. For example in some embodiments, data for a video can be stored for the position $(x_n, y_n)$, x is the content (for pixels or ratio) in the X direction and in the Y is the content (for pixels or ratio) in the y direction, n is the corresponding set i.e.: n=1, n=2, n=3 etc. A third field classified as time $z_t$ or $t_n$ can be in the same data set i.e.: post_field=listfield for float $(x_n, y_n, t_n)$ or with separate field i.e.: post_field=listfield for float $(x_n, y_n)$ and post_field_time=listfield for $(t_n)$. As the technology progresses the system in some embodiment will incorporate Spherical Coordinates. Spherical Coordinates would include any of the following parameters, calculated component or originating from $x_n$, $y_n$, $z_n$, $r_n$, θ-hat, r-hat or φ-hat and a component for time $t_n$. From the points the system can address many points by allocating the convergence of points or grouping.

A user in embodiments may view one or more posts within digital media like video, motion pictures, and clips. For example from a user device video shows an embodiment of a desert safari, posted within the system or embedded from a third-party provider. Embodiments allow for points that contain one or more posts and data. For example from the user device video clip with one or more points of a post, associated and/or identified. The system can perform defining/identifying points automatically or by a user, (by users as show) which by defining the location within the video and another variable like frame rate or frame number to define the region for various parts of the video or clip.

A user in embodiments may view a posts within digital media like video, motion pictures, and clips from another video. For example from a user device video shows an embodiment of a desert safari, posted within the system or embedded from a third-party provider. In some embodiments by selecting region, the original video is reduced in size and brought to the lower right corner and the new video within a region. Embodiments may also allow for other forms of digital media to be embedded into video like photos and links that may include embedding other videos. Embodiments allow for points that contain one or more posts and data. For example from the user device video clip may have one or more points, posts, associated and/or identified. The system can perform defining/identifying points automatically or by users.

A user in some embodiments can define a region within a video, for example a user using a simple gesture like placing a finger on the user device that is touch sensitive, can identify and follow an object as the video plays, from this user created input the system can recognize the point and or points and frames of video (start and end) including any positions defined on the user device. Defining the region would not be limited to gesture and may also work the same way with a mouse, clicker, eye tracking, and/or stylus. Using multiple fingers may increase and decrease size of the region and/or zoom. Other user implemented features may also include if a user takes their finger off the screen the play of the video stops or just the defined region or both or a dialogue window may ask if the user is done or something else. The region within the region identified by the user is bound by and may also be defined by points.

One or more embodiments whereby relating to proximity or location. A location can be found anywhere in the world, where in one example a post with coupled one or more posts where the post was made. In some embodiments, a post has content that relates to a location or an embodiment like an image where the images was taken near close to or nearby other posts. Location illustrates posts and posts of other posts, where in some embodiments shows that posts and posts of other posts include one or more dimensions for ranking and scoring whereby posts that are closer to the couple or other posts may be ranked lower or higher based on other objects or, posts and posts of other posts. Example of various dimensions would include number of posts, posts of other posts content, allocation, links, other objects, proximity, time of day etc. Location illustrates a post where in some embodiments user has multiple posts coupled to a post of a user or same user. The post and other posts show a higher significance to users feeds and search resulting from the posts that are within various proximity to the coupled post. Other dimensions are also incorporated in the affinity of the posts and other post and everything relating to. Location illustrates how a post can have one or more user's post where each user can post the other post multiple times. Proximity of post and posts of other posts may be given a value for other users to be served within the system.

One or more interaction by a user with a system may be displayed in a feed for one or more users searching and/or following that user. The system can also build data profiles for every user with or without an account whereby scoring and ranking every interaction with the system.

For example posts can have a location where posts of other posts and post that do not share or have _id referring to or embedded within any field can be indexed and related to users or other posts. Additionally within a region or location a post can have nearby posts whereby posts in some embodiments may or may not have the post parent_id in any field. In other embodiments where a region is defined within in some cases referred to as posts or posts of other posts and other cases referred to as posts and posts of other posts. For example post can have a $t_1 r_2$ (post's post) from post, another post with another post and another posts with a posts all in the same region or within proximity.

Additionally embodiments may also include posts from various users all may or may not include content like images or video whereby examples are shown within region for corresponding posts and posts of other post.

A spherical coordinates with a change in vantage point or origin relative to definition of change of the origin from to origin of the spherical outliers defines any number of points for the given radius. In some embodiments some points may intersect with the same radius with different origins.

Spherical coordinates within digital media or augmented reality with different vantage points or origin. In some emblements simulate various examples from similar situations. In some emblements be real-time augmented reality or a prerecorded video or virtual combination of image or videos where the user can navigate. For any example the user can get a viewpoint from two separate vantage points or origins. Looking at different points from the origin and points from the origin. Spherical coordinates within digital media or augmented reality with different vantage points or origin and referencing the same point. In some embodiments, more than one user or the same user can see the same point from two different origins or vantage points.

In one embodiment a user could select points of a review a story or more images about a variation of a product from a manufacture. Embodiment that includes posts the point to brand/manufacture where the same brand/manufacture has a $product_1$ that the post also points to. Additionally, posts relate post of $product_{2A}$ of the brand/manufacture. In the same embodiment posts of other posts can point to variations as a whole and posts and posts of other posts can point to one or more products for example like post pointing to $product1B$ and $product_{2C}$. Also posts may be used to help with inventory in stores or confirm inventory of one or more products where users or even employees of the store can report and confirm with one or more user looking for a certain product. For example, images, links, videos, text, shared, documents, other content and data that a system can recognize while also not limited by or through an API, apps, EXIF data, metadata, meta elements, meta tags, and/or objects. Additionally post can be created from any part of another post, for example from digital media (videos, images, audio), links, files, and documents. Posts can also refer to products, brands, manufactures, and variations. One or more posts can be coupled together additionally posts are coupled to posts and other post.

A user querying the system for results. The user may be presented with one or more images, links, data, objects, users, events, news, locations, proximity, suggestions and information whereby including and any of results can comprise of posts. Additionally embodiments of the system performing queries from a user whereby the results may be displayed in various user interfaces differently to include images, links data, objects, users, events, news, locations, proximity, suggestions, and information that may take the form of posts and other posts. Additionally in some embodiments, other posts may be referred to as similar and/or equal to one or more posts within a system.

Advertisements coinciding with posts, objects, apps, and other user actions. For example, user couples to posts and in other embodiments a user are coupled to and posts coupled to posts and ads. User is coupled to posts and ads. Other embodiments, users are coupled to objects wherein objects are coupled to one or more posts and ads.

Additionally embodiments may illustrate methods for creating posts within digital media that may act as advertisements. Refining the digital media or posts can also save progress, help and go forward with progress. For example a user can search for digital media and content to post where one or more advertisements may or may not be shown to a user. Advertisements within digital media and content can have advertisements with one or more digital media, content, text, payment, and strategy. A user can upload one or more photos. Searched photos can be found through the web. One or more points of digital media within posts. In some embodiments corresponding points within digital media may have one or more associations identified and complementing keywords.

Embodiments may also include video of the vehicle and general information of the vehicle like MSRP, Miles per Gallon, horse power, links, download or share the brochure or listing, more photos, more posts identified within the system that may or may not show an association of the originating post. Points identified in some embodiments will show information provided by users and various information and data that the system find, relates and associates with the post. For example if a person is looking at a model of a car the system can recognize additional information as well as relating information, advertising, similar associations, and various posts. Presented information may also me relating to one or more third-party providers, third-party platforms, developers, local listings, ecommerce, API, or any system aiding or connected to the system of the disclosed invention. An API can be a pass-through, whereby a single API method to funnel request to a particular backend service. Any API can specifying responses based on an HTTP request, or a URI requesting content. API is most commonly known as an architecture that makes it easy for one application and incorporate capabilities or data from another application. API's simplify entry points to application logic and data, while also adding to or digesting APIs enable developers to easily access and reuse application logic built by other developers. In some embodiments, web APIs provide almost the same capabilities over a network whereby exposing them directly, while adding a management and visibility layer.

API makes it easier for users to have open access to their data. In some embodiments API's may follow principles of RESTful whereby enabling a user or combination of users and applications to call HTTP GET, POST, PUT, and DELETE methods regarding APIs. In some embodiments GET would retrieve a list of resources or the profile of a specific resource. POST would create a resource, or one or more parameters, performed an action on a resource. In some embodiments, OAuth access tokens or other tokens, use the POST method along with the parameter. Additionally embodiments may use to PUT to update existing resource and DELETE which deletes an existing resource. In some embodiments the system when incorporating API or technology similar to an API may require the use of a client_id. A client_id serves as a simple to associate you with a server, script, or program with a specific application. However, some requests require authentication or requests made on behalf of a user. Authenticated requests require an access_token. These tokens are unique to a user and should be stored securely. The system could embody a dynamic API or operations where GET retrieves a list of resources, POST creates and new or deletes a resource, PUT modifies and existing resource, and DEL removes specific resources. The user may ask for information in JSON or XML or any other compatible format. When requesting in some embodiments a user may ask for partial resources (field=a,b,c,d(m,n)) or other parts like statistics, advertisements, suggestions, etc. additional embodiments may include temporary post(s) created with a sequence of frames comprising of one or more advertisements, documents, digital images, digital video, sounds, digital albums, graphics, augmented representation, links, events, articles, apps, text while also containing one, a plurality and/or combination of data, metadata, metatags, EXIF data, keyword posts, hashtags, comments, favorites, text, links, location, entities, objects, entries, places, and users. The system may also create these in temporary post in runtime based on the user or one more user's interests, habits, active participation, ownership, individual, keywords, posts and/or any interaction with the system or other systems where data is available on said user or users.

Embodiments allow users to specify a plethora of access and requests from the user. Within a given system all apps have basic read access by default. Other embodiments extend access such as liking or favoring, commenting, or relationships, users specify based on the use or need of the basic to read any and all data related to a user (e.g. following/followed-by lists, photos, etc.) where in some embodiments basic needs refers to an API and whereby some include default settings. Other features of the API may include comments (create or delete comments), relationships (follow and unfollow users), favor/likes (like and unlike items) while also embodying other functionality that incorporates features similar to creating, posting, publishing, read, get, update, referenced place, referenced users, referenced posts, referenced objects, add/cite objects, add/cite users, add/cite page, adding content to posts, content tokens, app tokens.

The system incorporates various types of data like an image (just one type of digital media) and a user interface like page viewer, action bar and other information like user profile image, username, location, link, crawled information favorites, shares, comments and relating button. The related buttons brings up association related to digital media. The system can relate data and information between digital media and posts through various methods. For example the system can match pixels and colors, bring up the highest ranked digital media or posts, by one or more links or urls, metadata, objects, posts, posts coupled to other posts, followers, followers users or by other methods like explained in and between one or more user and relationships. In some embodiments, methods may include using proximity, or objects, or product. Additionally examples may be taken from a variety disclosed in this invention.

Features with buttons may sometimes show with different symbols that may resemble a phone, envelope, heart, star, magnifying glass, post, user, food, fork, knife, building, city, home, etc. are not meant to limit the scope of the invention. Where symbols and meaning can be changed, or not exist where the equivalent function will still remain. A user may search for keywords along with the digital media, where the photo and keywords are complements to one another and provides additional context to users search query. While also providing additional information and explanation of certain features and action does not limit the ability of various implement/features, features and expanding of features, buttons, etc. from performing or for methods further explained for one button does not limit the function or ability of another button. Buttons and features with buttons vary depending on situations and/or associations. Figures are meant to show examples of various embodiments, while also flow chart illustrations, screenshots, block diagrams, diagrams while also include coupled, links, and paths may include additional or fewer actions and procedures.

Further defining a system local data can be presented to a user for the best results and some of the best deals. For example proximity or near me illustrates a venue to park, steak house, tours, parking deal, show more and something else as well as search options a user can interact with any of these provide by the system, developers, advertisers, third party providers and or third party platforms. Other information and data could be presented to a user like rating, deals, live coupon with and without time restriction, in store coupon, other posts, images, other posts etc.

An example would include sharing something that someone else wrote or posted that was interested (in some embodiments the system defines this as shares within the system whereby may provide a link to the referenced post or digital media). Posts, digital media, content, their party, apps, documents, can be placed or organized into albums or categorized for search. Users within the system can follow favorite, comment and message mostly anything under the umbrella of the system. The system is not classified to one type of interface, for example some deal with buying or selling, others with networking, the disclosed system operates in a different level providing a platform for all types of classifications can run one, furthermore through the system API or portals the community, developers, third-party-partners and like can build and use new and pre-existing system with the disclosed systems. This also includes grouping. The system is accessible through various types of devices and through applications, networks, web-browsers and third-party providers. For example some embodiments may include relative predictions of embodiments where posts, digital media, documents, shares, or other data and information for one or more users that relate to the viewable post or to the user and the searched content, or to any connects or interactions within the system like favorites or follows whereby the information shown to the user is sourced from any combination of embodiment handled by the system and/or managed by the system, and from third-party providers.

Other embodiments may lead to sorting posts, digital media, documents, or information found within the system, this information can be stored, scored and referred to within the system for one or more users. The system in some embodiments operates passively to maintain, manage, while also collecting information. The system is not defined by who can post objects or a schema in base more if it is mathematically possible to create. Posts and digital media referring to other posts and digital media can be compiled, organize, grouped and shown to one or more users based on search relevance. In some embodiments, referenced photos, posts, or digital media show all or just the most scored information relating to the user. Users will also be able maneuver through the user interface to see others who have posted to the original whereby creating an interconnected associations throughout the system aiding with multiple levels of functionality and performance.

The disclosure is also not meant to limit video embodiments relating to aspect ratio which describes the proportions, orientations or dimensions of video, screens and/or sequence of images whereby comprising to form a video. Video formats may also include wrappers and codecs where codecs are used inside of a container and because of this video formats can be confusing. Also a user can create posts at a later date.

FIG. 1 illustrates a diagram of a network 100 where in some embodiments coupled to a system 120 and a user 110, where a user may interact with display 111, memory 112 and/or keyboard 113. The user 110 may interact with one or more user devices that comprise of one or more and/or combination of displays 111, memory 112, and/or keyboard 113.

Figure 2A:
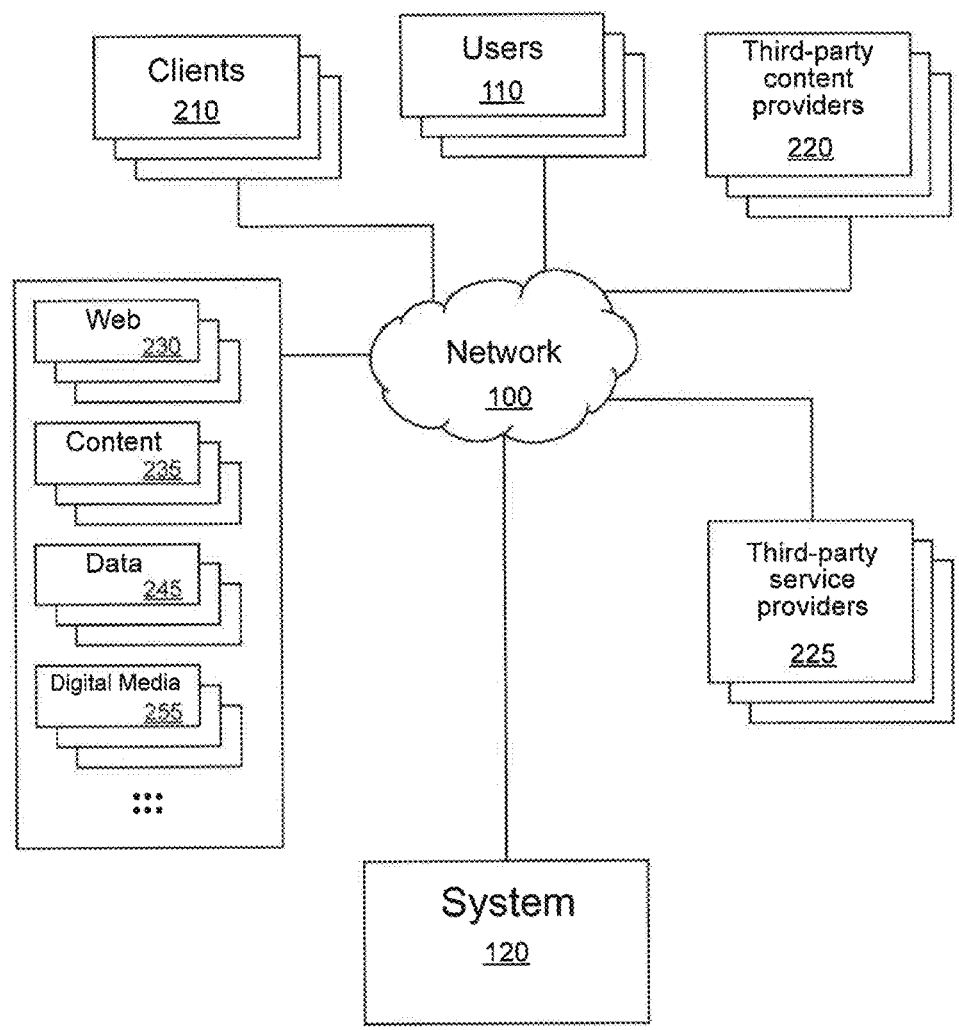
FIG. 2A is a block diagram of illustrating a system communicating or in network with other platforms providers and content.

In some embodiments shown in FIG. 2A a system 120 may be comprised of or, work in parallel and/or support one or more users 110, Clients 210, Third-party content providers 220 and/or Third-party service providers 225 whereby the coupled system in some embodiments operates through as system. The system collects, stores and organized content such as users, user profile, data, information, businesses, inventory, logistics, advertising, articles, digital media such as images, video, sound, documents, and or objects that are created, uploaded, links, posted, tagged, retagged defined, or allocated by one or more users 110, Clients 210, Third-party content providers 220 and/or Third-party service providers 225. A system can also find data 245, Digital media 255, content 235, Web (content, sites, links, information, data, etc) 230. By various techniques and by using one or more information/data or services from a third-party (these techniques include scraping and/or crawling data from the World Wide Web).

Figure 2B:
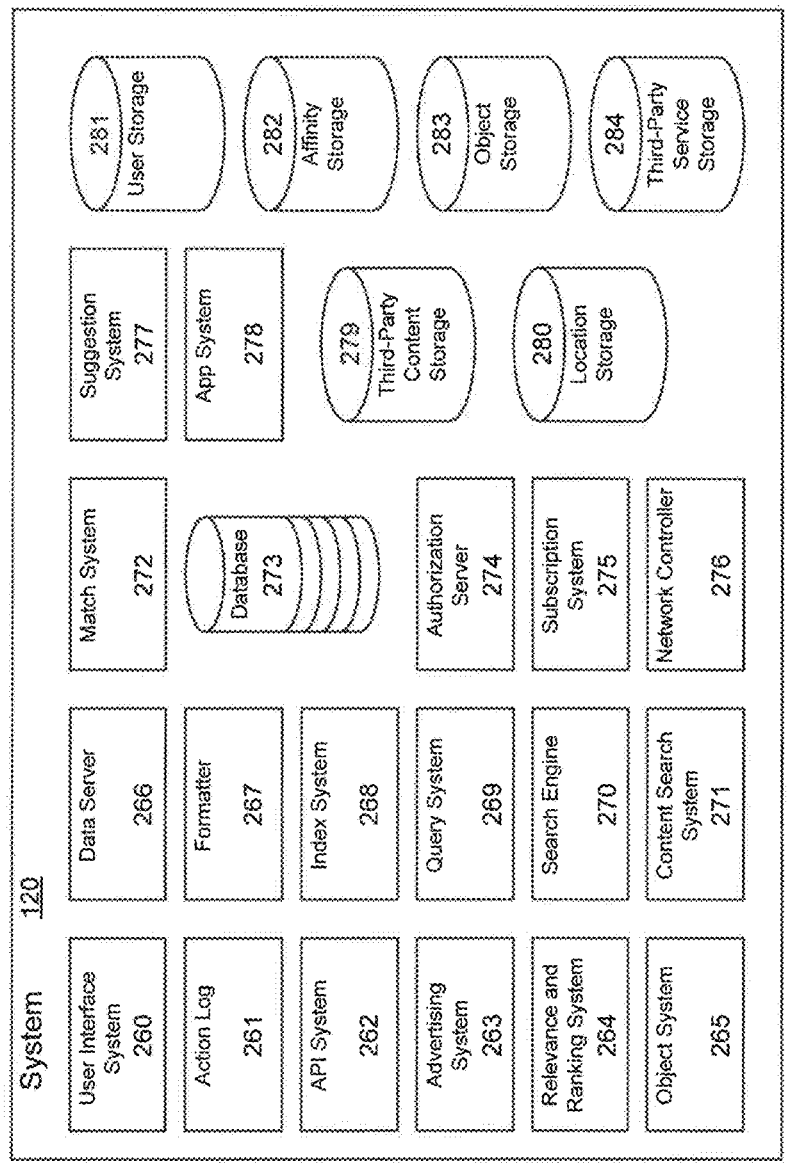
FIG. 2B is a block diagram of illustrating a system.

FIG. 2B illustrates a block diagram of a system 120 that in some embodiments may contain one or more systems, components and/or combination systems, modules, storage, database, servers, and/or software. The said system in one embodiment may include a user interface 260, Action Log 261, API System 262, Advertising System 263, Relevance and Ranking System 264, Object System 265, Data Server 266, Formatter 267, Index System 268, Query System 269, Search System, Search Engine 270, Content Search System 271, Match System 272, Database(s) 273, Authorization server 274, Subscription System 275, Network Controller 276, Suggestion System 277, App (Application) System 278, Third-Party Content Storage 279, Location Storage 280, User Storage 281, Affinity Storage 282, Object Storage 283, and Third-Party Service Storage 284. The system in some embodiment may also include one or more of the same type of server depending on the needs of the system and environment, implementing one or more nodes.

The server system may calculate a user's interaction and response to searched and ranked data information. In any case the system may store and/or refer any data within the system and/or any other component of the system and/or with any other third-party system, provider or client. Data may be stored in a data base where one or more indexes and or reverse indexes used for the communication between users and clients. Components of the systems may include one or more bus, processors, memory, ROM, I/O devices, storage, processing logic, RAM, microprocessors, and interface for communication. The query system 269 embraces a plurality of parts. Examples would include single region query, a multi-region query, query and/or combination of. In some embodiments a query system may include a query optimizer to aid in determining the most efficient way to perform the query. Search engine 270 uses the response from a user query of keywords and digital media (documents, images, video, sound, graphics, commands etc) and retrieves the best results in response to the user query, in some examples results would include webpages, documents, digital images and/or parts of digital images while also including social data as posts, uploads, tags, and retags. Embodiments in the said invention are to provide the best possible results to the user query and interaction with the system. Additionally the system maybe designed and set for users browsing the Internet and/or displaying results that were broadly searched throughout the Internet. Content Search System 271 is a system that searches multiple data types, understanding the similarities of various data types. In some embodiments data is unstructured whereby content may be modified and may include website content. Within the scope of the invention the system may be modified and expanded for use in various ecommerce, logistic, image galleries, forums, applications, etc. other example may include a match system that identifies sorted and unsorted conditions, understanding variations, hits, and landing pages. The said system may include one or more corpus whereby includes large amounts of information relating various subjects. The said inventions would include the World Wide Web and user inputted data, while also including resources and publications of literature, real-time interactions and content, presentations and scientific, etc. In some embodiments a system that browses, finds and stores information from the World Wide Web for example such methods include web crawler, spider, scraping, and/or bots. In some embodiments the web crawler may re-visit or a user/webmaster may choose to be excluded from a crawl list, etc. Within the scope of the said invention the crawling system may include a form of specialized crawling systems that finds data that may not be atomic but could be relevant to some search queries. The said system may also include the fetching of data, information, and digital media while including digital media that comprises of identified parts and/or associations where other embodiments may include predefined criteria for the crawling system. Recognition server identifies objects in digital media and/or digital media as a whole. Model generator specifies search engine index and/or search index structure based on data. While also including logs action logs 261 and/or activity logs, implementation, process, identification, ranking, and/or score, data, information, and digital media while including digital media that comprises of identified parts and/or associations. Whereby including probability (while including hyperbolic, kernel, and/or polynomials) that data, information, and digital media while including digital media comprise of identified parts and/or associations (allocations) will be selected and/or generated for results to user queries. Within the said invention that may additionally include logs, data, models and/or testing including information inputted by one or more user for data, information, and digital media while including digital media that comprises of identified parts and/or associations whereby probability, values and or scores relevant to the data, information, and digital media while including digital media that comprises of identified parts and/or associations is generated and/or stored. Other features may include various types of languages of data, information, and digital media while including digital media that comprises of identified parts and/or associations to where it may incorporate links that are scored and ranked while also being manipulated and rendered. The system may include already manipulated and/or rendered data, information, and digital media while including digital media that comprises of identified parts and/or associations. Trust and/or Authorization server operates as a key server or security for users. The Authorization server 274 is to provide a higher level of security of private/personal information and relationships and are some embodiments separating user data in various layers and location for security. Automatic data collection may run in parallel with recognition server to automatically identify objects data about objects and inputting data directly in various computer and/or server systems. This may also include identified objects with various barcodes, RFID, biometrics, OCR, acoustical, etc. User Interface System 260 provides ways that user may interact and perform queries. Methods may include browsers, websites and/or applications that users can use. The system may also include various indexes that enable digital media to be indexed in various types of arrays and/or the system may also use reverse indexes. Whereby also recognizing parts of digital media and associations. Index may include index mapping, subject index, and/or inverted index whereby data sets are created to retrieve data, mapping raw data, and/or content describing of digital media, while other forms may include web indexing. Media rank may include a weight and scoring system in order to measure the importance of digital media. Data server 266 comprises and may comprise of various embodiments including software and hardware to analysis data, store data, archive data, and/or data manipulation. While also including one or more parallel servers that may also include accounting, billing and an advertising platform. One embodiment may comprise of a correction/context system automatically changes or suggests when a user performs a query search whereby showing response to search queries that aid one or more users in finding the best, most relevant, correct and in context results. A Score system or Relevance and Ranking System 264 may include one or more methods of scoring and/or weighting keywords, digital media, and/or parts of digital media. In some embodiments a reputation, relationship and/or relevance score may be given to various allocations, descriptors and/or factors. The said Relevance and Ranking System 264 may work alongside an Advertising Platform/System 263 or Third-party Advertising Platform/System. Database(s) 273 comprises of one or more databases to a collection and organization of data. In some embodiments one or more databases may include index database, score database, unique ID, image data, digital media database, while also including various database and/or database that handle more real-time events compared to informational data (increasing the response). In some embodiments the system may comprise of storage for one or more features within the system like user settings, affinity storage, object storage, third-party service storage, third-party content storage, location storage and app storages, whereby including any embodiments stored in connection with any and/or combination of systems, servers, or functions of the said invention system 120 and/or API system 262.

Figure 2C:
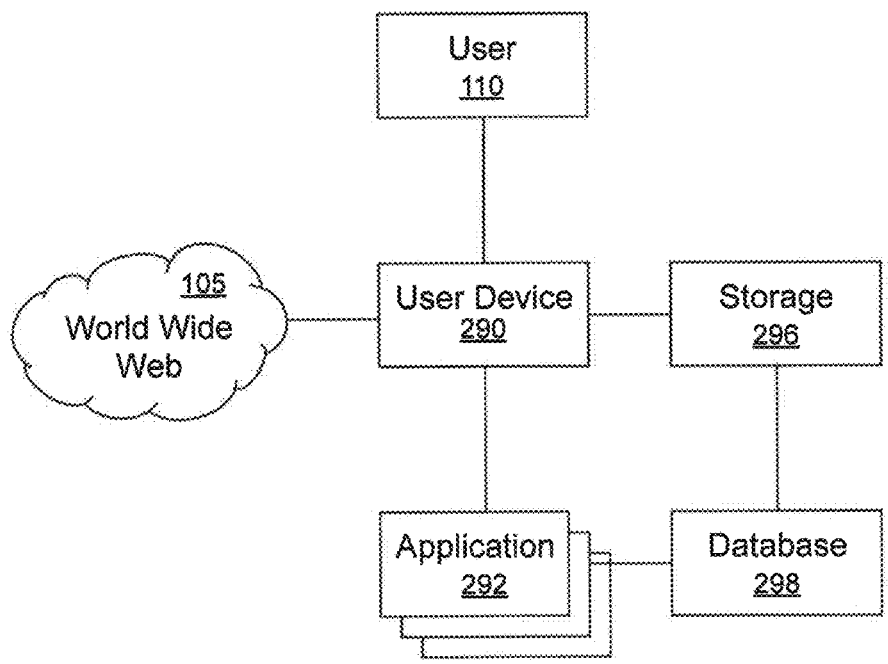
FIG. 2C illustrates a user device couple to one or more networks and components.

FIG. 2C illustrates a user coupled to a user device whereby the user is granted through the user device to send and receive data through a network or the World Wide Web 105. The user device 290 may in some embodiments interact with an application 292 that also uses the user device to connect to a system 120 through the network or World Wide Web 105. When a user interacts with an application 292 through a user device the receiving of data may result in persisting storage 296 in the form of a database within the user device 290. For example if a user searches for an image the user device does not need to connect with the system to retrieve the already accessed image and simple recalls the image from the storage of the phone.

In some embodiment's posts are referred to ObjectTags whereby each object tag may or may not contain content. Content is defined as but not limited to any digital media, file, application, (or as described or referred within the scope if the said disclosure) and/or similar digital content that can be uploaded and/or stored within the disclosed system. In some embodiments a user creates an ObjectTag with content, where the same or another user created another ObjectTag with content. Additionally the same or another user creates a new ObjectTag with content from the ObjectTag. Also the same or another user creates an ObjectTag from the content and/or any part or defined/referred to region of the content. The system may also result in the same or another user creating and ObjectTag with content from the Object-Tag whereby another ObjectTag was created with content from the ObjectTag or from the content of the ObjectTag. Within the scope of the invention or said disclosure while not limiting other embodiment the said system may define methods for referring and or embedding posts (ObjectTags) from Posts (ObjectTag) and from Content.

The said system could be viewable from a browser or mobile device. In some embodiments a user could search for a food item or location. For example a user could input data within a search box, the query is sent to the system wherein one or more results with be presented in the web browser to the user. For Example a map or location, digital media or posts and other relevant information and advertisements. The user can list results and view more on the next set of results.

Figure 3:
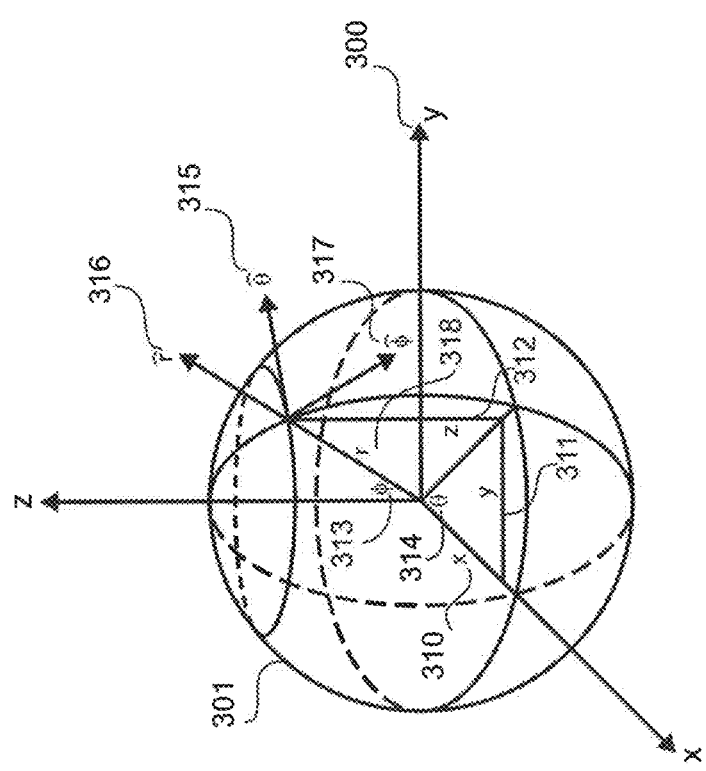
FIG. 3 illustrates a spherical coordinates associating with the system.

FIG. 3 illustrates a spherical coordinates associating with the system. Spherical coordinates in some embodiments are referred to as polar coordinates. The system may use additional methods to use spherical coordinates in when used in relation to corresponding and applicable digital media that relates to video, images, augmented reality, geographic or media viewed that is recorded or media in real-time. In some embodiments the spherical points relates to (radial, azimuthal, polar) where additional components could be added like (radial, azimuthal, polar, time) or (radial, azimuthal, polar, geo-location). In some embodiments the coordinates can relate to a flat surface that corresponds to a 360 degree environment or like. The x-axis, y-axis, z-axis 300 and x plane, y-plane, z-plane describe at the intersection as the origin where points relate to around the origin. Not limited to a sphere 301 but in some embodiments the relation formed by one or more radius. The angle between the x 310 and y 311 plane θ 314 or azimuthal angle and φ the angle out of the plane or polar angle and r 318 the distance radius from a point of origin. In some embodiments the radial position vector 316 and the tangential direction of rotation 315 and the direction of motion or unit vector 317.

Figure 4:
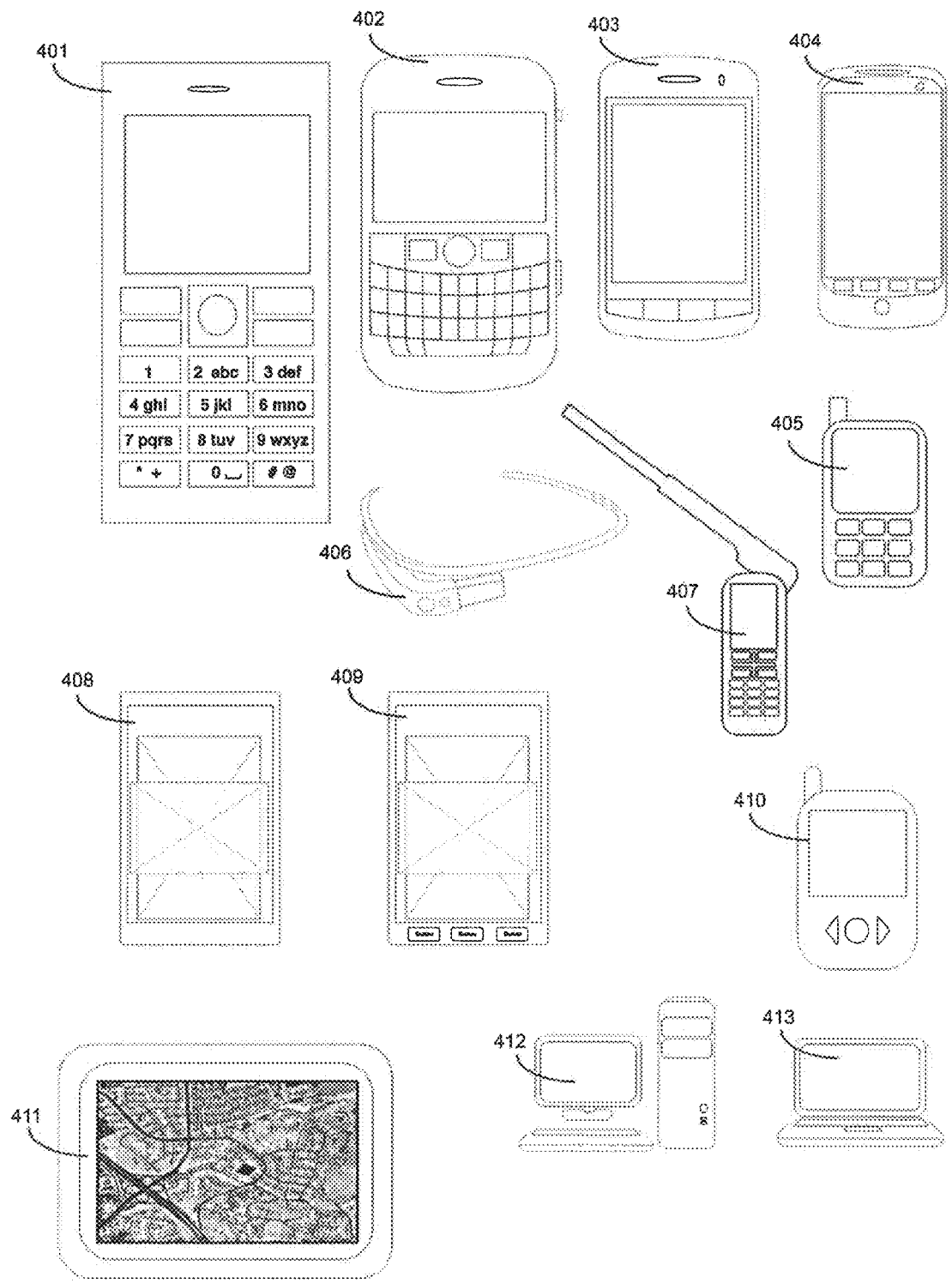
FIG. 4 illustrates a plethora of user devices.

FIG. 4 illustrates examples of user devices that could be used with the invention apparatus. While the said invention may have a focus on devices with touch capabilities, devices with no touch capabilities could take advantage of the invention apparatus. Where users could activate or implement features using their finger, button, scrolling wheeling, mouse, track pad, pen etc., while also not limiting the user to future development of devices that incorporate voice recognition, artificial intelligence, retinal recognition, etc. In some embodiments user devices could represented while not limiting the scope of user device by a touch-less phone (with buttons) 401, a touch-less phone (with scrolling and buttons) 402, touch screen (with buttons) 403, touch screen (with buttons and scrolling) 404, wireless phone 405, headwear accessories (with multifunction capabilities) 406, satellite phone 407, multifunctional touch device (without buttons) 408, multifunctional touch device (with buttons) 409, simple device 410, GPS device 411, desktop computer 412, server, laptop 413, machine, artificial intelligent machine, or Smartphone, etc. Devices connected through the communication network using the Internet, cellular connection, satellite connection, intranet, local area networks, wide area networks, wireless networks, and or related. While also when applicable NFC (near field communication).

One or more posts are created, uploaded, and shared with the system. Posts can be set to public and/or private while also be shared though the system by users who query connected user, users using one or more third party services and/or APIs. User who are connected to the user who posted to the system may be updated in a feed or list of recent activity within the system. Illustrates that a post can be made of any, a combination of, and one or more text, digital media, links, documents, files and data. A user can have a series of posts, or one post coupled to the previous one. In one embodiment the system may classify various posts as Posts, Tags and Retags. While post theoretical can have an unlimited number of tags and more tags coupled to those tags that are then reshaped and/or added to by one or more retags for every tag within the system. In some embodiments posts may refer to tags and tags may refer to retags, furthermore posts may refer to retags.

Figure 5A:
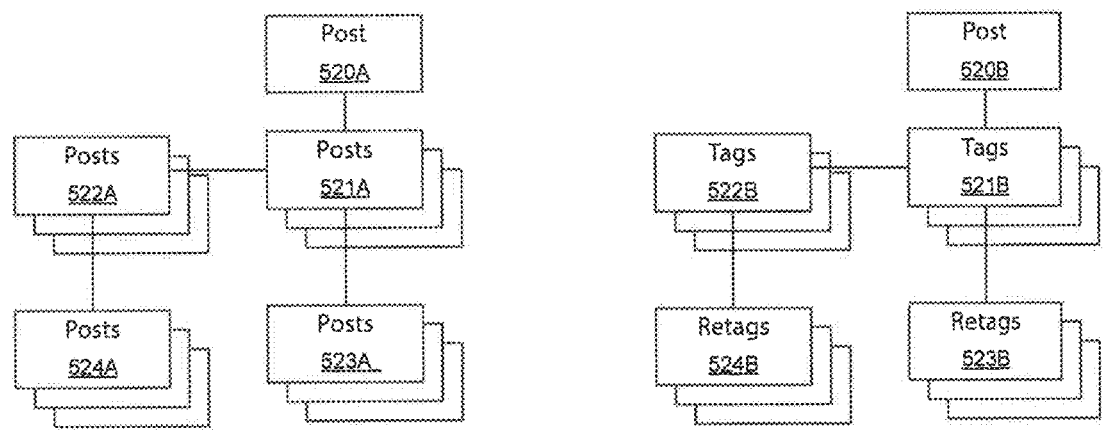
FIG. 5A illustrates a cross comparison between posts, other naming of items similar to posts performed by users or the system.

FIG. 5A illustrates that any number of posts that are part/coupled to a post can have added allocations to further categorize and/or define the post or subject. In the disclosed invention posts 520A of posts 521A and tags 520B of post 521B are identified to be the same, while also including retags 523B of tags 521B from posts 520B and posts 523A from post 521A from a post 520A. Further illustrating tags 522A tagging any part of tags or treated as posts tagging any part of post A where posts can have one or more tags in linking to content provided by users whereby each tag can have one or more retags. One embodiment may also include tags that are linked to a post having one or more tags linking to one or more tags and/or combination of tags. Whereby each tag has one or more retags linking the tags and posts.

Figure 5B:
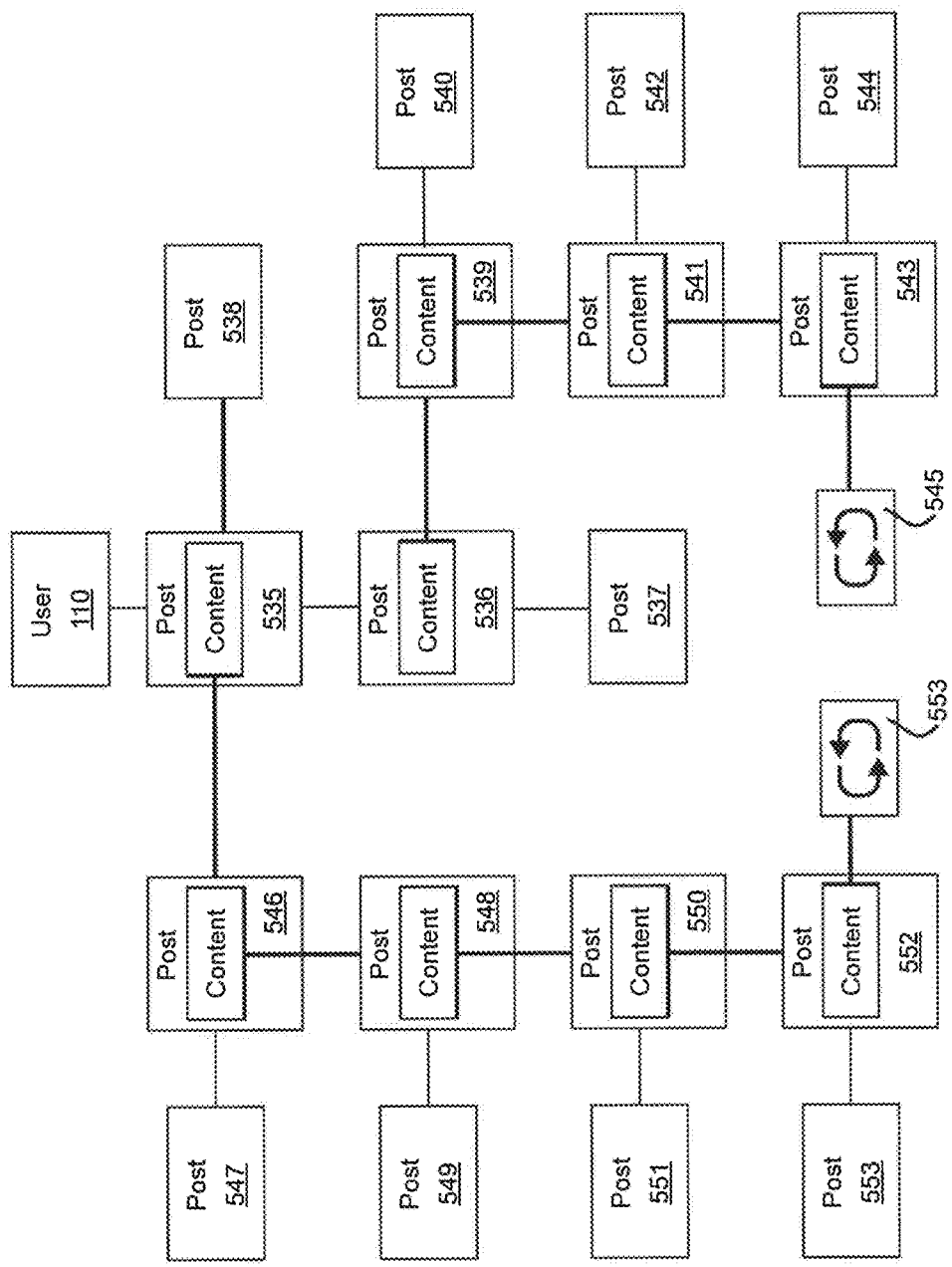
FIG. 5B illustrates the coupling of posts, post generated from other posts, posted generated by any part of a post and shares.

FIG. 5B illustrates how a user 110 can create posts with content 535. In some embodiments the same or another user can create a post with content 536 or a post without content 538 from the post with content 535. Post that contain content (535, 536, 539, 541, 543, 546, 548, 550, 552) may include documents, photos, videos, sounds, graphics, augmented representation, links, events, articles, objects, and apps. In some embodiments a user can create posts that contain content originating from any part of a post with content. For example any users can create post with content or posts without content, post with content 546 was created from the content of post 535, post with content 550 was created from the content of post 548, post with content 552 was created from the content of post 550, post with content 539 was created from the content of post 536, post with content 541 was created from the content of post 539, post with content 543 was created from the content of post 541, and within the disclosed invention with some embodiment post with or without content can be created from the content or parts of content of a post. In some embodiments other data may be include like a region, metadata, location, sequence, frame number, region associated with frame number.

A user can create posts with content where in some embodiments the same or another user can create a post with content or create a post without content from the post with content. Posts that contain content may include documents, photos, videos, sounds, graphics, augmented representation, links, events, articles, objects, and apps. In some embodiments a user can create posts that contain content originating from any part of a post with content. For example any users can create post with content or posts without content, post with content was created from the content of post, post with content was created from the content of post, post with content was created from the content of post, post with content was created from the content of post, post with content was created from the content of post, post with content was created from the content of post, post with content was created from the content of post, and within the disclosed invention with some embodiment post with or without content can be created from the content or parts of content of a post. In some embodiments other data may be include like a region, metadata, location, sequence, frame number, region associated with frame number.

The system in some embodiments can have one or more, and combination of posts, tags, and retags pointing to other posts and tags and retags. Whereby anything within the system as illustrated in can point to any number of Posts, Tags, and retags where data and relationships that are formed by linking can be ranked and scored whereby determining the relevance of every interaction with the system. Further describing a post can point tag whereby linking post to relationship of post, tag, and retag. Added to embodiments within the system a tag being pointed to and pointing to other posts and retags links theoretically unlimited number of posts, tags, retags whereby forming relationships and paths to a number of links, digital media, articles, contents, files or documents that can be shown to one or more users when a user uses a system. In embodiments of the system relationships are scored and ranked whereby showing a various levels of significant to users.

Further defining one embodiment that includes relationships between the same or one or more user's posts tags and retags. For example if two users owned two different threads of posts, tags, and retags each and combination of posts, tags, retags. To specify further post can point/relate to post. Any post, tag retag can be pointed to and pointing to any number of other post, tag and/or retag, for example tag can point to retag and point to post. The tag point to can also have one or more other posts, tags, and/or retags pointing to Tag whereby Tag can point to Tag and retag can point to tag. Any user within or outside the said system pointed to in as a result in any part or combination of any post, Tags, Retags coupled can be scored and ranked to show any relationship or relevance that can be used now or later for any number of correlations like advertising or results and feeds.

Figure 6A:
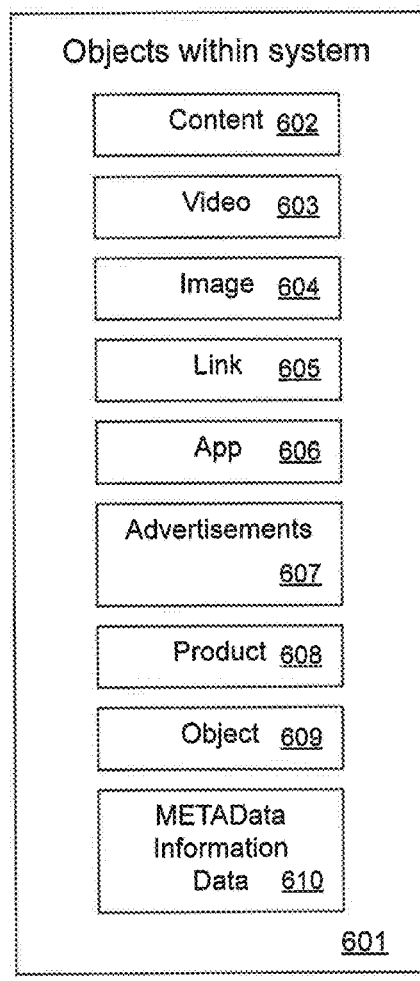
FIG. 6A illustrates a simple representation of objects within the system.
Figure 6B:
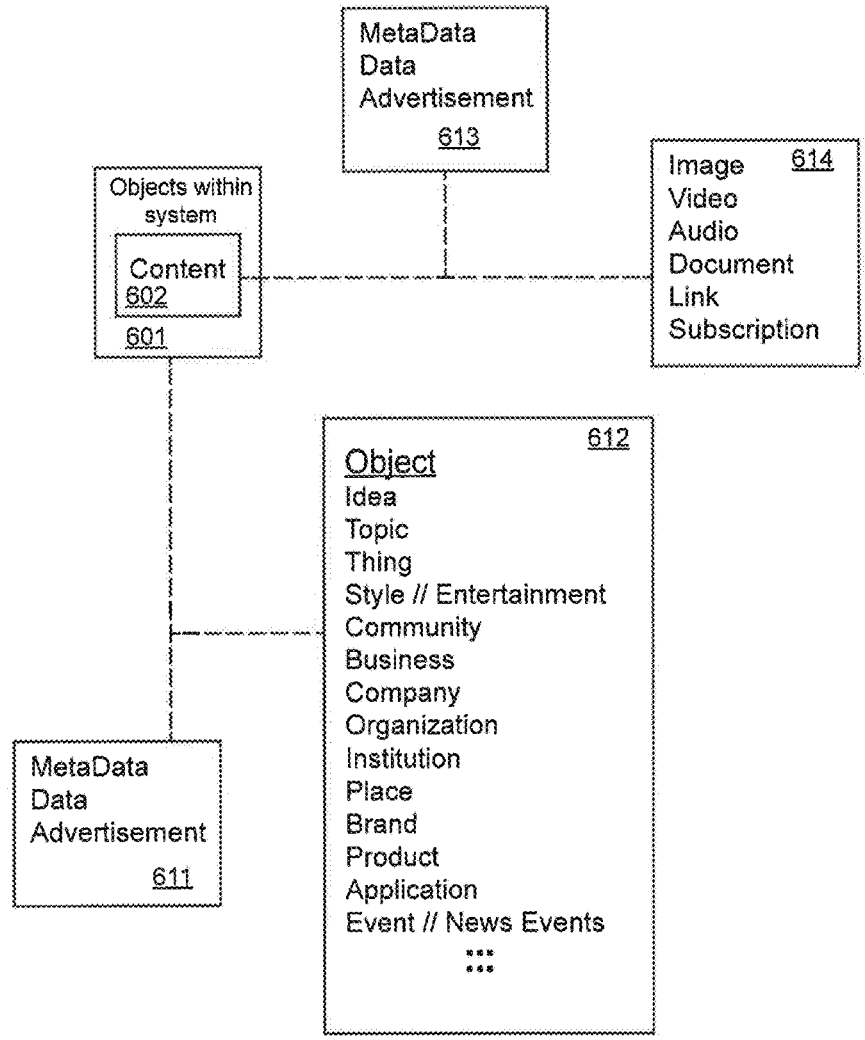
FIG. 6B further illustrates objects within the system, content, data, and objects.

FIG. 6A-6B illustrates in some embodiments an Object 601 that may have one or more additional embodiments such as content 602, Video(s) 603, Image(s) 604, Link(s) 605, application (app, apps, and applications 606), Advertisements 607, product(s) 608, Object(s) 609, metadata, information and data 610. Object 601 are created similar or the same as most posts, and can interact with one or more systems or third party providers. In some embodiments the system may relate information within a post or Object 601 with content 602 whereby content can be one or more and/or combination of image(s), Video(s), Audio, Document(s), Link(s), and Subscription(s) 614 whereby also including one or more other information like Metadata, Data and Advertisements 613. Furthermore, Object 601 containing one or more Content 602 and Object 601 can contain one or more additional objects whereby representing an Idea, Topic, Thing, Style or Entertainment, Community, Business, User, Company Organization, Institution, Place, Brand, Product, Application, Event or News Event, and etc. 612 while also containing MetaData, Data, and Advertisements 611. In some embodiments the Object can refer to items in the content and items within the object tag itself.

In some embodiments a system that is not typically pointing to or is referred to only one reference or association, however the system disclosed can refer to one or more items and bidirectional. For Example in some embodiments users can refer to each and to links, users can refer to and from tags and to links, users can refer to and from images and to links, users can refer to and from links, users can refer to and from videos and to links, users can refer to and from apps and to links, users can refer to and from object and to links. Furthermore tags (or Posts) can refer to and from images, tags (or Posts) can refer to and from Links, tags (or Posts) can refer to and from videos, tags (or Posts) can refer to and from apps, tags (or Posts) can refer to and from Objects, tags (or Posts) can refer to and from entities, tags (or Posts) can refer to and from ads, image can refer to and from images, image can refer to and from Tag, Link can refer to and from Tag, Video can refer to and from Tag, Link can refer to and from Image, and an Image can refer to and from link. Most things within the system can be referred to even when it is not directly linked or the id stored within the object. In some embodiments data indexed/reverse-indexed and data mined can find the similarities among any interaction within the database.

In addition to a system referencing other tags, objects, posts and users queries can look up specific associations identified by ids and/or type, whereby ranging queries for any incoming or outgoing relationships. Other relating information may deal with count or number of something within the system affecting other objects, tags, posts, and users. Clients may also request data from the system whereby adding, persisting to or retrieving from the system. Various other systems may work in parallel to optimize the disclosed system while also migrating or cloning same or similar clusters to handle load spikes. The system measures the load on various parts and facets within itself whereby effectively managing to provide a system that is up-to-date and optimally performed for the end user. Additionally incorporated for the web and mobile devices whereby effectively presenting relationships and associations. Examples of embodiments within a server system disclosed in the invention whereby $Object_a$ is created by a user. $Object_a$ can also contain content. In some embodiments $Object_a$ the can refer to and from a user (the user who created $Object_a$ or another user) where the another $Object_n$ can be created embodying any items found typically for an Object which may also include tags other Object, content, data, favorites, text, comments, etc. additionally $Object_a$ can contain or have text, favorites, data, content, and comments referring to. Comments can also have its own favorites or likes. Content n can have data comments text favorites and other $Object_n$ referring to and from the content n where comments can have favorites and one or more $Object_n$ can be created from the resulting content.

Everything within the system can be searched and indexed whereby organizing and scoring Objects, data, comments, favorites, text and users based on a pleather of collected data and/or ranking and/or sorting.

Objects, tags, posts, can have relationships to and from one or more and combination of other posts, tags objects and retags that are and are not coupled. Similar to relating post, tags, objects and retags with one another, links within each posts, tag, retags, and objects and from websites. The system can either find or support links that relate to one or more post, tags, retags, and objects. For example links can point to any number of Posts, tags and retags and any number of posts, objects, tags and retags can point to links. In some embodiments a user may have posts, illustrations, documents, or images on a website or other applications, whereby the posts, illustrations, documents and/or images are supported by the system. The API (Application Programming interface) allows one or more user, third-party content providers, third-party service providers, clients, advertisers, and developers to access information, apps, content and data from the system. In other embodiments the system my communicate with other systems, other APIs and one or more user, third-party content providers, third-party service providers, clients, advertisers, and developers can send information, apps, content and data to the system. Various User interfaces can function and communicate with the same system may offering different applications for a plethora of reasons and functions. In some embodiments, coupled posts can refer to links and/or have links embedded within and one or more links can have one or more coupled post embedded. For example Post can reflect a relationship with one or more links, additionally links can refer to or show a relationship to other links, while also not limited to linking post that have one or more relationships with links. Post and links can point to links that do not refer to any other post or other link. For example, Post points to links and Links point to Links, Link does not point to any link or posts. In other embodiments, Links can only point to one or more other Links. For example Links and Links can point to each other.

Figure 7:
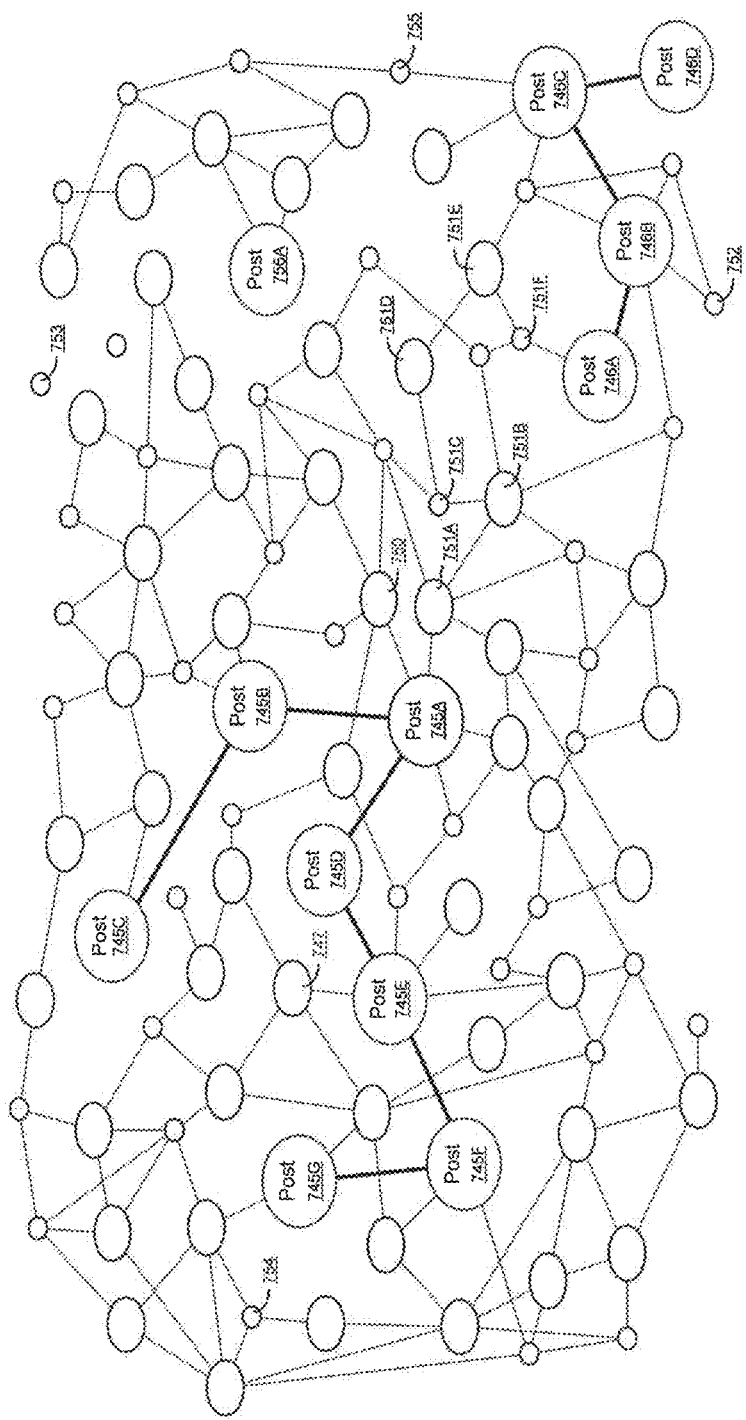
FIG. 7 illustrates one or more posts within a system where posts, data, users, objects, digital media, content, tags, and links may be represented with relationships.

FIG. 7 illustrates one or more posts within a system where posts, data, users, objects, digital media, content, tags, and links may be represented with various relationships. In some embodiments where posts are a simple method for a user to contribute to a system, where in addition to and in most cases the system creates relationships with everything within the system, with third-party providers, developers, content, the world wide web, data and other information. Through a web of data, content, information, digital media, comments, favorites, location objects links posts can relate to one another even if they are not directly coupled by users with the disclosed invention. For example, post 745A can have one or more posts coupled like Post 745B and Post 745D. In some embodiments posts that contain content may allow users to add or contribute to that same coupled post. Where posts that contain text are limited in the value where adding digital media to coupled posts with just text may in some embodiments be restricted through the User interface or various other techniques. In a very simple example non-coupled posts can link to one or more other posts and coupled post by relating relationships found within and though providers, third-party platforms and the world wide web. In some cases through the internet or intranet. For example Post 745A and Post 746A are distance and not coupled, however using various forms of algorithms, methods, while also determining relationships, ranks, scores and metrics, a path or relationship is found connecting Post 745A and Post 746A. Through various forms of data, information, from the world wide web, links, users, activity, involvement, tags, objects, third party providers, developers, third party platforms, subscribers, locations, businesses digital media and content, the path 751A, 751B, 751C, 751D, 751E, 751F can link and/or connect Post 745A and Post 746A. Data, information, from the world wide web, links, users, activity, involvement, tags, objects, third party providers, developers, third party platforms, subscribers, locations, businesses digital media and content (754, 747, 750, 751A, 751B, 751C, 751D, 751E, 751F, 752, 753, 755) can be identified where the disclosed system will try to relate information to, for anything in the past, present (real-time) and future. The system will continuously try to relate information that has associations and no associations 753. Other embodiments represent a single relationship point 755 that links Post 756A and Post 746C.

Figure 8A:
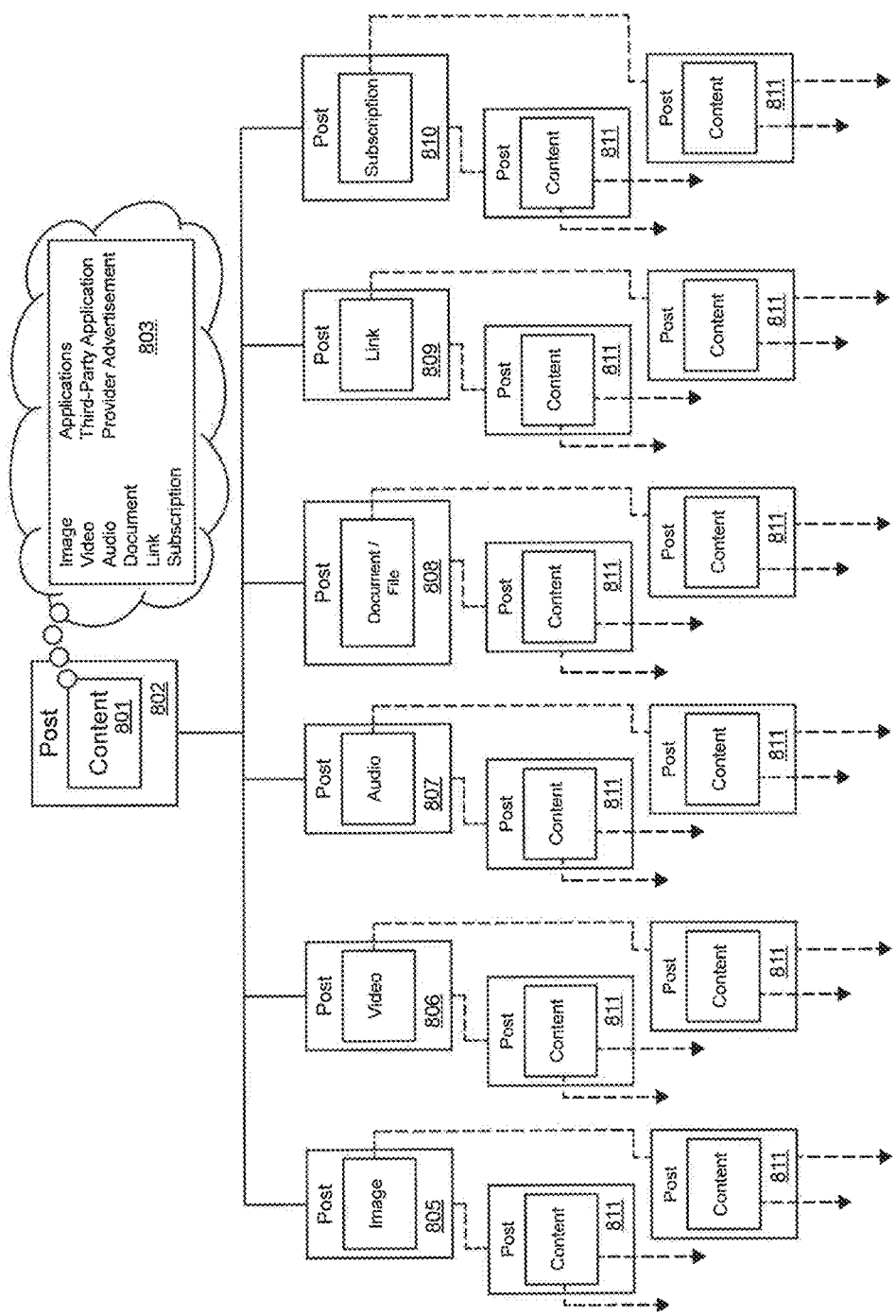
FIG. 8A illustrates a system of post with or without content.

FIG. 8A illustrates that post 801 may contain content 802 whereby both the post 801 and/or content 802 may contain and/or share one or more image(s), Video(s), Audio, Document(s), Link(s), Subscription(s), Application(s), Third-Party Application(s) and/or Provider Advertisement(s) 803. In some embodiments from the post 801 or content 802 of the post 801 a user can create one or more post with no content and with content. For example a post can contain content like an image (or images) 805, video (or Videos) 806, Audio (or Audios) 807, Document/File (or Documents/Files) 808, Link (or Links) 809, Subscription (or Subscriptions) 810 or an application can use any content and manipulate the content whereby defining a class for all users to view whereby the system recognizes as a dynamic content. Through an API and with some set restricts to keep data uniform and without error developers and providers may allow users to create post with Apps within the set Systems user interface or through other providers or applications that interact with the system. Additionally any post created can have one or more other post created from (as a result from) or originating from the post or content.

Figure 8B:
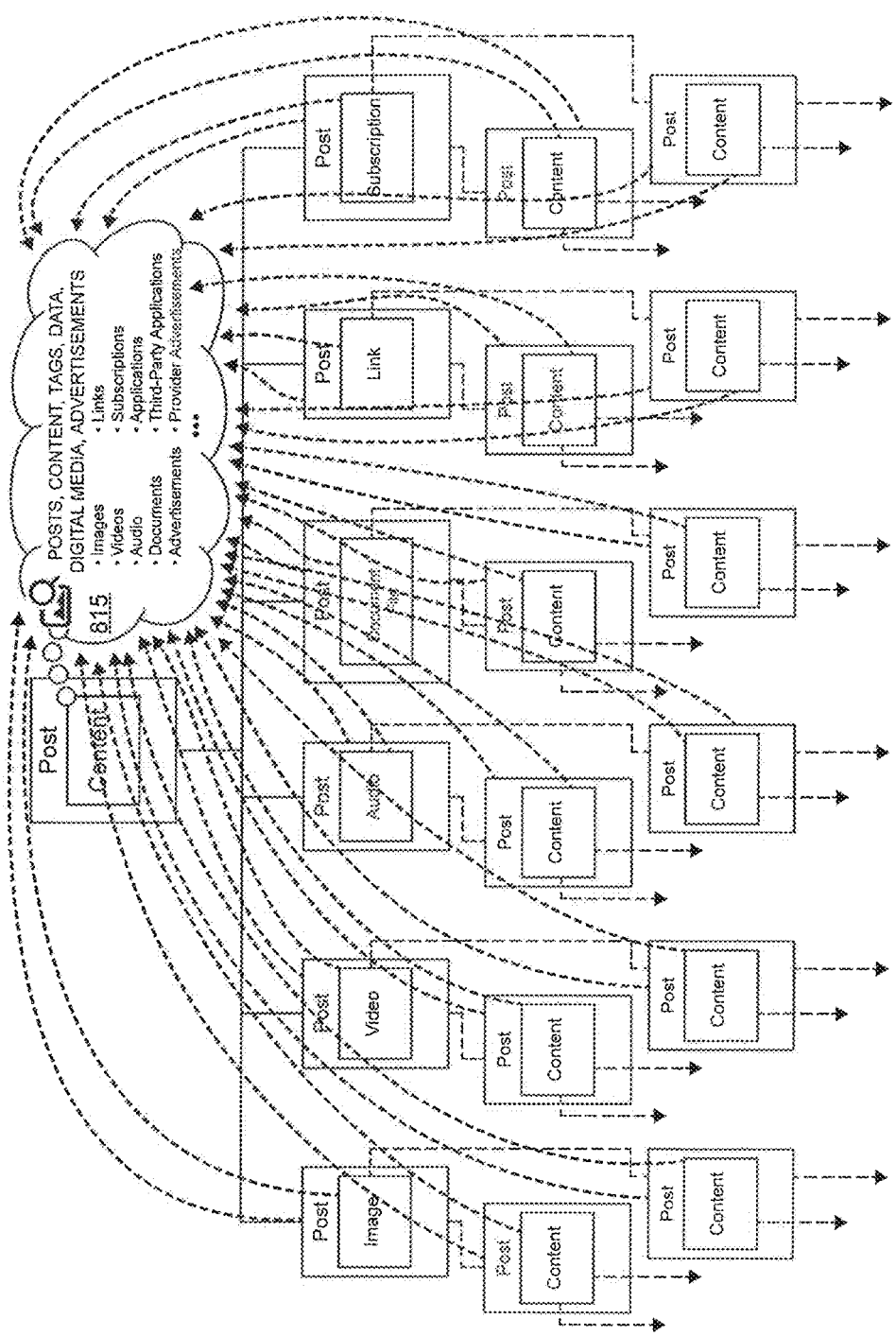
FIG. 8B illustrates a searches within a system that can query one or more posts, content, and users including any entities, objects, links, and places to find information relating to a user.

FIG. 8B illustrates an example when a user searches the system that can query one or more posts, content, and users while also including any entities, objects, links, and places to find information relating to a user, post, content or collections of user, posts, content from and/or may contain one or more posts, content, tags, data, digital media, advertisements, while also embodying one or more or any combination of images, videos, audio, documents, advertisements, links, subscriptions, applications, third-party publications, or provider advertisement 815. The user is presented with while through various interfaces whether in a browser or on mobile devices, whereby on different devices where search and where information relating to a user's, posts, contents or collections of users, collections of posts, collections of content and may also contain one or more posts, content, tags, data, digital media, advertisements.

Figure 8C:
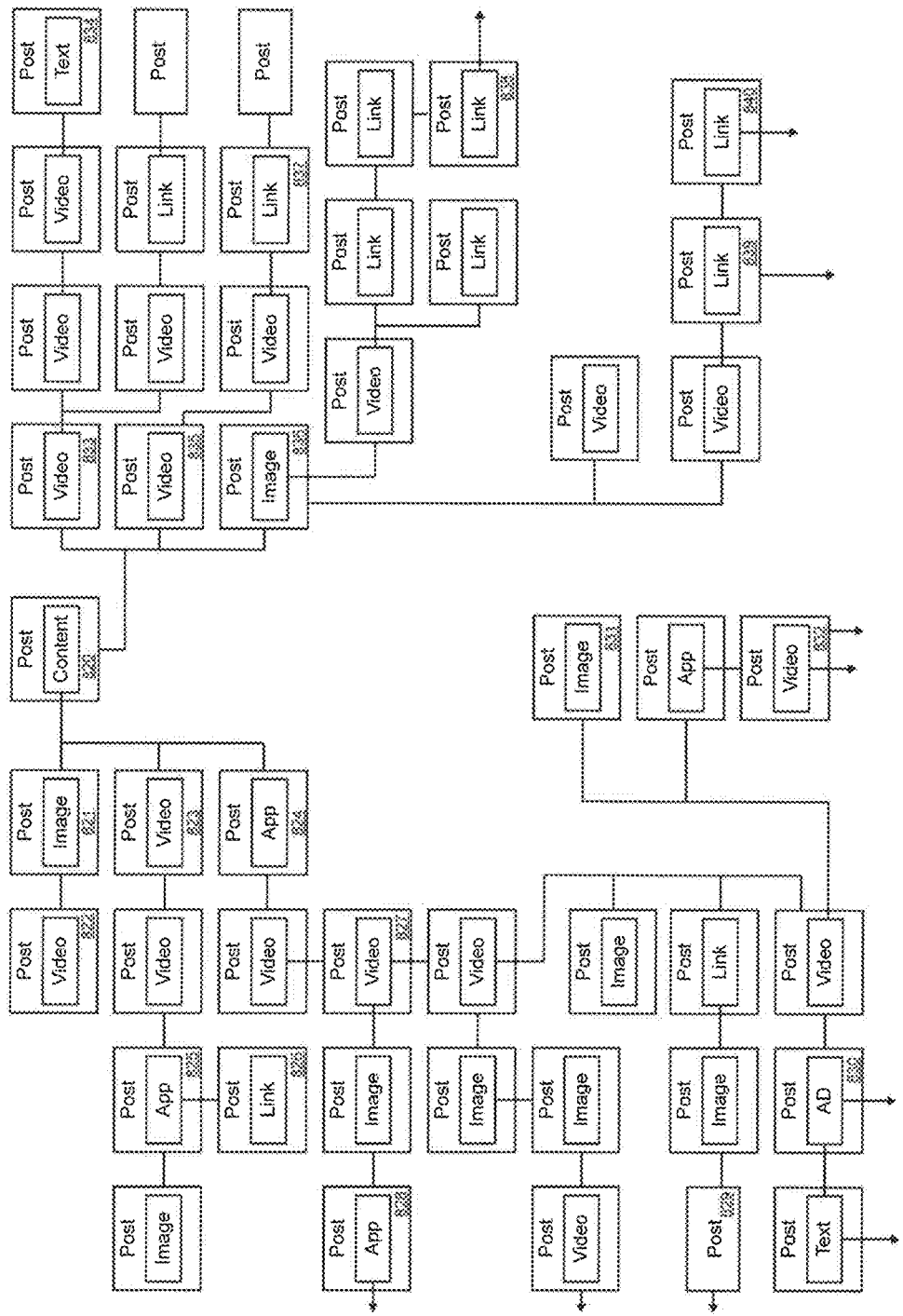
FIG. 8C illustrates simply a system with large number of posts with or without content.

FIG. 8C illustrates simply how the system handles a large number of posts with or without content where any number of posts created from the post or from any part of the post or content. Post 820 containing content whereby one or more post can be created prom the content and then more posts can be created from the new posts content. For example post with image 821, whereby another post is created with video 822 from the post 821. Similarly post with video 823 created form post 820, additionally post with app 824 from post 820 can create one or more posts with or without content. Additionally many posts can be created and progress whereby the system keeps posts organized and content managed. Additionally content can be created from the post and act similarly to when posts are created from content. For example posts with content like video 833, 835 or images 836 can have one or more post created from the post or the content of any post. In some embodiments depending on the user interface and backend systems. In other embodiments the front end user interface may operate with restrictions different from backend systems, keeping the back end flexible to incorporate various third-party platforms.

Figure 8D:
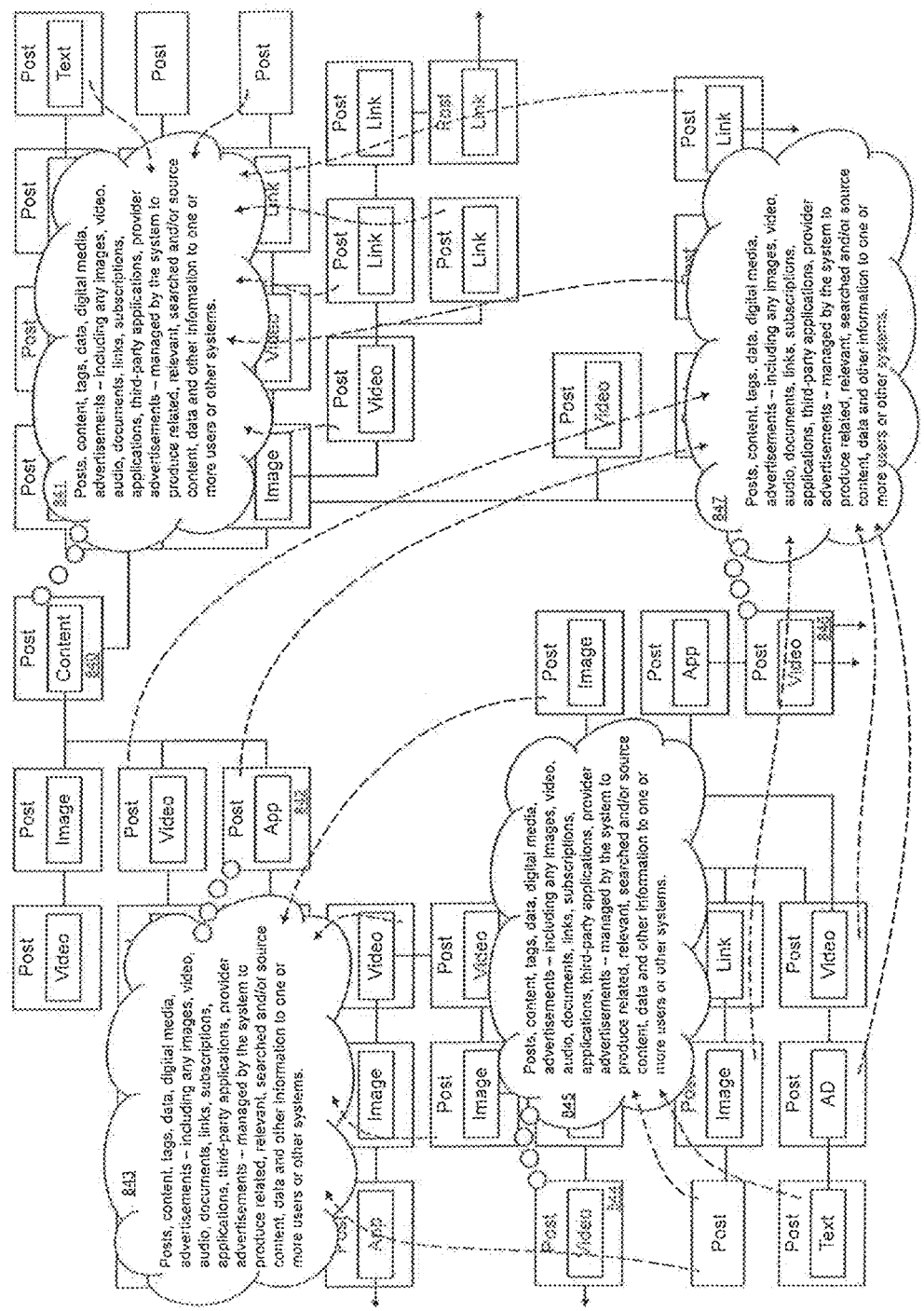
FIG. 8D illustrates searches in a system relating between items.

FIG. 8D illustrates when a user searches for and how a system can relate relations between items. Posts, content, tags, data, digital media, advertisements whereby including any images, video, audio, documents, links, subscriptions, applications, third-party applications, provider advertisements managed by the system to produce related, relevant, searched and/or source content, data and other information to one or more users or other systems 843, whereby any post, content or anything embodied within a post can refer and relate to other post and data within the system. For example the system dealing with any number of posts 840, 842, 844, and 846 while also involving other posts like Posts, content, tags, data, digital media, advertisements whereby including any images, video, audio, documents, links, subscriptions, applications, third-party applications, provider advertisements managed by the system to produce related, relevant, searched and/or source content, data and other information to one or more users or other systems 841, 843, 845 and 847.

A post with a series of tags, tags of tags, and retags from a plethora of users. Relationships between user's interactions aid the system in determining relevance and ranking within a system any interaction within the system. In one embodiment, a post from $user_1$ whereby the post is tagged by one or more of the same user and other users. $User_1$ tags the post by adding in one embodiment images. Other users like $user_2$, $user_3$, $user_4$, tag $user_1$'s post by adding text and images. Any of the said tags can have any number tags and retags coupled to any tag and to the original post. The same user can also tag the same post multiple times, for example $user_3$ tagged the post made by $user_1$. In one embodiment the tag made by $user_3$ of the post from $user_1$ can have on or more tags by any number of users and/or the same user. Additionally, tags of tags may have any number of tags, tags of tags, and retags. For example a tag of tag having one or more retags and another tag of tag having one or more retags.

In some embodiment a possible (relatively simple example) relationships formed by tags and retags or formed by coupled Posts. In one embodiment, the system can score and rank any interaction where images tagged by the same user uploaded a post to the system is ranked higher than other photos tags. Additionally tags with retags show more of a significance than tags without retags. Also tags that one or more additional tags, tags of tags, and retag may show a plethora of relevance and scores to be ranked within the system. Another example for finding simple relating interactions within the system like posts, object, tags, and retags and/or parts or combination of parts would include in one embodiment images or an image of a tag that is scored and ranked and presented to a user. For example a user may select want to find one or more additional posts, tags, retags, contents, users or anything else managed by the system. One or more tags and tags of tags with retags of a post where a user can find relating images associated with the post whereby the system presents these images with the aid of a user interface and found with anything connected to but not limited to the system. One or more images like are presented to a user whereby an example of showing related images is shown throughout the disclosure.

In some examples a post may comprise of one or more image, video, and/or link/web content while also pointing to one or more objects and text. Objects are things in the world that may not be represented by a user. In some embodiments objects could be a city or state, government, holiday etc. An object may be available through an API for or more clients, developers, third-parties whereby defining objects within the system as Objects within the system or Object User within the system (in some embodiments Pixured). In addition to having a post comprise of various text, objects and content a post can also include Metadata, Rich Text, subsets, and data whereby a post is not limited to also including and/or created by digital media, content, links, hyperlinks, meta data, meta elements (metatags), objects, apps, articles, documents, scores, ranking, API, data, backlinks and/or information. Users interacting with the said system can have the opportunity to rate or favorite and comment whereby adding to the post. Users may further define and allocate addition relationships, data and information by tagging and retagging coupled tags. Additionally retags that contain and no digital media (or content) can also point to posts. Shares in some embodiments can also refer post and any data, digital media, content, information, while also including similar embodiments. In one embodiment a system interacting with one or more user(s) through a network focus of a tag may comprise of one or more image, Video, and/or link/web Content while also pointing to one or more Objects and text. In addition to having a tag comprise of various texts, objects and content tags can also include Metadata, Rich Text, subsets, and data. Whereby a tag is not limited to also including and/or created by digital media, content, links, hyperlinks, meta data, meta elements (metatags), objects, apps, articles, documents, scores, ranking, API, data, backlinks and/or information. Users interacting with the said system can have the opportunity to rate or favorite and comment whereby adding to the tag. Users may further define and allocate additional relationships, data and information by posting and retagging coupled tags. In one embodiment a system interacting with one or more user through a network with a focus of a Retag may comprise of one or more links while also pointing to and including one or more Objects and text. Retags may also just be a representation, re-share or a copy of the coupled tag. In addition to having a retag comprise of various text, objects and content a retag can also include Metadata, Rich Text, subsets, and data. Whereby a retag is not limited to also including and/or created by digital media, content, links, hyperlinks, meta data, meta elements (metatags), objects, apps, articles, documents, scores, ranking, API, data, backlinks and/or information. Users interacting with the said system can have the opportunity to rate or favorite and comment whereby adding to the retag. Users may further define and allocate additional relationships, data and information by tagging and posts coupled retag. Additionally retags that contain and no digital media (or content) can also point to posts. Shares in some embodiments can also refer retags and any data, digital media, content, information, while also including similar embodiments.

Figure 9A:
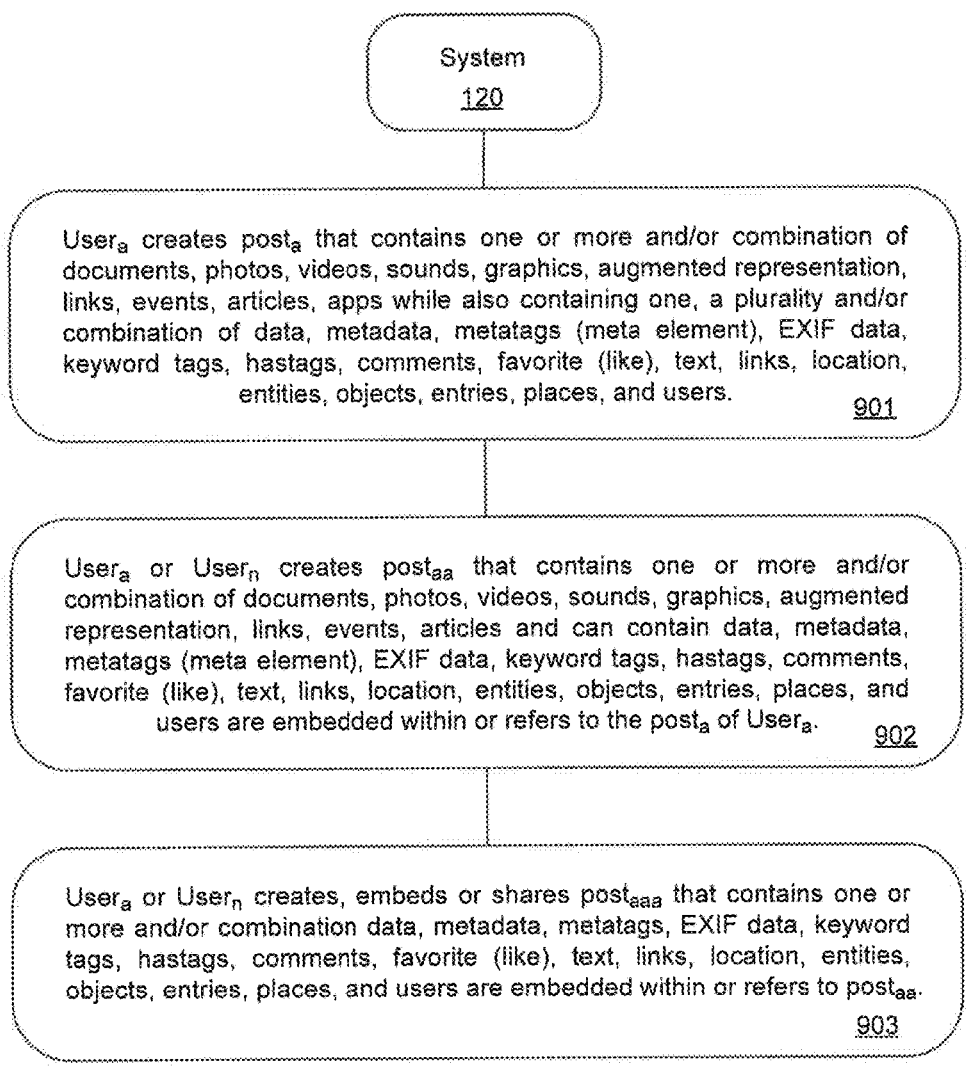
FIG. 9A illustrates in some embodiments where users can create original tags, add tags with content to tags and text to tags.

FIG. 9A illustrates in some embodiments where users can create original tags, add tags with content to tags and text to tags. For example a $User_a$ creates $post_a$ that contains one or more and/or combination of documents, photos, videos, sounds, graphics, augmented representation, links, events, articles, objects, and apps while also containing one, a plurality and/or combination of data, metadata, metatags (meta element), EXIF data, keyword tags, hastags, comments, favorite (like), text, links, location, entities, objects, entries, places, and users 901. Followed by a user creating a tag where a $User_a$ or $User_n$ creates $post_{aa}$ that contains one or more and/or combination of documents, photos, videos, sounds, graphics, augmented representation, links, events, articles objects, and can contain data, metadata, metatags (meta element), EXIF data, keyword tags, hastags, comments, favorite (like), text, links, location, entities, objects, entries, places, and users are embedded within or refers to the $post_a$ of $User_a$ 902. If a user creates a tag with just text from the $post_a$ created by $User_a$ will not allow other users to add content to the post, where in some embodiments the from $post_{aa}$ (with content like digital media), $User_a$ or $User_n$ creates, embeds or shares $post_{aa}$ a that contains one or more and/or combination data, metadata, metatags, EXIF data, keyword tags, hastags, comments, favorite (like), text, links, location, entities, objects, entries, places, and users are embedded within or refers to $post_{aa}$ 903.

Figure 9B:
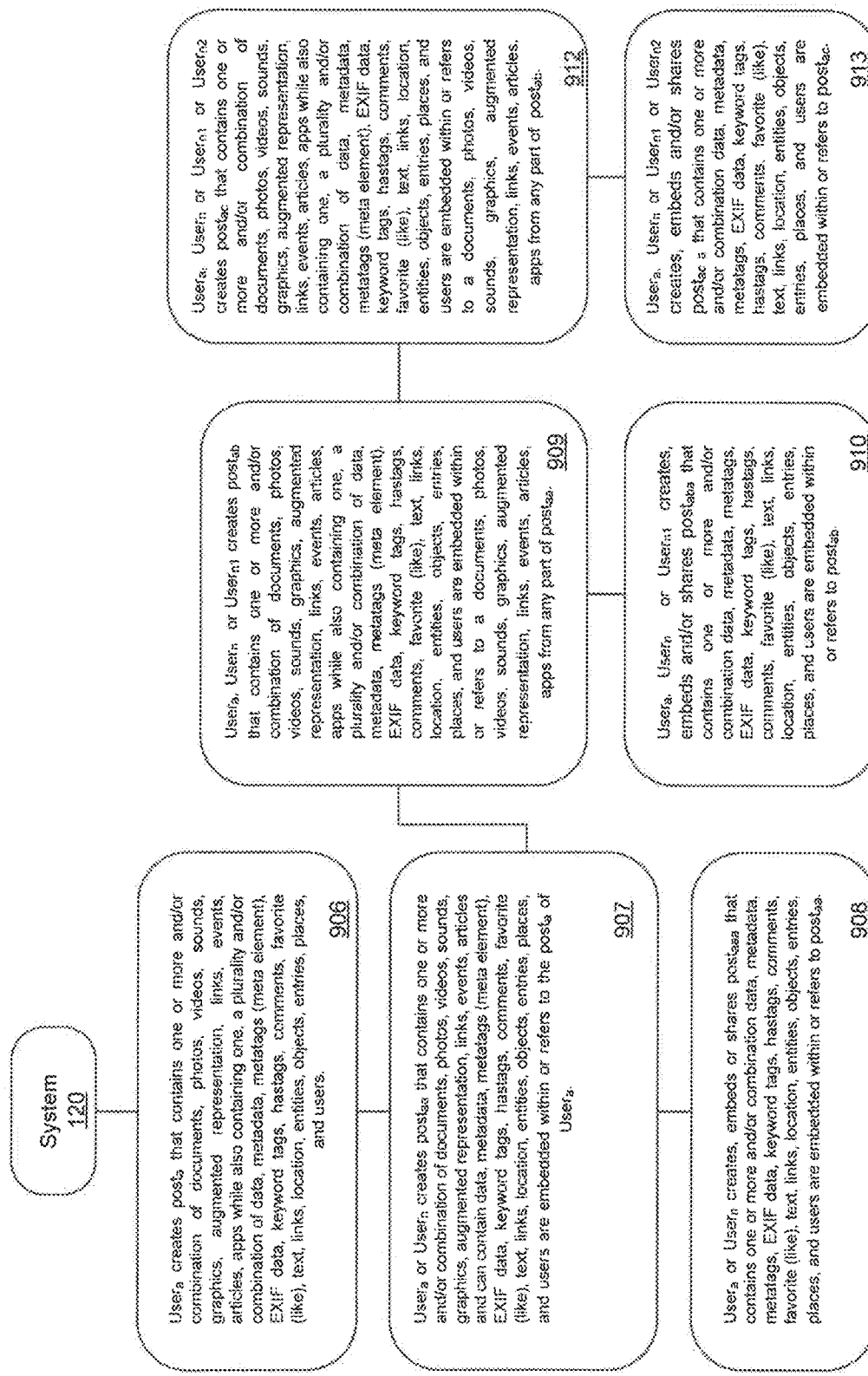
FIG. 9B illustrates embodiments of a user adding content (and/or digital media and data) to any or any part of digital media.

FIG. 9B illustrates a similar embodiment to FIG. 9A with the added embodiment of a user adding content (and/or digital media and data) to any or any part of digital media. In some embodiments adding content (and/or digital media and data) to any or any part of digital media may also include a region or set of regions within digital media. Corresponding regions can relate to a photo, document, video (for each frame or group of frames), and audio.

In some embodiments $User_a$ creates $post_a$ that contains one or more and/or combination of documents, photos, videos, sounds, graphics, augmented representation, links, events, articles, objects, apps while also containing one, a plurality and/or combination of data, metadata, metatags (meta element), EXIF data, keyword tags, hastags, comments, favorite (like), text, links, location, entities, objects, entries, places, and users 906. Additionally $User_a$ or $User_n$ creates $post_{aa}$ that contains one or more and/or combination of documents, photos, videos, sounds, graphics, augmented representation, links, events, articles and can contain data, metadata, metatags (meta element), EXIF data, keyword tags, hastags, comments, favorite (like), text, links, location, entities, objects, entries, places, and users are embedded within or refers to the $post_a$ of $User_a$ 907. Furthermore $User_a$ or $User_n$ creates, embeds or shares $post_{aaa}$ that contains one or more and/or combination data, metadata, metatags, EXIF data, keyword tags, hastags, comments, favorite (like), text, links, location, entities, objects, entries, places, and users are embedded within or refers to $post_{aa}$ 908.

From user $User_a$ or $User_n$ creates $post_{aa}$ that contains one or more and/or combination of documents, photos, videos, sounds, graphics, augmented representation, links, events, articles and can contain data, metadata, metatags (meta element), EXIF data, keyword tags, hastags, comments, favorite (like), text, links, location, entities, objects, entries, places, and users are embedded within or refers to the $post_a$ of $User_a$ 907 in some embodiments $User_a$, $User_n$ or $User_{n1}$ creates $post_{ab}$ that contains one or more and/or combination of documents, photos, videos, sounds, graphics, augmented representation, links, events, articles, apps while also containing one, a plurality and/or combination of data, metadata, metatags (meta element), EXIF data, keyword tags, hastags, comments, favorite (like), text, links, location, entities, objects, entries, places, and users are embedded within or refers to a documents, photos, videos, sounds, graphics, augmented representation, links, events, articles, apps from any part of $post_{aa}$ 909. $User_a$, $User_n$ or $User_{n1}$ creates, embeds and/or shares post aba that contains one or more and/or combination data, metadata, metatags, EXIF data, keyword tags, hastags, comments, favorite (like), text, links, location, entities, objects, entries, places, and users are embedded within or refers to $post_{ab}$ 910.

To continue creating posts from digital media and/or parts of digital media, $User_a$, $User_n$ or $User_{n1}$ or $User_{n2}$ creates $post_{ac}$ that contains one or more and/or combination of documents, photos, videos, sounds, graphics, augmented representation, links, events, articles, apps while also containing one, a plurality and/or combination of data, metadata, metatags (meta element), EXIF data, keyword tags, hastags, comments, favorite (like), text, links, location, entities, objects, entries, places, and users are embedded within or refers to a documents, photos, videos, sounds, graphics, augmented representation, links, events, articles, apps from any part of $post_{ab}$ 912. Furthermore $User_a$, $User_n$ or $User_{n1}$ or $User_{n2}$ creates, embeds and/or shares $post_{ac}$ a that contains one or more and/or combination data, metadata, metatags, EXIF data, keyword tags, hastags, comments, favorite (like), text, links, location, entities, objects, entries, places, and users are embedded within or refers to $post_{ac}$ 913.

In some embodiments a user can create posts aided by the disclosed invention. Illustrated a $user_1$ creates $post_1$ with digital media or content, and may include other data metadata and text and/or $post_1$ is created by an API. From the created $post_1$ with digital media or content, $user_1$ or another $user_n$ creates $post_{1a}$ with digital media or content. Posts that have been created from another post can be shared with no text or shared with text. Post that have been created with text and digital media or content from another post can share the post created with text. In some embodiments $user_1$ or another $user_n$ shares $post_{1a}$ with no text (or $user_n$ creates $post_{1ab}$ shared with no text) or $user_1$ or another $user_n$ creates $post_{1aa}$ with text. $Post_{1ab}$ shared with no text and $post_{1aa}$ with text originate from $post_{1a}$ with digital media. $User_1$ or another $user_n$ shares $post_{1aa}$ with no text. Shares that refer to a previous post can be place within be placed and/or pushed to one or more user, followers, networks, third-party networks, contacts, and/or personal contacts (through messaging, text messaging, email, cross platform, instant messaging or subscription).

$User_1$ or $user_2$ creates $post_{1b}$ with digital media embedded or referring to any or any part of digital media (or content) of $post_1$. From $user_1$ or $user_2$ creates $post_{1b}$ with digital media embedded or referring to any or any part of digital media (or content) of $post_1$. Posts that have been created from any part of another post (or any part of another post may include digital media and/or content) can be shared with no text or shared with text. Post that have been created with text and digital media or content from another post can share the post created with text. Additionally a user can create a post with content or digital media from posts that have been created from any part of another post (or any part of another post may include digital media and/or content). $User_1$ or another $user_n$ shares $post_{1b}$ with no text (or $user_n$ creates $post_{1bb}$ shared with no text) or $user_1$ or another $user_n$ creates $post_1 ba$ with text. $Post_{1ba}$ shared with no text and $post_{1ba}$ with text originate from $post_{1b}$ with digital media. $User_1$ or another $user_n$ shares $post_{1ba}$ with no text. Shares that refer to a previous post can be place within be placed and/or pushed to one or more user, followers, networks, third-party networks, contacts, and/or personal contacts (through messaging, text messaging, email, cross platform, instant messaging or subscription).

$User_n$ creates $post_{1n}$ with digital media embedded or referring to any or any part of digital media (or content) of $post_{1b}$ 929. From $user_n$ creates $post_{1n}$ with digital media embedded or referring to any or any part of digital media (or content) of $post_{1b}$. Posts that have been created from any part of another post (or any part of another post may include digital media and/or content) can be shared with no text or shared with text. Post that have been created with text and digital media or content from another post can share the post created with text. Additionally a user can create a post with content or digital media from posts that have been created from any part of another post (or any part of another post may include digital media and/or content). $User_1$ or another $user_n$ shares $post_{1b}$ with no text (or $user_n$ creates $post_{1nb}$ shared with no text) or $user_1$ or another $user_n$ creates $post_{1na}$ with text. $Post_{1nb}$ shared with no text and $post_{1na}$ with text originate from $post_{1n}$ with digital media. $User_1$ or another $user_n$ shares $post_{1na}$ with no text. Shares that refer to a previous post can be place within be placed and/or pushed to one or more user, followers, networks, third-party networks, contacts, and/or personal contacts (through messaging, text messaging, email, cross platform, instant messaging or subscription).

Posts that have been created from any part of another post (or any part of another post may include digital media and/or content) can be shared with no text or shared with text. Post that have been created with text and digital media or content from another post can share the post created with text. Additionally a user can create a post with content or digital media from posts that have been created from any part of another post (or any part of another post may include digital media and/or content). This method in some embodiment can continuously or indefinitely occur. From these posts created from any part of another post may include digital media and/or content) can be shared with no text or shared with text, in some embodiments can be indefinably and continuously performed as the mentioned in the method and illustrations of and the disclosed invention.

In some embodiments one or more posts may be referred to or embedded in one or more other post or part of other posts. For example a post created with two images can have one post referring to or embedded within the first image and three posts referring to or embedded within the second image, while also not limiting any other information or data relating and post created as a result of a user creating a post from an originating post.

In some embodiments the defined by the functionality of the system and user interface, a user can create $post_1$ with digital media where the same ($user_1$) or another $user_n$ creates $post_{1a}$ with digital media. $Post_{1a}$ refers to or embedded in $post_1$ whereby one or more additional information and data may be stored for either $post_1$ or $post_{1a}$ while also containing but not limited to other information like text, metadata (or meta elements), metatags, links, strings, (or $post_{1a}$ created by meta elements).

From the created $post_1$ with digital media or content, $user_1$ or another $user_n$ creates $post_{1a}$ with digital media or content. Posts that have been created from another post can be shared with no text or shared with text. Post that have been created with text and digital media or content from another post can share the post created with text. In some embodiments $user_1$ or another $user_n$ shares $post_{1a}$ with no text (or $user_n$ creates $post_{1ab}$ shared with no text) or $user_1$ or another $user_n$ creates $post_{1aa}$ with text. $Post_{1ab}$ shared with no text and $post_{1aa}$ with text originate from $post_{1a}$ with digital media. From the share of $post_{1a}$ or the created post $post_{1aa}$, are either embedded or referred to $post_{1a}$. Additionally in some embodiments $user_1$ or another $user_n$ shares $post_{1aa}$ with no text which is refer to $post_{1aa}$. Shares that refer to a previous post can be place within be placed and/or pushed to one or more user, followers, networks, third-party networks, contacts, and/or personal contacts (through messaging, text messaging, email, cross platform, instant messaging or subscription).

$User_1$ or $user_2$ creates $post_{1b}$ with digital media embedded or referring to any or any part of digital media (or content) of $post_1$. From the new post $post_{1b}$ refers or embedded in (and/or data is embedded in $post_1$ or $post_{1b}$) to the $post_1$ with digital media and/or content. From $user_1$ or $user_2$ creating $post_{1b}$ with digital media embedded or referring to any or any part of digital media (or content) of $post_1$, $user_1$ or another $user_n$ shares $post_{1b}$ with no text (or $user_n$ creates $post_{1bb}$ shared with no text) or $user_1$ or another $user_n$ creates $post_{1ba}$ with text whereby both $post_{1ba}$ and shared post with no text refer to or are embedded within the created $post_{1b}$. $Post_{1ba}$ shared with no text and $post_{1ba}$ with text originate from $post_{1b}$ with digital media. $User_1$ or another $user_n$ shares $post_{1ba}$ with no text. Shares that refer to a previous post can be place within be placed and/or pushed to one or more user, followers, networks, third-party networks, contacts, and/or personal contacts (through messaging, text messaging, email, cross platform, instant messaging or subscription). A post created by a post of any part of content where in some embodiments the originating post could be part of another post can refer and or be imbedded.

$User_n$ creates $post_{1n}$ with digital media embedded or referring to any or any part of digital media (or content) of $post_{1b}$. From the new post $post_{1b}$ refers or embedded in (and/or data is embedded in $post_{1b}$ or $post_{1n}$) to the $post_1$ with digital media and/or content. From $user_n$ creating $post_{1n}$ with digital media embedded or referring to any or any part of digital media (or content) of $post_{1b}$, $user_1$ or another $user_n$ shares $post_{1b}$ with no text (or $user_n$ creates $post_{1bb}$ shared with no text) or $user_1$ or another $user_n$ creates $post_{1nb}$ with text whereby both $post_{1na}$ and shared post with no text refer to or are embedded within the created $post_{1n}$. $Post_{1nb}$ shared with no text and $post_{1na}$ with text originate from $post_{1n}$ with digital media. $User_1$ or another $user_n$ shares $post_{1na}$ with no text. Shares that refer to a previous post can be place within be placed and/or pushed to one or more user, followers, networks, third-party networks, contacts, and/or personal contacts (through messaging, text messaging, email, cross platform, instant messaging or subscription).

In some embodiments a user can create posts, creates posts referring to or embedded in any or any part of a digital media or content within a post, posts created from other posts (with or without content) and sharing any post aided by the disclosed invention. In some embodiments $user_1$ creates $post_1$ with digital media where the same $user_1$ or one or more $user_n$ can create a post from the whole $post_1$, any digital media (or content) and/or any part of digital media (or content) contained in $post_1$, post with text and/or shares $post_1$ to one or more networks, followers of the creating user who post and/or share. Where in some embodiment the same user same $user_1$ or one or more $user_n$ can create a post from the whole $post_1$, any digital media (or content) and/or any part of digital media (or content) contained in $post_1$, post with text and/or shares $post_{1a}$ to one or more networks, followers of the creating user who post and/or share. If a post is created with text that same post with text can be shared to one or more networks, followers of the creating user who post and/or share. For example $user_1$ or another $user_n$ shares $post_{1aa}$ with no text.

Additionally some embodiment include the same user same $user_1$ or one or more $user_n$ creates $post_{1n}$ as a result from any digital media (or content) and/or any part of digital media (or content) contained in $post_1$, and a post created with text from $post_{1n}$ and/or shares $post_{1n}$ to one or more networks, followers of the creating user who post and/or share. If a post is created with text that same post with text can be shared 946 to one or more networks, followers of the creating user who post and/or share. For example $user_1$ or another $user_n$ shares $post_{1na}$ with no text.

In addition some embodiment included the same user same $user_1$ or one or more $user_n$ creates a post with text from $post_1$ and/or shares $post_1$ to one or more networks, followers of the creating user who post and/or share. If a post is created with text for example $post_{1aa}$ with text can be shared to one or more networks, followers of the user who created the share. For example $user_1$ or another $user_n$ shares $post_{1aa}$ with no text.

In some cases and in some embodiments, a post and/or share can refer to and/or may embed within one or more users other posts, digital media, content, links, hyperlinks, meta data, meta elements, objects, apps, articles, documents, scores, ranking, API, data, backlinks and/or information. For example a post can refer to the posting $user_1$. Any user that creates a $post_{1a}$ from a post include the same user who created the original post may have $post_{1a}$ and/or any digital media, content, links, hyperlinks, meta data, meta elements, objects, apps, articles, documents, scores, ranking, API, data, backlinks and/or information refer to or embedded in either $post_{1a}$ or $post_1$. Furthermore embodiment may also include post with text, shares of post with text and shares of posts refer to and/or embedded within one or more other posts. For example, $User_1$ or another $user_n$ shares $post_{1a}$ or $user_1$ or another $user_n$ creates $post_{1aa}$ with text where $post_{1aa}$ or share of $post_{1a}$ can refer to or embedded in $post_{1a}$, the share of $post_{1a}$ and/or $post_{1aa}$ with in some cases anything relating to post, any digital media, content, links, hyperlinks, meta data, meta elements, objects, apps, articles, documents, scores, ranking, API, data, backlinks and/or information. Additionally $user_1$ or another $user_n$ shares $post_{1aa}$. User that view the shared $post_{1aa}$ of $user_1$ or another $user_n$ can be referred to $post_{1aa}$ created $user_1$ or another $user_n$ whereby also including in some cases anything relating to post, any digital media, content, links, hyperlinks, meta data, meta elements, objects, apps, articles, documents, scores, ranking, API, data, backlinks and/or information.

Additionally some examples may include a post that can refer to the posting of $user_1$ 934. Any user that creates a $post_{1n}$ from any part $post_1$ and/or any part of any digital media or content include the same user who created the original $post_1$ may have $post_{1n}$ and/or any digital media, content, links, hyperlinks, meta data, meta elements, objects, apps, articles, documents, scores, ranking, API, data, backlinks and/or information refer to or embedded in either $post_{1n}$ or $post_1$. Furthermore embodiment may also include post with text, shares of post with text and shares of posts refer to and/or embedded within one or more other posts. For example, $user_1$ or another $user_n$ shares $post_{1n}$ 948 or $user_1$ or another $user_n$ creates $post_{1na}$ with text where $post_{1na}$ or share of $post_{1n}$ can refer to or embedded in $post_1$, the share of $post_{1n}$ and/or $post_{1na}$ with in some cases anything relating to post, any digital media, content, links, hyperlinks, meta data, meta elements, objects, apps, articles, documents, scores, ranking, API, data, backlinks and/or information. Additionally $user_1$ or another $user_n$ shares $post_{1na}$. User that view the shared $post_{1na}$ of $user_1$ or another $user_n$ can be referred to $post_{1na}$ created $user_1$ or another $user_n$ whereby also including in some cases anything relating to post, any digital media, content, links, hyperlinks, meta data, meta elements, objects, apps, articles, documents, scores, ranking, API, data, backlinks and/or information.

Furthermore some examples from any user that creating a $post_{1aa}$ or sharing from any part $post_1$ and/or any part of any digital media or content include the same user who created the original $post_1$ may have $post_{1n}$ and/or any digital media, content, links, hyperlinks, meta data, meta elements, objects, apps, articles, documents, scores, ranking, API, data, backlinks and/or information refer to or embedded in either $post_{1aa}$, share of $post_1$ or $post_1$. Furthermore embodiment may also include post with text, shares of post with text 953 and shares of posts 951 refer to and/or embedded within one or more other posts. For example, $user_1$ or another $user_n$ shares $post_1$ or $user_1$ or another $user_n$ creates $post_{1na}$ with text where $post_{1na}$ or share of $post_1$ can refer to or embedded in $post_1$, the share of $post_{1n}$ and/or $post_{1aa}$ with in some cases anything relating to post, any digital media, content, links, hyperlinks, meta data, meta elements, objects, apps, articles, documents, scores, ranking, API, data, backlinks and/or information. Additionally $user_1$ or another $user_n$ shares $post_{1aa}$. User that view the shared $post_{1aa}$ of $user_1$ or another $user_n$ can be referred to $post_{1na}$ created $user_1$ or another $user_n$ whereby also including in some cases anything relating to post, any digital media, content, links, hyperlinks, meta data, meta elements, objects, apps, articles, documents, scores, ranking, API, data, backlinks and/or information.

Embodiments where a user post at least one photo, document, object, illustration, video, sound, or anything whereby dictated by the system. According to various embodiments the same or one or more other users can tag and/or add allocations to anything posted by the user. One embodiment a user posts a slideshow of images or document. These images or documents each may have one or more tags or allocation by the same or by one or more other users. For example image comprises of three tags whereby tag corresponds to tag. Another image within the same posts may have two tags (allocation corresponds to tag) or just one tag (allocation corresponds to tag). The number of allocation for a tag is theoretically unlimited, however the system may rank and present information to user based on variables determined by the system. For example variables like and/or combination of but not limiting to location, proximity, favorites retags, tags, the user who tag, user queries, number of visits. Each of these tags can relate to one or more other tags, posts, object, retags, users, etc. Whereby regions defined within and/or any part of any digital media apps or content within a post.

Other systems where one embodiment shows a post coupled by one or more tags by one or more users. For example $user_1$ posts to the system where right away or sometime after $user_1$ tags the post from $user_1$. $User_2$ also tags the post from $user_1$. $User_z$ represents one or more users, and/or same, and relating users that tags and allocation of $user_2$ tag. $User_z$ could also be $user_1$, $user_2$ or any user within the system. From the said tags $user_x$ retags the tag made by $user_1$ and $user_y$ retags (re-shares or reposts) the tag created by $user_1$. Similar examples is that $user_x$ retags $user_2$ tags and from the said tags $user_1$ retags the tag made by $user_z$ 996 and $user_y$ retags (re-shares or reposts) the tag created by $user_z$.

When tagging an image, the area of this tag the format of tag_field should in some embodiments be $[x_1, y_1, x_2, y_2, \ldots, x_n, y_n]$ for $x_i$, $y_i$, they indicates the relative position of point (i). Pixel grids that act as reference points where in some embodiments defining an image. A user using a user device could create a shape, point or polygon defined by a grid of pixels and may define an area within a region. The region could include a method for manually recognizing an association within digital media that may or may not be shown to a user. The corresponding association could be one or more people, places, landmarks, buildings, businesses, restaurants, objects, figures, advertisements, etc.

More than one region in an image where recognizing an association within digital media. The regular polygon or rectangle is defined by four points ((3,3), (3,6), (6,3), (6,6)) creating the boundary for area. and are defined by multiple points for example has a starting point where in some embodiments starts in the upper left corner for example (4,10) and continues to the next pixels ((4,11), (3,12), (3,13), (4,14), (5,15), (6,15), (7,15), (8,15), (9,15), (10,15), (11,15), (11,16), (11,17), (12,18), (13,19), (14,19), (15,19), (15,18), (15,17), (15,16), (15,15), (15,14), (14,13), (13,12), (12,11), (11,10), (10,10), (9,10), (8,10), (7,10), (6,10), (5,10)). In some embodiments a user or system may define a hole within the bounds of the outer boundary of and with the defined region.

In some one embodiment where a user defines a polygon with region. Furthermore a user defines a polygon hole from the polygon defining the region of. A user can further define a polygon region from the polygon with one or more holes.

In some embodiments a rectangular tool draws a square or rectangular selection borders, and the Elliptical tool draws round or elliptical selection borders. Other embodiments may include tools like the Lasso tool which draws freehand selection borders whereby enabling users to make very precise selections. Another example of a tool would be the Polygonal Lasso tool which draws straight-edged segments of a selection border user can create as many segments to draw a selection border. The Magnetic Lasso tool automatically snaps to the edges of objects in digital media making it easy to draw precise selection over borders. A user can quickly select objects that may include complex edges set against high-contrast backgrounds whereby enabling a user to select regions with precisions and speed. Other tools include the Magic Wand tool selects pixels within a similar color range with one click where a user can specify the color range and tolerance and a user would use the Magic Wand tool when you have an area of similar colors. A quick selection tool is used based on color and texture similarity when you click or click-drag the area a user would want to select whereby enabling a user with simple and easy to use methods to mark and automatically and intuitively creates a border. A brush tool or Selection Brush tool makes selections where a user can paint over the area to select or paint over areas you don't want to select. The appearance in the user interface may in some embodiments resemble semi opaque overlay in Mask mode. A user may use one or more than one combination of tools, for example a user may roughly select with a marquee tool, or the quick Selection tool, or other selection tool, whereby allow a user to fine-tune and/or accelerate selecting. Other tools may include the magic extractor making accurate selections based on the appearance of foreground and background areas that a user or system could specify. The tool enables users to place colored marks in regions or areas to select, whereby using the magic extractor enables a user with easy methods to select people or objects from their respective backgrounds. For example, a user can select a fruit, car or bicycle from a photo. All of these tools can be used with a mobile devices and PCs, aided by touch screens, voice controls, and devices like a mouse or styles.

A user can define polygon to specify regions referencing digital media. From a user device an object, construct an overlay of a region in some embodiment black to define the region within a system of corresponding region.

One region defined that may include two or multiple objects for example a banana and two oranges. In some embodiments a user can define a region by a single color, like black where a user can use gestures with a user's finger or instrument like a pen to draw a region. The outcome of a user defining the region will result in shape where one or more user(s) can add tags to or see the indicting user context. Illustrates an array of examples that show a method visually to define multiple regions with multiple objects. For example a banana, two oranges and two apples may in some embodiments be defined by black regions for banana, two oranges and two apples to define the region for banana, two oranges and two apples within various types of digital media.

In some embodiments information may be needed for scale factors or other data like device screen size or ratio while in the same or other embodiment a starting point or distance from a starting point may be included in the schema.

Various user interface example of defining a region within digital media. Depending on the type of tag will define the user's ability and process to tag. In some embodiments the bounding region is an association that is manually and/or automatic recognized within digital media or post. Additionally the bounding region could be understood as just a point that could include the vicinity area surrounding. In some cases automatic recognition processing takes place of the bounding region with could be given value and weight for indoor, outdoor, gender, gender, race, glasses, Facial, Features, head, hair, headwear, clothing factors, eye color, occurrences, date, time location, metadata, person, place, businesses, landmarks, food, object, build, advertisements, complexion, height weather, plurality, logos, brands. In some embodiments servers could give value and weight for being outdoor, male, sunglasses, smiling, wearing a hat, t-shirt, bag-sling-camera bag, etc. Within illustrating four examples of a user interacting with various types of UIs. The region defined by is a simple polygon where users define the region as a square or a rectangle, in some embodiments the system understand four points within the defined user device. Other data may be collected like starting point or screen size whereby taking the ratio and comparing it for user devices. The point defined at is a single point or marker where one point or many points are collated. For example many point may be sent to the system whereby defining the region proximity where the outer (non-visible region to the user) is circular or ellipse shape with the center point of where the user or system selected. A user may also draw by using touch gestures, stylus or other devices or methods to define a shape whereby further defining the shape from the drawing could be made from individual points or polylines. To further define an area a user may use polylines whereby the polylines have endpoints and midpoints to define a shape. In some embodiments, the midpoint is in the middle of a straight polyline whereby a user could select and move (drag) the midpoint to a new position hereby creating an endpoint from the midpoint. From the created endpoint two new midpoint are formed at either end of the new endpoint. The new midpoints if moved can create two more midpoints. To further define the example a database when receiving data from the user device may receive just an array of points with every other point being the midpoint.

In any example points may be taken to calculate the distance from the edge of the digital media or screen size whereby further defining to require depending on situation radius, starting point, direction, distance, defined shape class or other information required to associate a region defined by a user or a system within a post or digital media and apps.

In some embodiments the user will be given optional suggestions to the identity of the association while also providing the ability to search, add an identity while also selecting additional associations. Manually recognizing an association within digital media. The corresponding association could be one or more people, places, landmarks, buildings, businesses, restaurants, objects, figures, advertisements, etc. Features of various identifiers to a corresponding association. In some embodiments the user will be given optional suggestions to the identity of the association while also providing the ability to search, add an identity while also selecting additional associations. When selecting one or more points, the user may associate regions that correspond with one or more associations. This process could take place automatically. An example of association that is manually and/or automatic recognized within digital media. In some embodiments the bounding region could be understood as just a point that could include a vicinity area surrounding. In some cases automatic recognition processing takes place of the bounding region with could be given value and weight for indoor, outdoor, gender, gender, race, glasses, Facial, Features, head, hair, headwear, clothing factors, eye color, occurrences, date, time location, metadata, person, place, businesses, landmarks, food, object, build, advertisements, complexion, height weather, plurality, logos. In some embodiments servers could give value and weight for values such as being outdoor, wall, or a geo tag, 40.67693° N 117.23193° E, or the Great Wall of China, history, 7th century BC, etc.

In some embodiments the user will be given optional suggestions to the identity of the association while also providing the ability to search, add an identity while also selecting additional associations. When selecting one or more points, the user may associate regions that correspond with one or more associations. This process could take place automatically and indicators may or may not be visible. Points or indicators may vary in size shape color representation while also being interchangeable with buttons and buttons with features. One or more points can be interchangeable with buttons and buttons with features, including identifiers and features that enable users to find out more, call, message, share, getting information, directions, saving for later, adding to favorites, advertisements, settings etc. Method for automatic recognizing one or more associations within digital media that could take place at any time. The corresponding association could be one or more people, places, landmarks, buildings, businesses, restaurants, objects, figures, advertisements, etc., the bounding region shows association that is manually and/or automatic recognized within digital media. In some embodiments the bounding region could be understood as just a point that could include a vicinity area surrounding. Additional method for automatic recognizing one or more associations within digital media that could take place at any time. The bounding region shows association automatic recognized and explained within digital media. For example one way one or more server systems analyze bounded regions within digital media. The digital media, associations, and/or bounding regions are converted into digital data that will be made available for the user. This digital may include one or more buttons or buttons with features. The corresponding association could be one or more people, places, landmarks, buildings, businesses, restaurants, objects, figures, advertisements, etc., in some embodiments the bounding region could be understood as just a point that could include a vicinity area surrounding. One or more points can be interchangeable with buttons and buttons with features, including identifiers and features that enable users to find out more, call, message, share, getting information, directions, saving for later, adding to favorites, advertisements, settings etc., while also showing a button with features of various identifiers to a corresponding association. In some embodiments the user will be given optional suggestions to the identity of the association, while also providing the ability to search, remove identities, setting tabs, while also adding an identity while also selecting additional associations. Implementing the remove identity would remove all digital data leaving the digital media unaltered; while the user implements remove identity feature which could may or may not remove the data throughout the server system and databases. The user may organize additional information and configurations.

Objects that are part of the system, these objects are created by one or more users and generated automatically by the system. One embodiment also includes that an object that is automatically created by the system be converted into an object that is managed by one or more users. Additional the reverse can also take place, where an object created by a user and then delete maybe automatically generated by a system. An example of this would be a city the San Francisco where the government would take control in managing some of the information of the city, but if the same example is used for the for the city of San Francisco events, posts, tags, retags and other objects could be shown, represented, and/or linked to the parts and/or the object of San Francisco. Another example of an automatically generated object is one created by one or more users as a whole updating information about something. This could be a restaurant, place, activity, etc., whereby using the example of a restaurant one or more users could create the object for a restaurant where at a later date a restaurant owner could take control over the same object created. Objects within the system could be an idea/notion, topic, Thing, style/Entertainment, Community, Business, Company, Organization, Institution, Place, Brand, Product, Event/News Event and apps.

An object that is coupled within a system to another object whereby objects acts as a parent class for the child class post. In return any post, tag, tags of tags, and retags can refer to and/or embedded in object. In one embodiment an posts may have one or more posts where coupled to that same post, similarly tags and tags of retags whereby every tag has one or more retags and tags of tags also have any number of retags. A post can be coupled to one or more other posts and/or any part or portion of a post (for example digital media or content) may have one or more post couple to the originating post. Post like a web url, website, or web ip that can relate to each other.

The disclosed system or similar systems that analyses various tags, tags of tags, retags posts and objects whereby creating relationships and relevance relating the serving of data and information to an number of users who use the system are result in using the system through an API, Third-Party, developer, and/or client. These relationships between posts, tags, tags of tags, objects and retags in one embodiment can point to and be pointed at by posts, tags, tags of tags, objects and retags. For example post can point to tag while post points to post. Additionally a coupled tag can have a retag whereby tag and retags are not couples but form a relationship. In a chain of posts and posts that can refer to or embedded in another posts can point to other posts within a system. For example, a coupled posts, objects coupled to posts, and other posts coupled with a number of posts coupled. It is important to note that even if posts are not coupled or linked together the system may relate the plurality of non-coupled or linked posts and show any relationship to one or more users, search results, and feed lists. Posts may also refer to one or more links, users and/or objects.

Figure 10A:
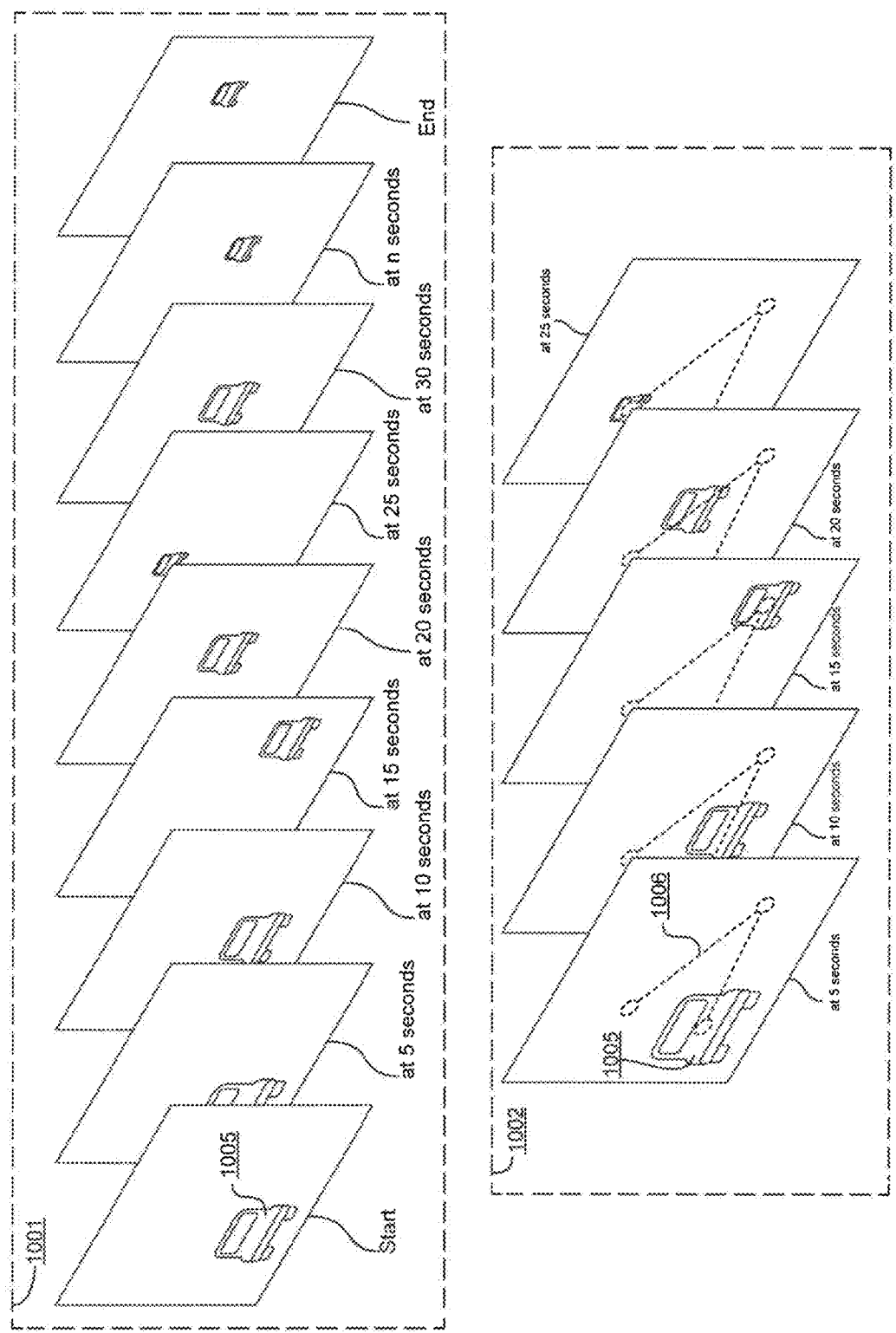
FIG. 10A illustrates a selection of frames from a video.
Figure 10B:
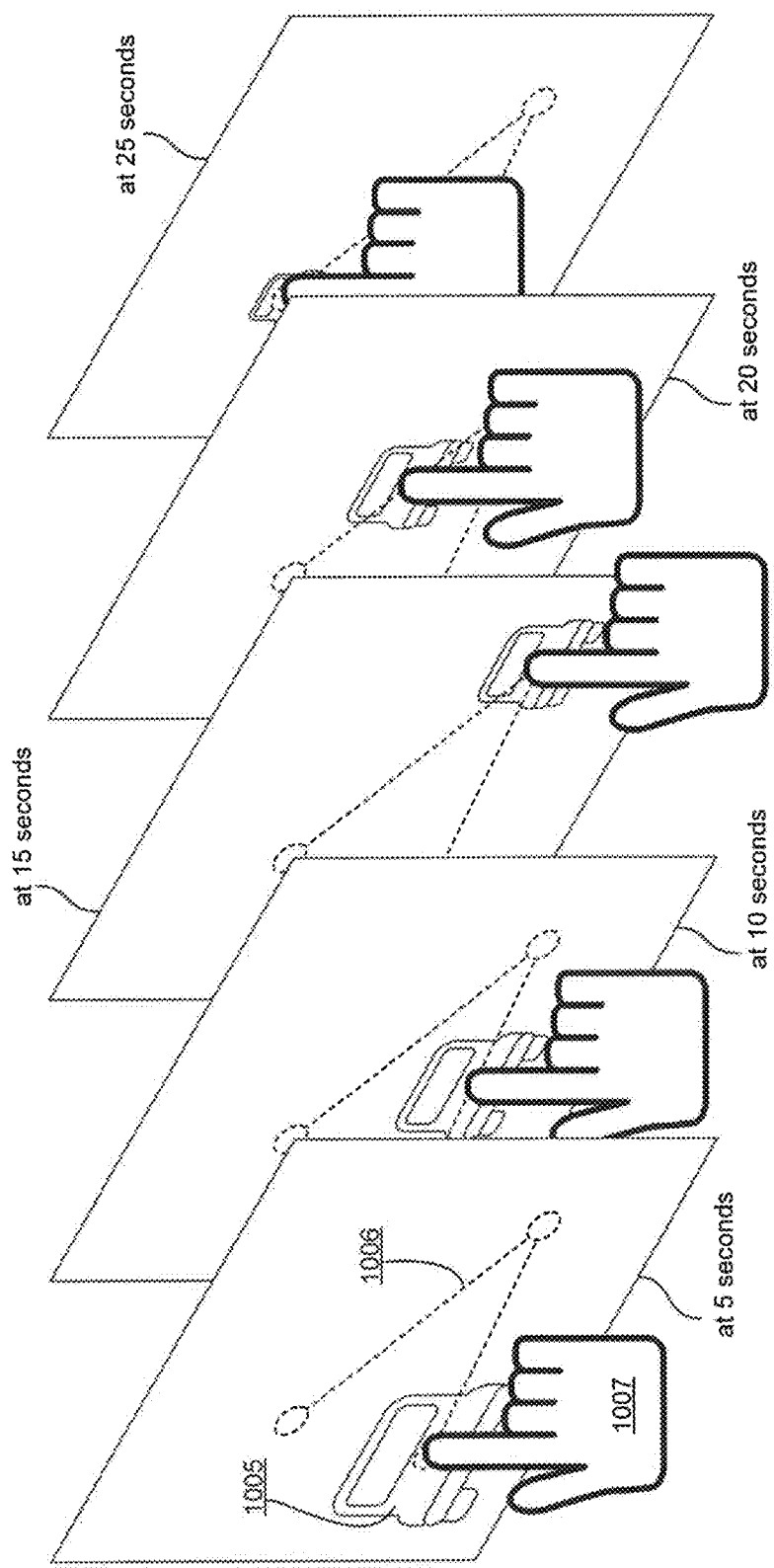
FIG. 10B illustrates methods of how a user using a touch screen, position within content and sequenced frames.

FIG. 10A illustrates a selection of frames from a video. In some embodiments the video is stored in a file server and given an ID and/or reference. Further describing the embodiment a video or similar digital media may show all the frames contained in the video or frames (parts of frames) in various sequences ordered/sorted or unordered/unsorted. However in most cases a video may be defined as a series of photos in order with a time sequence presented to a user in order to show the contents of the video. For example a video (1001) sequence of a vehicle at time n from start to end. In most cases a user uploads the video where the system may give the upload an ID and reference location while also creating a post for the same user or other users to add additional content like descriptions, tags, retags, comments, favorites etc., while also allowing for one or more reference to and from the post or the uploaded image. Reference may be to a link, a photo, object, tag, retag, post, place, entity, subscription, user, app or other allowed by the system, platform partners, clients etc. Additionally other posts (or tags, objects and retags) can be created from the original post or uploaded video. Whereby referencing the same video (digital media) post, or attributes of, while also adding additional digital media (photos, videos, documents, etc.) and any attributes like descriptions, comments, EXIF data, sequenced, sequence reference, etc. Simply a user created another post from the referenced original post or part of the referenced original post. In some embodiments the new post may contain a time sequence and location of the position of the post. A real life example is illustrated in FIG. 10B where a user creates a post with digital media like a video and/or just digital media the same or another user can create a post within any part of the digital media. In some embodiments the post is created referring the frame sequence and/or location (position) of the desired object. For example 1002 in FIG. 10A illustrates something that is tagged within part of a video with a sequence of 5 seconds through 25 seconds and the corresponding position.

In FIG. 10B illustrates a method of how a user using a touch screen can identify the location and the sequenced frames. In some embodiments a user enabling and tagging an object 1005 in a video, using a mouse, gestures, or touching (enabled by the device whether it will be a touch-screen device or other devices that we require external devices or sensors to define a tagged region. As the video passes through each frame the user defines the location 1006 of the tag for the allocated frame. In some embodiments depending on the function, user interface and user interactions the use may or may not be required to keep touching a screen, keeping a mouse enabled, not look away or other methods not restricting a user from defining a region and/or frame sequence or series of frame sequences 1007. For example the system may limit or not limit the ability for a user to define any or any part of the video or electronic medium. Additionally a simple illustrations of a use maneuvering and using the user interface on an allocated device starts the tag at 5 seconds and ends the tag at 25 seconds, in this example the user continues to the tag for every frame (where in some embodiments the user using a touch screen does not lift his or her finger off the screen) where the user defined one tag through the interval. In other embodiment the user may just have to follow an object and defining tags with eye movements or voice commands. Other implementations may include the aid of additional systems, software or third-party providers that aid the user in tracking or identifying objects to tag. Other embodiments may include tagging an objects 1005 may result in a creation of a post where the user can define the region in separate intervals at different or the same time. For example a user interface with some practical implantation would allocate a user to define a region where from the defined region the user can create one or more post to be created into the defined system.

Figure 10C:
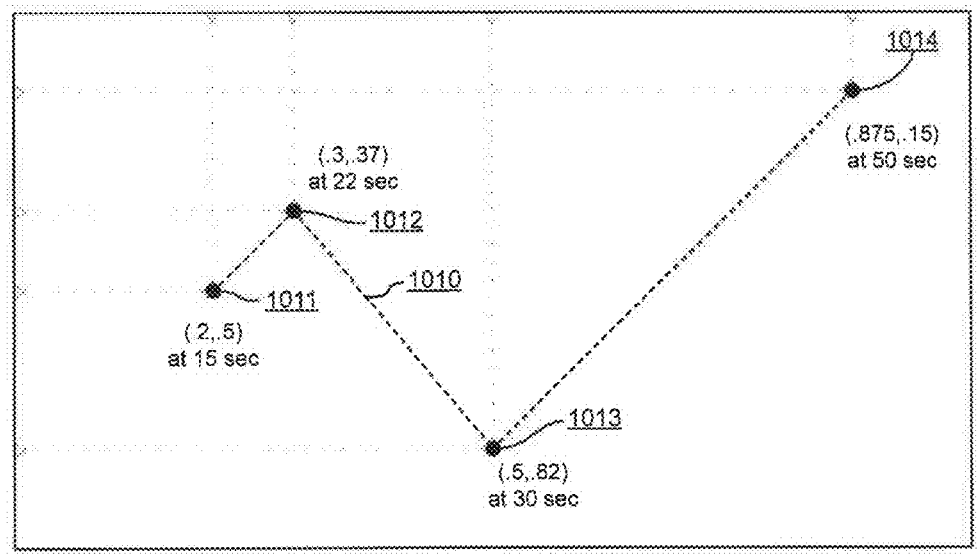
FIG. 10C illustrates objects with tags within a video, with position within content and sequenced frames.
Figure 10C:
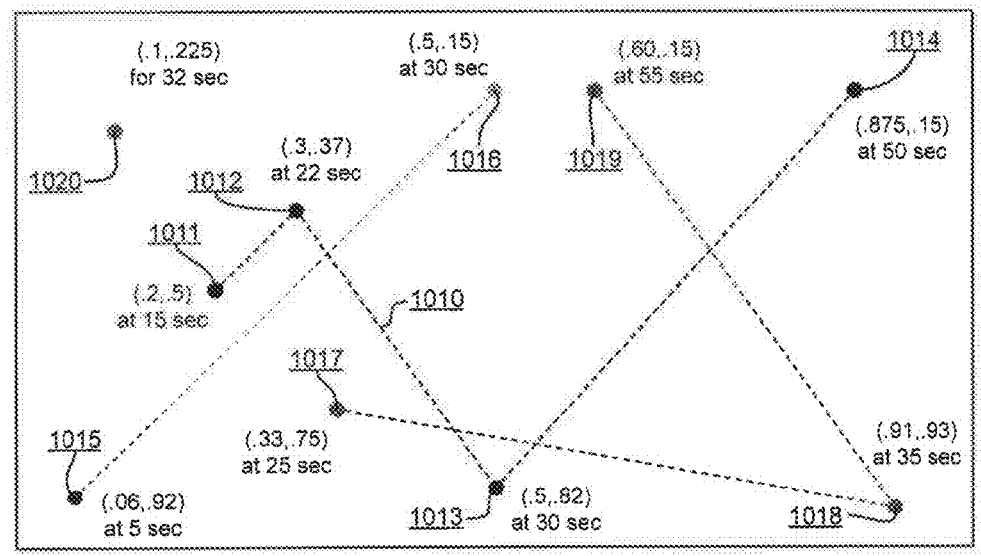

FIG. 10C illustrates the object with a tag in a video. The user interface and how the tags are presented in videos may vary depending on technology, methods and user preference and in no instance this disclosure may prohibit or limit a user tagging. FIG. 10C illustrates a simple representation of the method used to tag within or any part of video (sequence of image that make up a video) 1011, 1012, 1013, 1014 (1010). Illustrating 2 dimensionally how a tag moves across the x and/or y direction while also in some embodiments a timing component. Not limited by the preferred technology or actual method of storing the location within the video and the frame position. The position is represented in some embodiments as actual coordinates of pixels or taking the ratio position of the x in the x direction and the ratio of the y in the y direction. Another component may be added for time or the corresponding frame sequence within the ordered series of frames the make up a video. For example using the method of taking the ratio in the x direction or the ratio in the y direction, first we must calculate the points relative to the screen size, image size, video size, side used in the application or system while also including orientation. Taking the ratio if the position in the x direction is 384 (pixels from the left side of the screen) and the total number of pixels in the x direction is we can simply divide 384 getting the results of 0.3 (for the x direction). Performing the same process for the Y direction, Taking the ratio if the position in the y direction is 266 (pixels from the left side of the screen) and the total number of pixels in the y direction is 720 we can simply divide 266 and 720 getting the results of 0.37 (for the y direction). By using proportion, and storing in integers or floats the system may operate with multiple platforms and user device while also allowing for one or more third-party providers to also have the same flexibility. Adding a timing component to the system to indicate the correction frame number or relative time to the video and the corresponding position or positions that the user has selected. For example from the position at 1011 the user started with (0.2, 0.5) at 15 sec and at 22 sec the user had moved to position (0.3, 0.37), where every position in between (0.2, 0.5) and (0.3, 0.37) is stored with the corresponding timing component.

Where for every position and frame we can store the values for tag_field and frame sequence. Additionally the method of storing can change to be implemented in other technologies and methods. The example above illustrates a representation of using mongoDB but can also be modified to be stored in MySQL or PostgreSQL format, therefore not limiting the function of storing the positions and sequence to refer or embedded digital media, tags or posts to any other tag, post, video or digital media.

In some embodiments the tag may be stored 3 dimensionally where the user can define a 2-dimensional or 3-dimensional tag and create a post. In other embodiments a use and remove certain polygon shapes from within another polygon. For example tag (0.2, 0.5) at 15 seconds, (0.3, 0.37) at 22 seconds, (0.5, 0.82) at 32 seconds, (0.875, 0.15) at 50 seconds or one or more tags, posts, videos or digital media can be referred to and/or embedded within a video. Depending on the user interface and device anything embedded and/or reference in a video can be shown to the user and/or represented in a multitude of techniques or ways. Other examples include employments that would include (0.2, 0.5) at 15 seconds, (0.3, 0.37) at 22 seconds, (0.5, 0.82) at 32 seconds, (0.875, 0.15) at 50 seconds, (0.06, 0.92) at 5 seconds, (0.5, 0.15) at 30 seconds, (0.33, 0.75) at 25 seconds, (0.91, 0.93) at 34 seconds, (0.60, 0.15) at 55 seconds and (0.1, 0.225) for 32 seconds. The system does not limit from post or object tags can be made up of various types of posts or tags. For example an object that is a tag, can be classified into various types of posts or tags. In some embodiments the system may be allocated a choice that ImageTag, LinkTag, TextTag, VideoTag, AppTag, ArticleTag, DocumentTag, etc. where in some embodiments further contain tables for other classification or system documents like image, video, file, document, application or third-party classification, etc. the system may also limit or properly maintain a schema or structure of the system for tagging (or posting) or embedding posts, tags and/or digital media (and digital data) within digital media. Other embodiment may include an ImageTag requiring at least one image or a video may require one video and one image. All of which is to maintain a scene of structure within the system. Additionally how the system incorporates data fields is defined as relating technologies, platforms or design schema. For example in some embodiments, data for a video can be stored for the position $(x_n, y_n)$, x is the content (for pixels or ratio) in the X direction and in the Y is the content (for pixels or ratio) in the y direction, n is the corresponding set i.e.: n=1, n=2, n=3 etc. A third field classified as time $z_t$ or $t_n$ can be in the same data set i.e.: tag_field=listfield for float $(x_n, y_n, t_n)$ or with separate field i.e.: tag_field=listfield for float $(x_n, y_n)$ and tag_field_time=listfield for $(t_n)$. As the technology progresses the system in some embodiment will incorporate Spherical Coordinates. Spherical Coordinates would include any of the following parameters, calculated component or originating from $x_n$, $y_n$, $z_n$, $r_n$, θ-hat, r-hat or φ-hat and a component for time $t_n$.

Figure 10D:
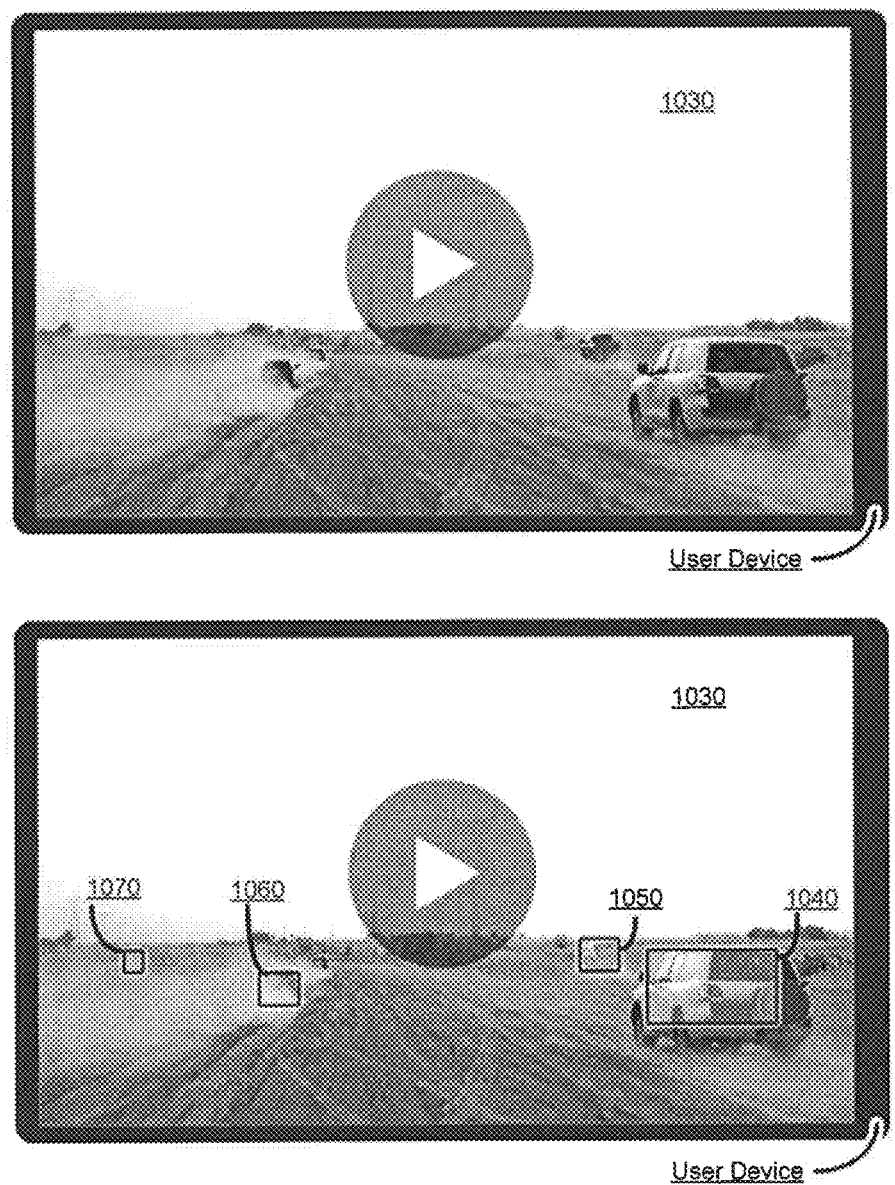
FIG. 10D-FIG. 10E illustrates how a user in embodiments may view one or more posts within digital media like video, motion pictures, and clips.

FIG. 10D illustrates how a user in embodiments may view one or more posts within digital media like video, motion pictures, and clips. For example from a user device video 1030 shows an embodiment of a desert safari, posted within the system or embedded from a third-party provider. Embodiments allow for regions that contain one or more posts and data. For example from the user device video clip 1030 with one or more regions tags, associated and/or identified 1040, 1050, 1060, 1070. The system can perform defining/identifying regions automatically or by user, (by users as show in FIG. 10F) which by defining the location within the video and another variable like frame rate or frame number to define the region for various parts of the video or clip.

Figure 10E:
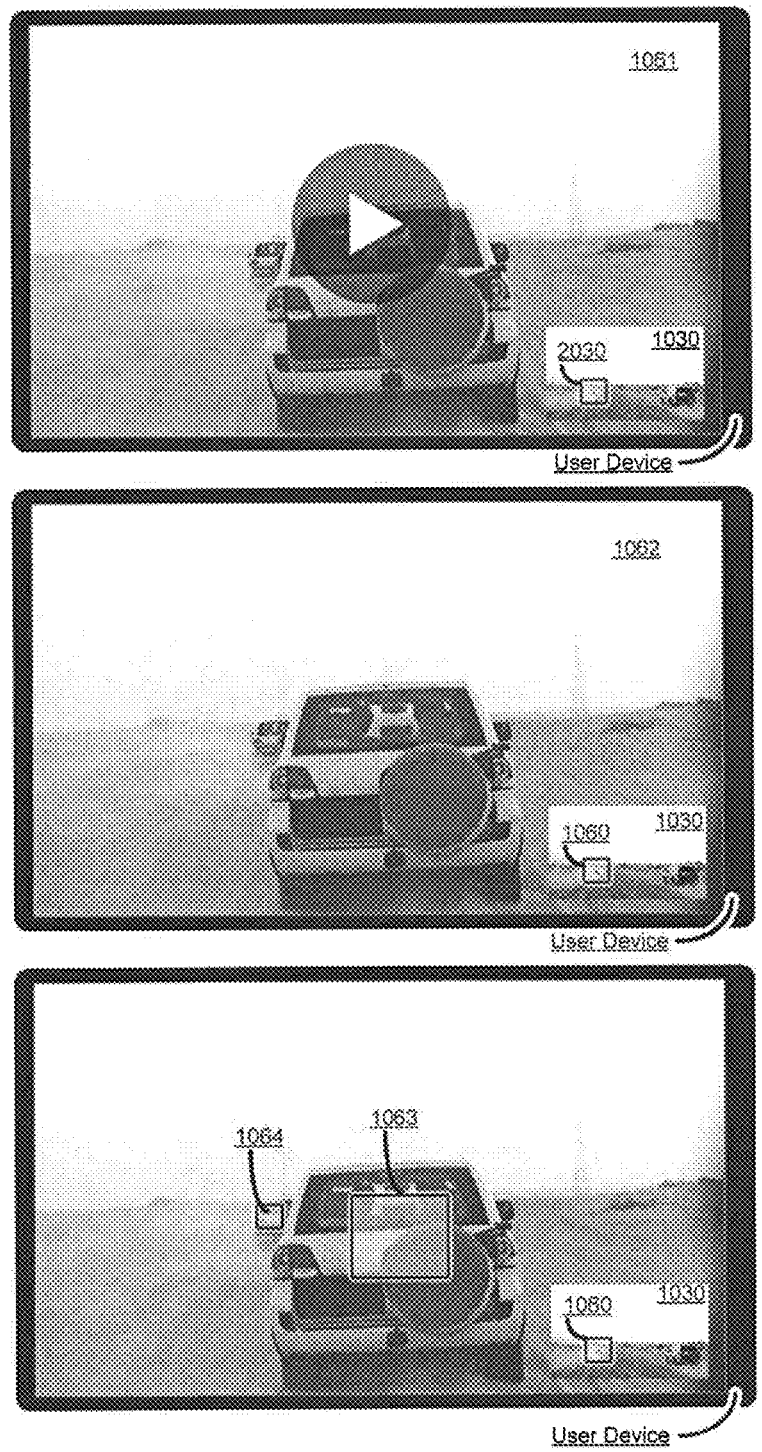

FIG. 10E illustrates how a user in embodiments may view a posts within digital media like video, motion pictures, and clips from another video. For example from a user device video 1030 an embodiment of a desert safari, posted within the system or embedded from a third-party provider. In some embodiments by selecting region 1060, the original video 1030 is reduced in size and brought to the lower right corner and the new video 1061 from region 1060. Embodiments may also allow for other forms of digital media to be embedded into video like photos 1062 and links that may include embedding other videos. Embodiments allow for regions that contain one or more posts and data. For example from the user device video clip 1061 may have one or more regions, tags, associated and/or identified 1063 and 1064. The system can perform defining/identifying regions automatically or by users.

Figure 10F:
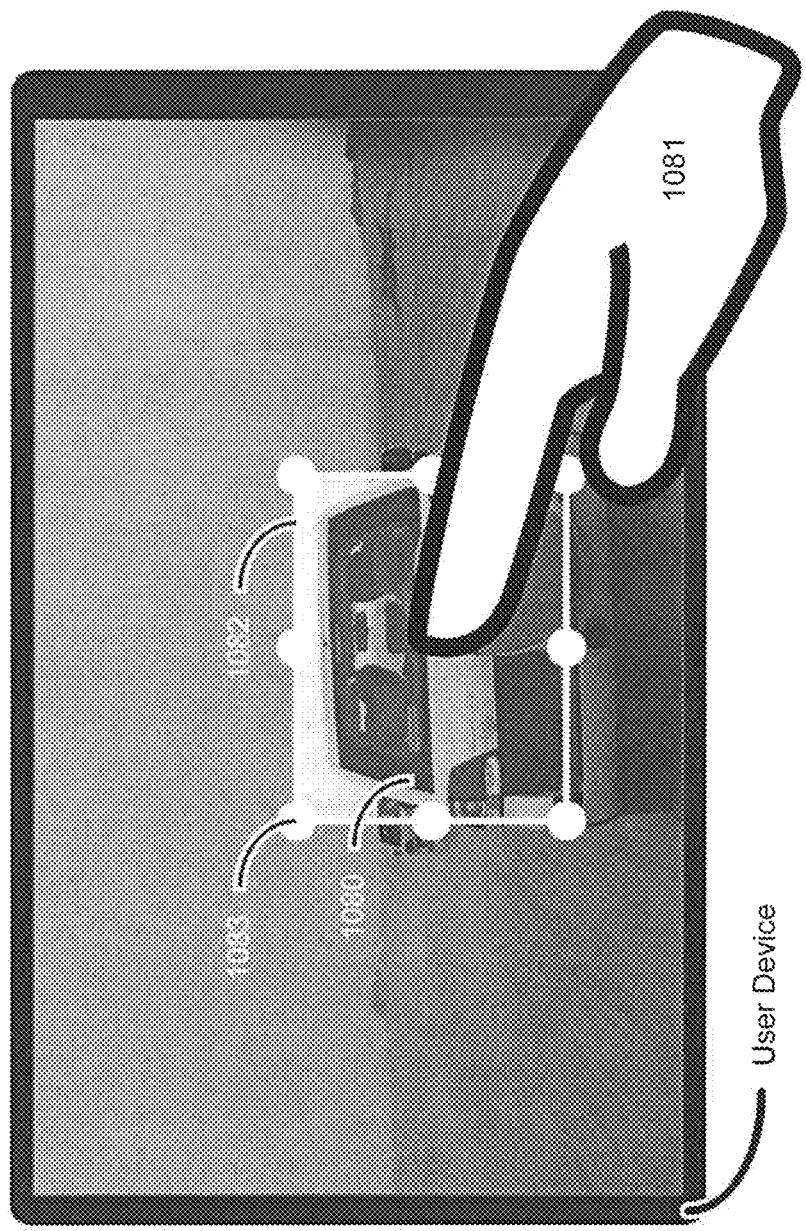
FIG. 10F illustrates how a user in some embodiments can define a region within a video.

FIG. 10F illustrates how a user in some embodiments can define a region within a video, for example a user using a simple gesture like placing a finger 1081 on the user device that is touch sensitive, can identify and follow an object as the video plays, from this user created input the system can recognize the point and or points and frames of video (start and end) including any positions defined on the user device. Defining the region is not limited to gesture and may also work the same way with a mouse, clicker, eye tracking, and/or stylus. Using multiple fingers may increase and decrease size of the region and/or zoom. Other user implemented features may also include if a user takes their finger off the screen the play of the video stops or just the defined region or both or a dialogue window may ask if the user is done or something else. The region within the region identified by the user is illustrated 1080 bound by 1082 and may also be defined by points 1083.

Figure 11:
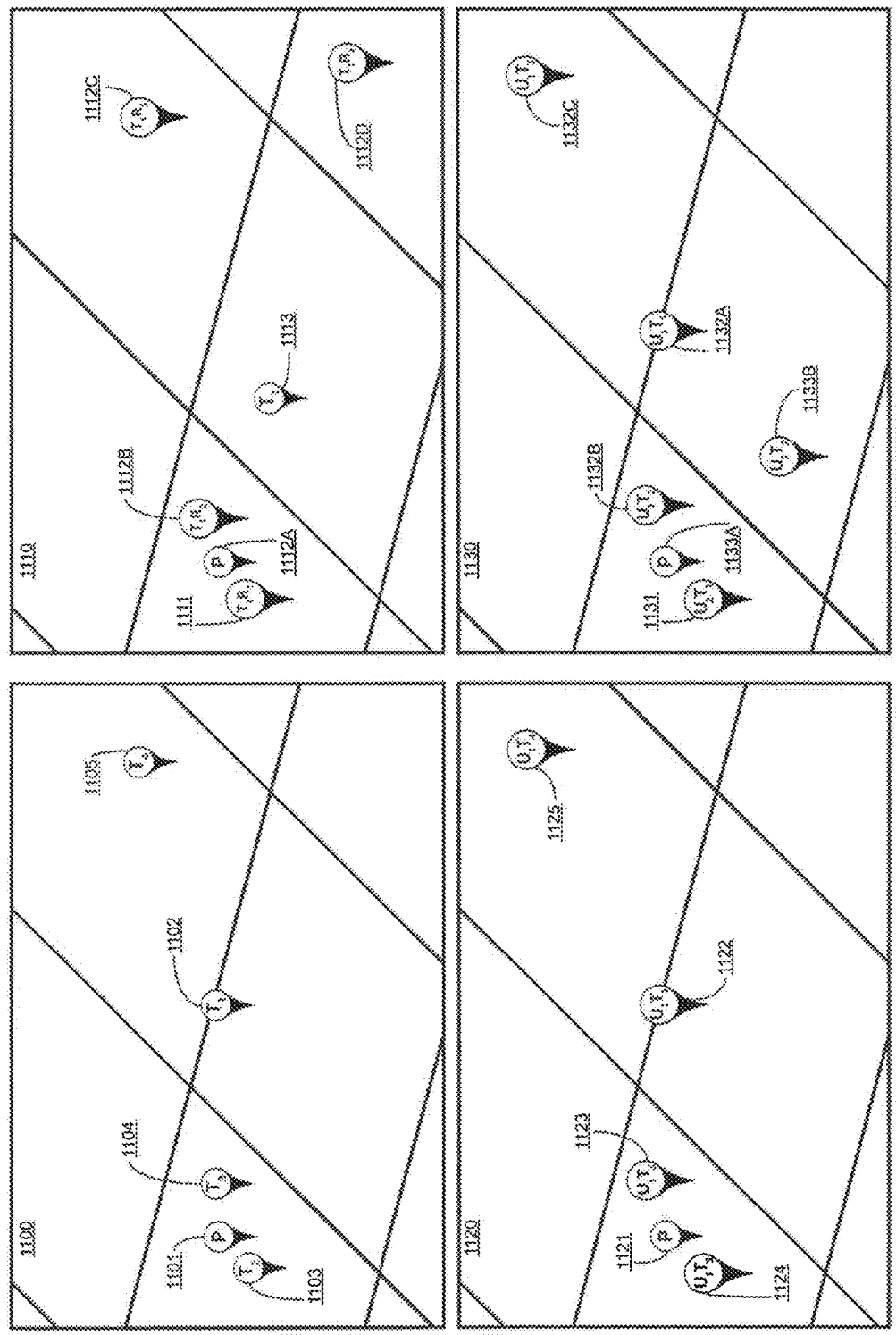
FIG. 11 shows one or more embodiments whereby relating to proximity or location.

FIG. 11 shows one or more embodiments whereby relating to proximity or location. A location can be found anywhere in the world, where in one example a post with coupled one or more tags illustrated where the tag was made. In some embodiments, the tag or post has content that relates to a location or an embodiment like an image where the images was taken near close to or nearby other posts and tags. The system can also analyze content within posts, tags, users, objects retags whereby scoring and rank each and comparing with other posts, tags, objects, retags and other content/links. Location 1110 illustrates post, tags and retags, where in some embodiments shows that tags and retags include one or more dimensions for ranking and scoring whereby tags that are closer to the couple or other posts may than other tags may be ranked lower or higher based on other objects, post, tags and retags. Example of various dimensions would include number of tags, tags of tags, retags, content, allocation, links, other objects, proximity, time of day etc. Location 1120 shows a post where in one embodiments $user_1$ has multiple tags coupled to a post of a user or same user. The post and tags show higher significant to users feeds and search resulting from the tags that are within various proximity to the coupled post. Other dimensions are also incorporated in the affinity of the tag and post and everything relating to. Location 1130 illustrates how a post can have one or more user's tag where each user can tag the post multiple times. Proximity of the tag and post may be given a value for other users to be served within the system.

One or more interaction by a user with a system may be displayed in a feed for one or more users searching and/or following that user. The system can also build data profiles for every user with or without an account whereby scoring and ranking every interaction with the system.

For example tags posts can have a location where tags and post that do not share or have _id referring to or embedded within any field can be indexed and related to users or other posts. Additionally within a region or location 1100 a post 1101 can have nearby tags 1102, 1103, 1104, 1105 whereby tags in some embodiments may or may not have the post 1101 parent_id in any field. In other embodiments where a region is defined within 1110 in some cases referred to as posts or tags and other cases referred to as posts, tags, and retags. For example Post 1112A can have a $t_1r_2$ ($tag_1$'s $retag_2$) 112B from $tag_1$ 1113, another $tag_1$ with a $retag_3$ 112C and another $tag_1$ with a $retag_4$ (112D) all in the same region or within proximity Additionally embodiments may also include posts, tags, and retags from various users all may or may not include content like images or video whereby examples are show within region 1120 and 1130 for corresponding posts, tags and retags (1121, 1122, 1123, 1124, 1125, 1133A, 1131, 1132, 1133B, 1132A, and 1132C).

Figure 12:
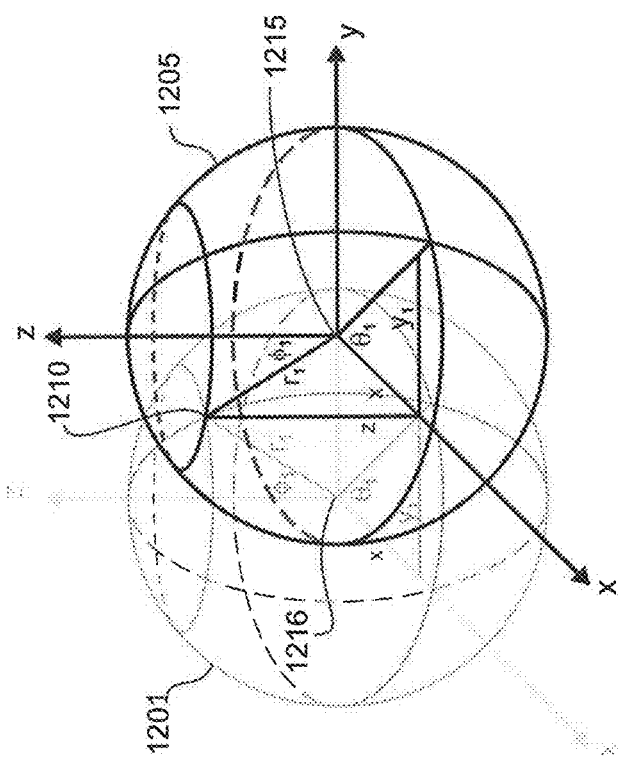
FIG. 12 illustrates a spherical coordinates with a change in vantage point relative to definition of change.

FIG. 12 illustrates a spherical coordinates with a change in vantage point or origin relative to definition of change of the origin from 1215 to origin 1216 of the spherical outliers defines any number of points for the given radius 1201 and 1205. In some embodiments some points may intersect with the same radius 1210 with different origins 1215 and 1216.

Figure 13A:
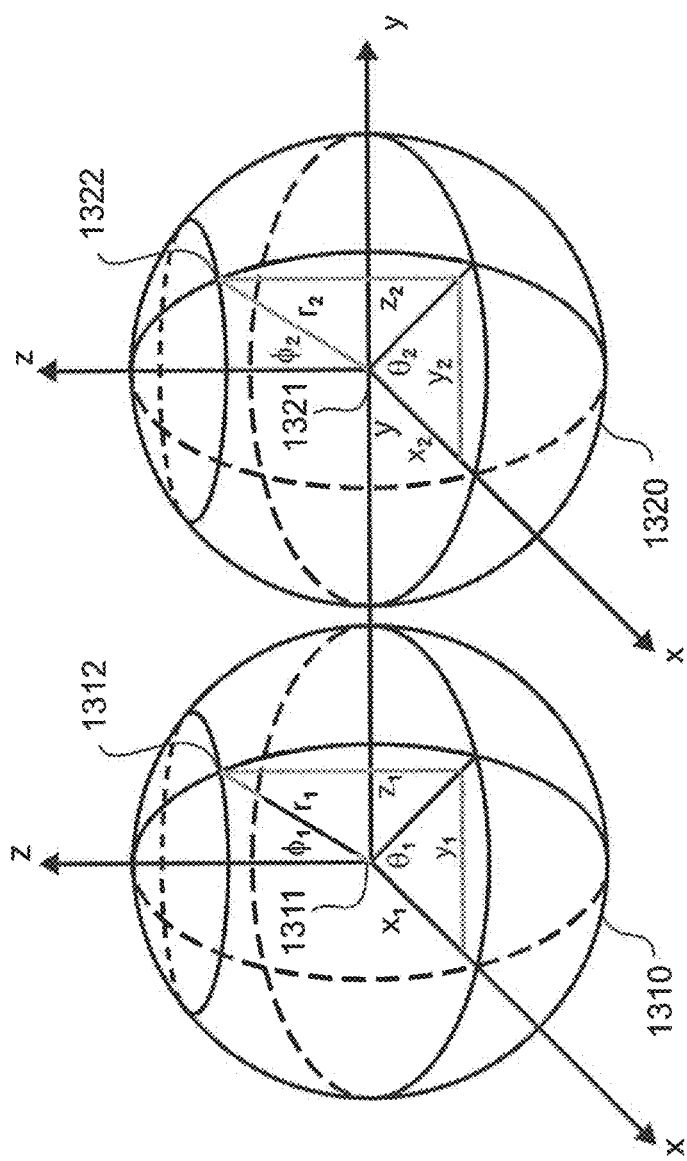
FIG. 13A illustrates a spherical coordinates within digital media or augmented reality with different vantage points.
Figure 13B:
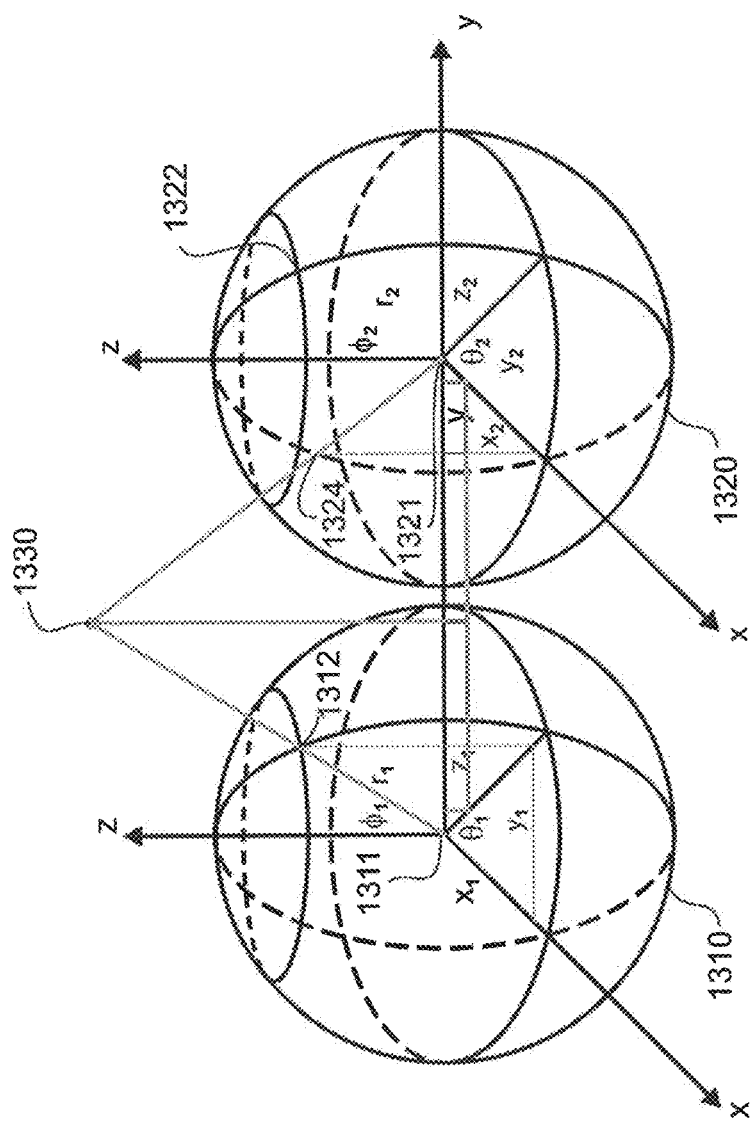
FIG. 13B illustrates a spherical coordinates within digital media or augmented reality with different vantage points and referencing the same point.

FIG. 13A illustrates a spherical coordinates within digital media or augmented reality with different vantage points or origin. In some emblements simulate various examples from similar situations. Where the given FIG. 13A could in some emblements be real-time augmented reality or a prerecorded video or virtual combination of image or videos where the user can navigate. For any example the user can get a viewpoint from two separate vantage points or origins 1311 and 1321. Looking at different points 1312 from origin 1311 and point 1322 from origin 1321. FIG. 13B illustrates a spherical coordinates within digital media or augmented reality with different vantage points or origin and referencing the same point. In some embodiments, more than one user or the same user can see the same point 1330 from two different origins or vantage points 1311 and 1321.

Figure 14A:
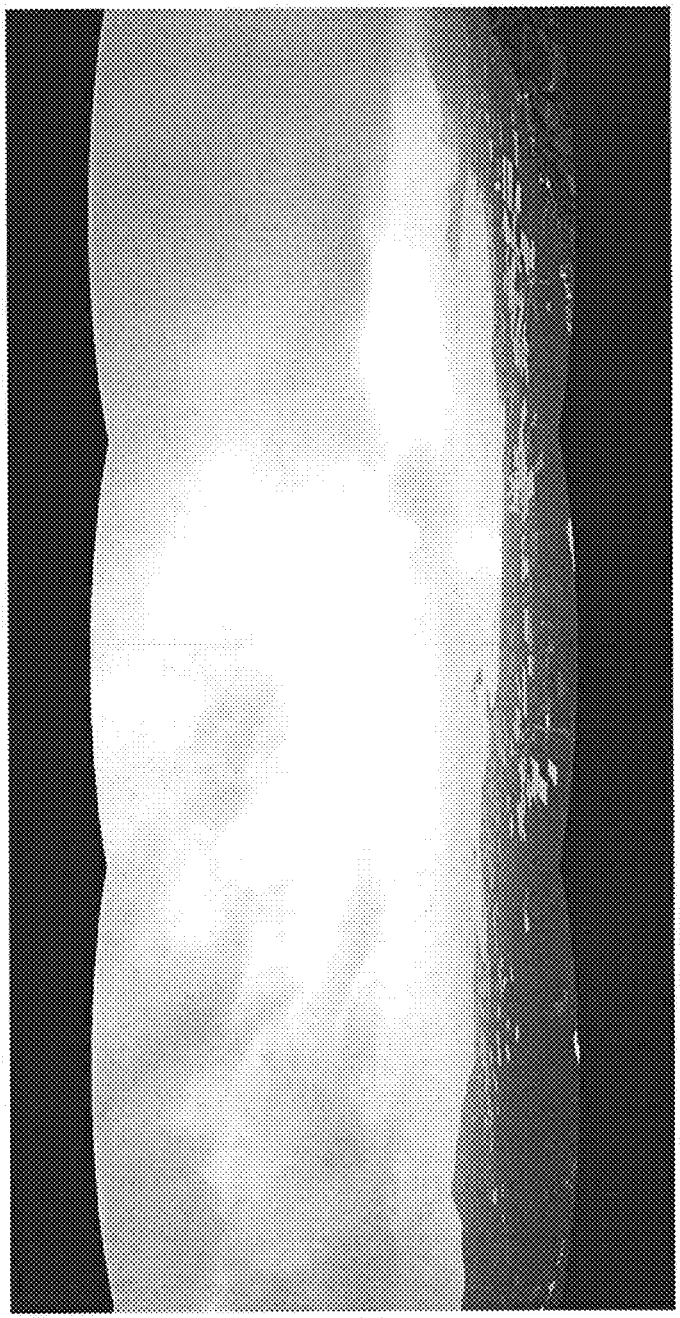
FIG. 14A illustrates the type of media enabling 360 degree video.
Figure 14B:
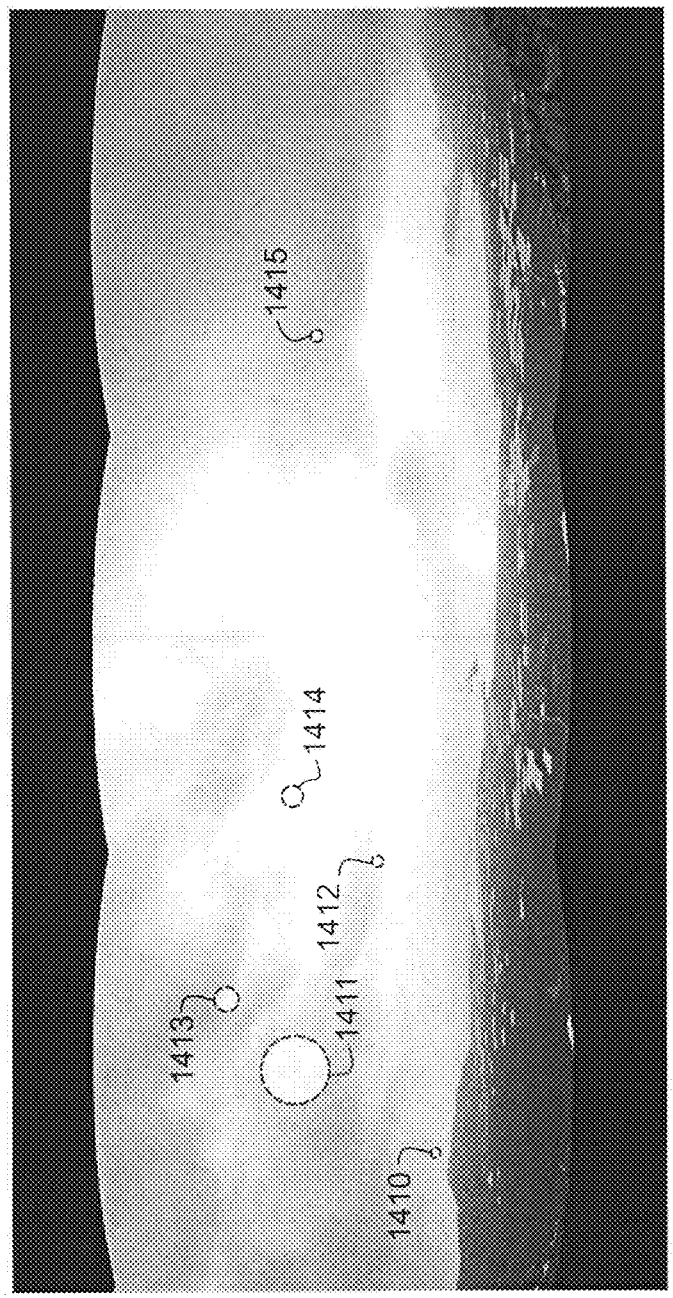
FIG. 14B-FIG. 14C illustrates the type of media enabling 360 degree video with points that remain fixed or change per frame.
Figure 14C:
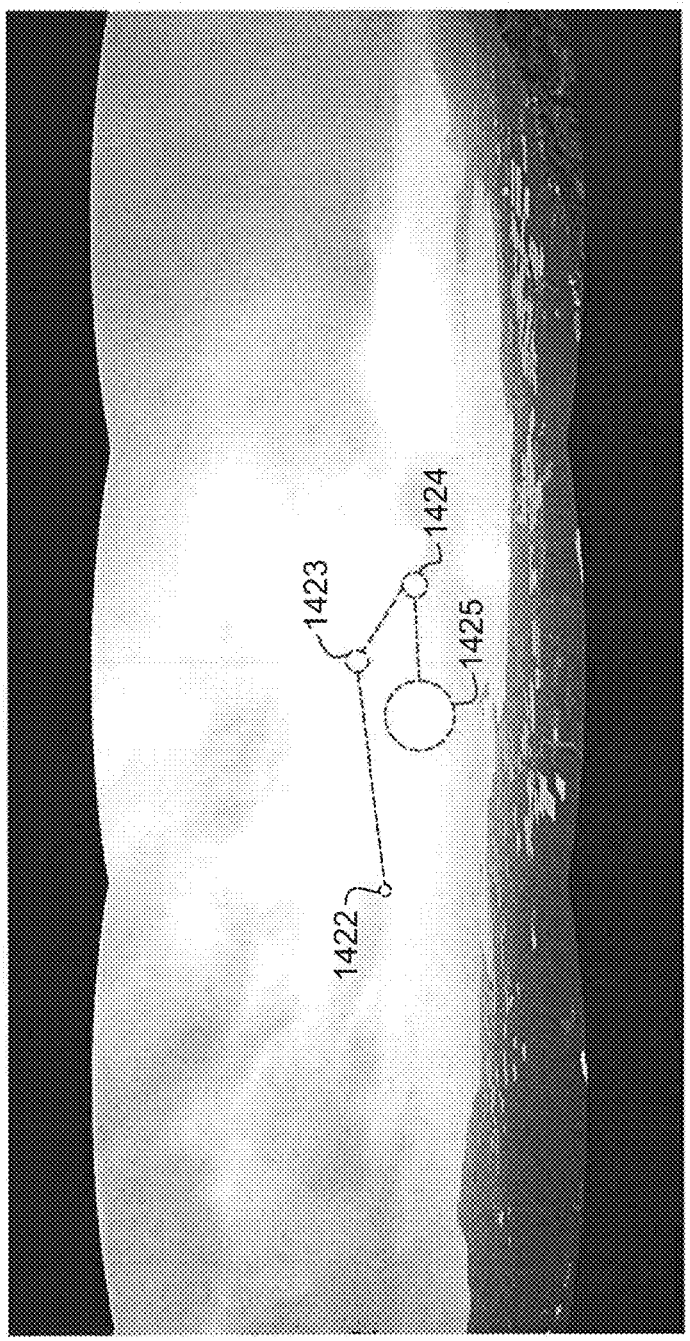

FIG. 14A illustrates the type of media enabling 360 degree video. The type of media in some embodiments referred to a media source from a single origin. Other examples would include multiple videos that would corresponds to movement by a particular user. Another example would include real-time people walking and looking at various places in the real world where the added component would include a geotag. FIG. 14B-FIG. 14C illustrates the type of media enabling 360 degree video with points that remain fixed or change per frame. FIG. 14B defines points at a various distances (1410, 1411, 1412, 1413, 1414, 1415) where 1411 would be a region closer than the farthest region of 1415. FIG. 14C illustrates an embedded post or digital media like video, images or similar where the regions moves from the farthest point to the closest points (1422, 1423, 1424, 1425). As the video is played or if viewed in real-time it will appear that the region starts from the farther position to the closest position.

Video can be streamed and or index to provide various types bandwidth connections for every given user. When combining videos for users a more interactive experience a director or algorithm of the corresponding video and position relative to where the current user is looking. These video indexed could be one or more documents of data to switch to lower quality videos or higher and lower quality videos that are separated or split up.

To further define the scope of the method clustering of embedded digital media or information could be done by Artificial Intelligence of retrieving the cluster of expected points given the allocated distance between points.

Figure 15A:
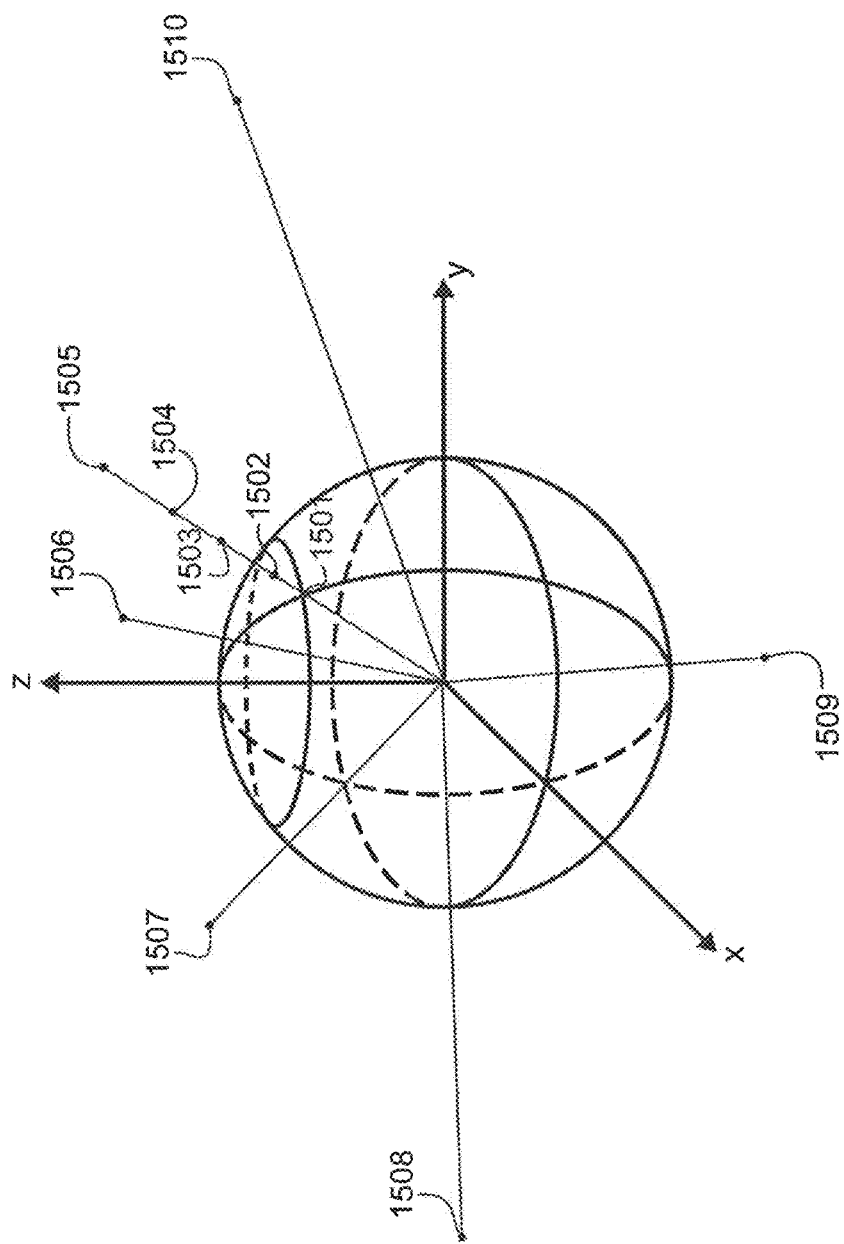
FIG. 15A illustrates a spherical coordinates within digital media or augmented reality from a vantage point and other various points.
Figure 15B:
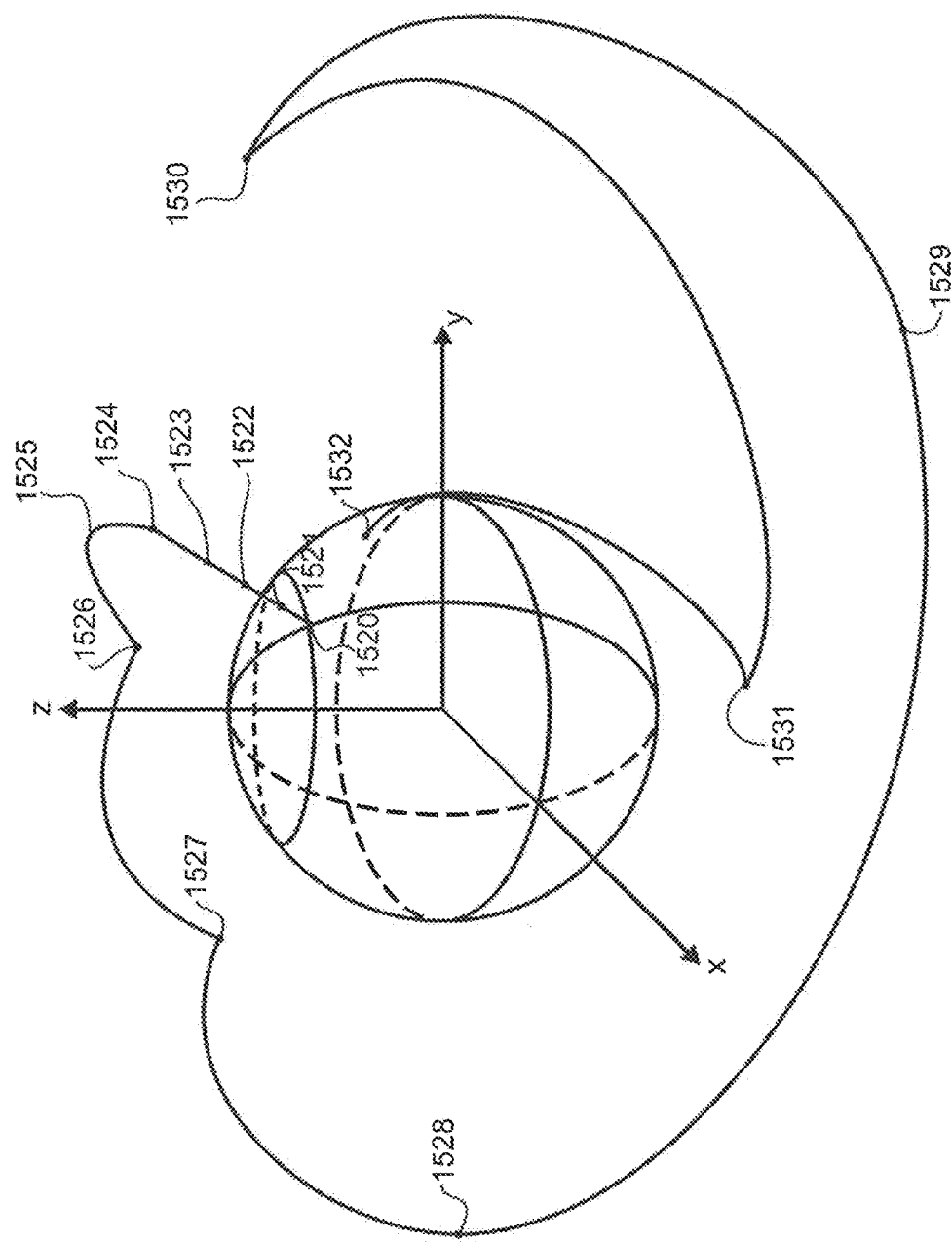
FIG. 15B illustrates a spherical coordinates within digital media or augmented reality from a vantage point view a point change position with change in time.

FIG. 15A illustrates a spherical coordinates within digital media or augmented reality from a vantage point or origin and other various points. In any number of situation ranging from spherical images or video to real-time augment reality FIG. 15A from the same origin describe various points around a single origin (1501, 1502, 1503, 1504, 1505, 1506, 1507, 1508, 1509, 1510). The simple example would cluster some points the around the same origin or multiple origins where in some embodiments the points 1501, 1502, 1503, 1504, 1505 would be clustered together showing the number of embedded objects (five points around the origin). FIG. 15B illustrates a spherical coordinates within digital media or augmented reality from a vantage point or origin view a point change position with change in time. In some embodiment around an item with the single origin that has a starting time and location of 1520 and end-time and location 1532. As the embedded object moves from point to point (1520, 1521, 1522, 1523, 1524, 1525, 1526, 1527, 1528, 1529, 1530, 1531, 1532). The simplification from point to point could include points from points every half a millisecond to millisecond to half a second or seconds or more.

Figure 16A:
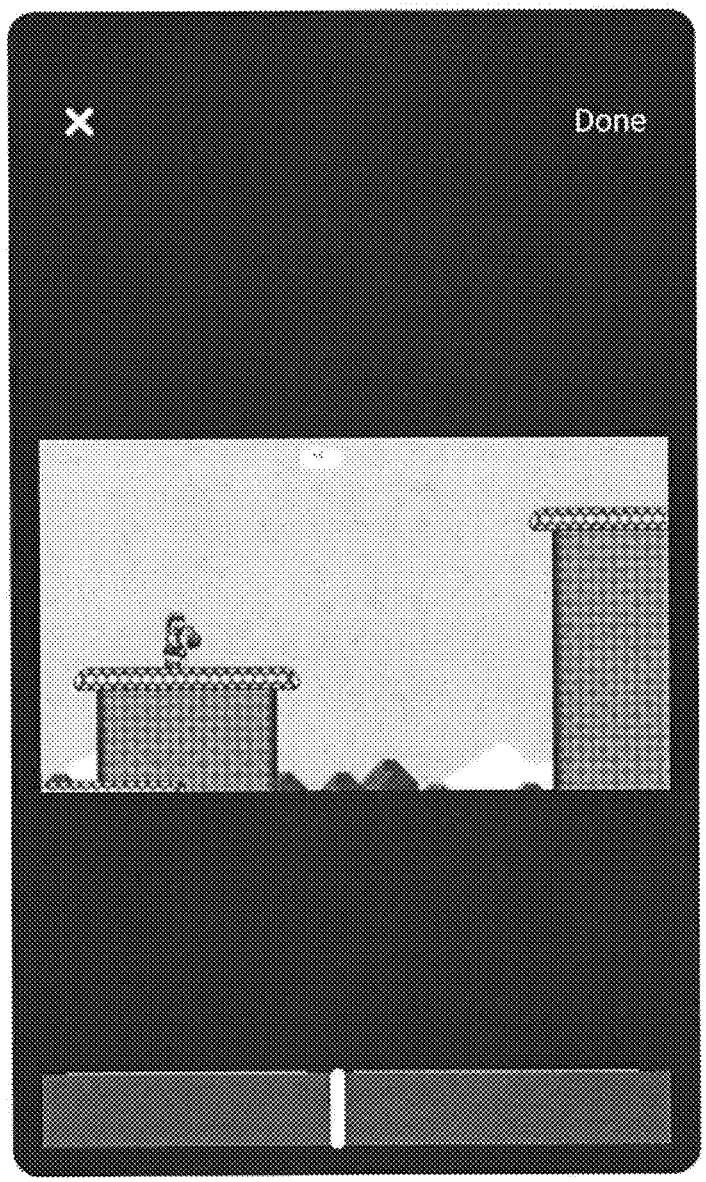
FIG. 16A illustrates digital media or augmented reality where a user in some embodiments can define a region within a video.
Figure 16B:
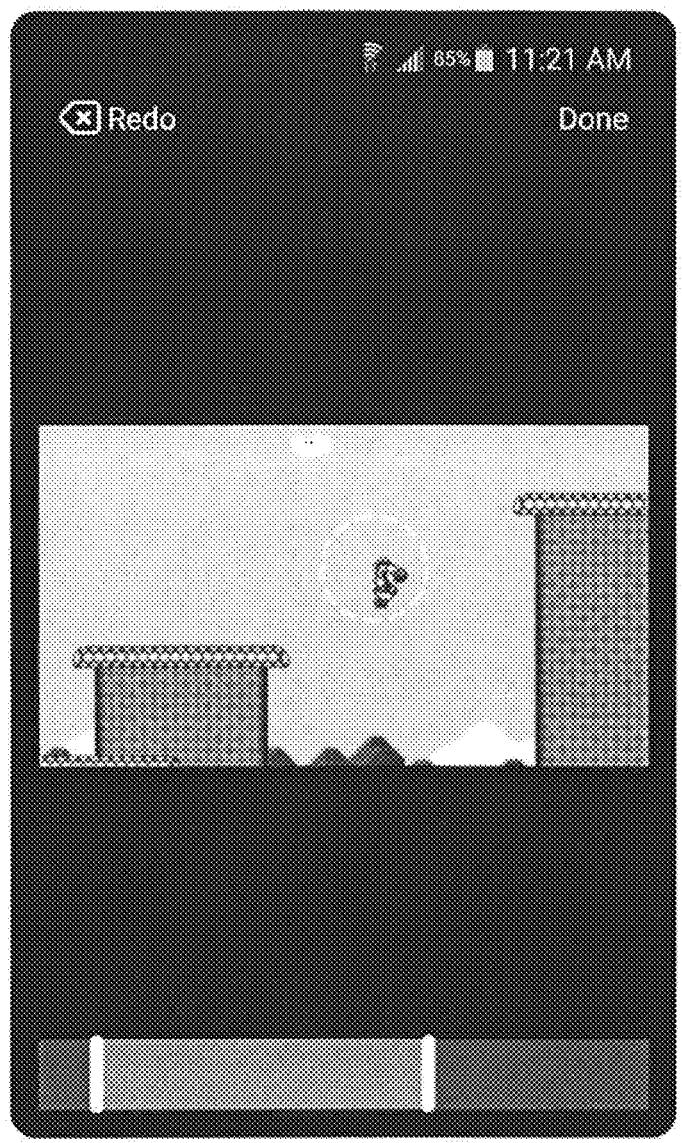
FIG. 16B illustrates in some embodiments digital media that is not in form 3D, 360 degree or augmented reality where a user can define a region within a video.
Figure 16C:
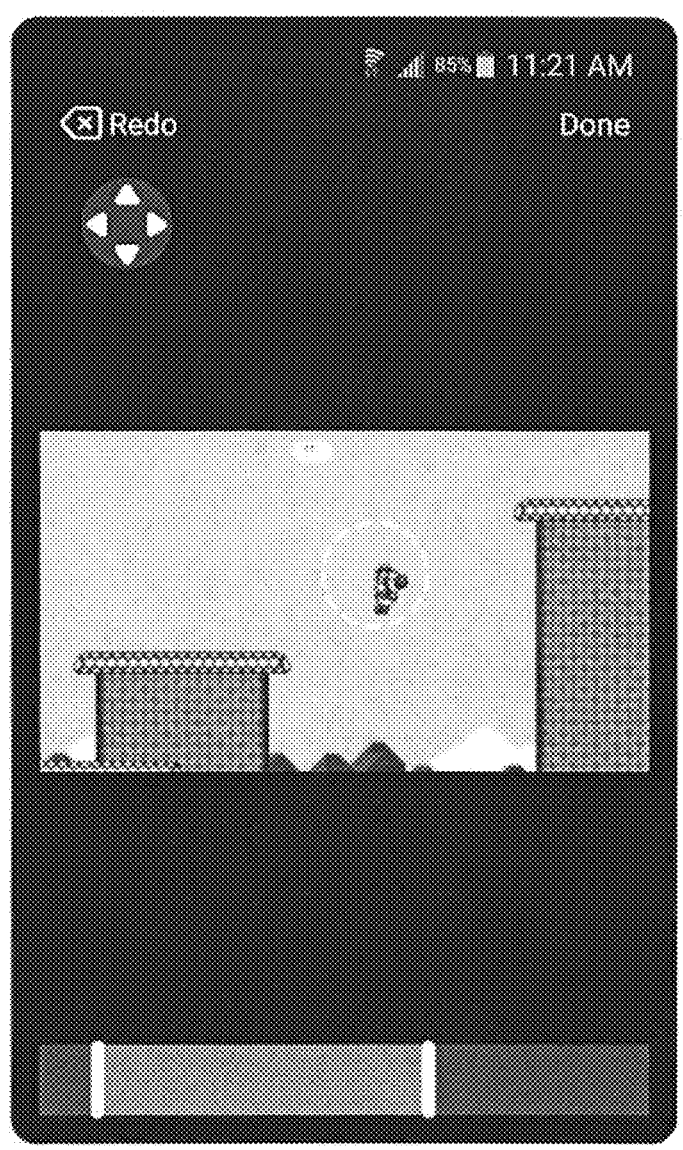
FIG. 16C illustrates in some embodiments digital media that is in form 3D, 360 degree or augmented reality where a user can define a region within a video.

FIG. 16A illustrates digital media or augmented reality where a user in some embodiments can define a region within a video. In some embodiments the interactive experience to embed points within another media object. In some embodiment the user interface may import the amount of time to embed another object and may have a minimum time. FIG. 16B illustrates in some embodiments digital media that is not in form 3D, 360 degree or augmented reality where a user can define a region within a video. In this illustration the user follows Mario. This part of the video is only part of the original but the user can add more videos or ways to get around this challenge FIG. 16C illustrates in some embodiments digital media that is in form 3D, 360 degree or augmented reality where a user can define a region within a video. Where in some embodiments the user can perform a similar action but the user can continuously make points in a full circle or 180 degrees. In some embodiments the distance can be set by pressure on a stylist or users finger to the screen. Also a user may be actually moving and tagging in a virtual environment.

In some embodiments the arrows can be operated by touch or a mouse or by the user actually looking in the opposite direction. The process of embedding objects may reflect associations with just a timing component.

Posts, tags, retags, and tags of tags relating to one or more objects. In one embodiment a brand or manufacture may have one or more products where each product has one or more variation. For example an example of a brand would be a clothing brand inc, where the $product_1$ could be $style_1$ (shoes) and $product_2$ could be $style_2$ (football shoes). The variation for $product_1$ could be $style_1$ (shoes) color, style, gender etc. additionally stores, businesses (physical or ecommerce) can sell any product and/or including various Brands/manufactures products. Inventory and SKU may reference one or more products. The system may have one or more Post, tags, retags, tags, of tags, and objects relating or pointing to a brand manufacture, product and/or variation. In one embodiment a user could be tagging a review, a story or more images about a variation of a product from a manufacture. Embodiment that includes posts the point to brand/manufacture where the same brand/manufacture has a $product_1$ that the post also points to. Additionally post also post to $product_{2A}$ of the brand/manufacture. In the same embodiment retags can point to variations as a whole and tags and retags can point to one or more products for example like Tag pointing to $product_1$ B and $product_{2C}$. Also tags may be used to help with inventory in stores or confirm inventory of one or more products where users or even employees of the store can report and confirm with one or more user looking for a certain product. Much like tags they post within a system, simply acts differently depending on a user's input and response. For example, images, links, videos, text, shared, documents, other content and data that a system can recognize while also not limited by or through an API, apps, EXIF data, metadata, meta elements, meta tags, and/or objects. Additionally post can be created from any part of another post, for example from digital media (videos, images, audio), links, files, and documents. Posts can also refer to products, brands, manufactures, and variations. One or more posts can be coupled together additionally Posts are coupled to one or more and Post.

A user querying the system for results. The user may be presented with one or more Images, Links, Data, Objects, Users, Events, News, Locations, Proximity, suggestions and information whereby including of results can comprise of Posts, Tags, and Retags. Additionally embodiments of the system performing queries from a user whereby the results may be displayed in various user interfaces to include images, links data, objects, users, events, news, locations, proximity, suggestions, and information that may take the form of posts, tags and retags. Additionally in some embodiments posts, Tags and retags may be referred to be similar and/or equal to one or more posts within a system.

Advertisements coinciding with posts, objects, tags, apps, and other user actions. For example, user couples to Posts and in other embodiments a user are coupled to and posts coupled to tags and Ads. User is coupled to Posts, Tags and Ads. Other embodiments, users are coupled to objects wherein objects are coupled to one or more tags and ads.

Additionally embodiments may illustrate methods for creating posts within digital media that may act as advertisements. Refining the digital media or posts can also save progress, help and go forward with progress. For example a user can search for digital media and content to tag where one or more advertisements may or may not be shown to a user. Advertisements within digital media and content can have advertisements with one or more digital media, content, text, payment, and strategy. A user can upload one or more photos. Searched photos can be found through the web. One or more regions of digital media within posts. In some embodiments corresponding regions within digital media may have one or more associations identified and complementing keywords.

User's posting information may be included at the top of the user device, where one or more regions like regions and associates with the exhaust and/or performance of the vehicle may have one or more additional posts like various models. For example, the exhaust audio clip of two versions of the vehicle, the lower performance model and the more expensive model. Other examples may include additional digital media like images and further descriptions and or options. The layout for each region may be similar to current printed brochures or catalogue provided by the manufacture. Additional embodiments may also include video of the vehicle and general information of the vehicle like MSRP, Miles per Gallon, horse power, links, and ability to download or share the brochure or listing, more photos, more tags identified within the system that may or may not show an association of the originating post. Regions identified in some embodiments will show information provided by users and various information and data that the system find, relates and associates with the post. For example if a person is looking at a model of a car the system can recognize additional information as well as relating information, advertising, similar associations, and various posts. Presented information may also be relating to one or more third-party providers, third-party platforms, developers, local listings, ecommerce, API, or any system aiding or connected to the system of the disclosed invention. An API can be a pass-through, whereby a single API method to funnel request to a particular backend service. Any API can specifying responses based on an HTTP request, or a URI requesting content. API is most commonly known as an architecture that makes it easy for one application and incorporate capabilities or data from another application. API's simplify entry points to application logic and data, while also adding to or digesting APIs enable developers to easily access and reuse application logic built by other developers. In some embodiments Web APIs provide almost the same capabilities over a network whereby exposing them directly, while adding a management and visibility layer.

API makes it easier for users to have open access to their data. We created it so that you can surface the amazing content Instagram users share every second, in fun and innovative ways.

In some embodiments API's may follow principles of RESTful whereby enabling a user or combination of users and applications to call HTTP GET, POST, PUT, and DELETE methods regarding APIs. In some embodiments GET would retrieve a list of resources or the profile of a specific resource. POST would create a resource, or passed in a parameter, performed an action on resource. In some embodiments, OAuth access tokens or other tokens, use the POST method along with the parameter. Additionally embodiments may use to PUT to update existing resource and DELETE which deletes an existing resource. In some embodiments the system when incorporating API or technology similar to an API may require the use of a client_id. A client_id serves as a simple to associate you with a server, script, or program with a specific application. However, some requests require authentication or requests made on behalf of a user. Authenticated requests require an access-_token. These tokens are unique to a user and should be stored securely. Access tokens may expire at any time in the future. The system could embody a dynamic API or operations where GET retrieves a list of resources, POST creates and new or deletes a resource, PUT modifies and existing resource, and DEL removes specific resources. The user may ask for information in JSON or XML or any other compatible format. When requesting in some embodiments a user may ask for partial resources (field=a,b,c,d(m,n)) or other parts like statistics, advertisements, suggestions, etc. additional embodiments may include temporary post(s) created with a sequence of frames comprising of one or more advertisements, documents, digital images, digital video, sounds, digital albums, graphics, augmented representation, links, events, articles, apps, text while also containing one, a plurality and/or combination of data, metadata, metatags, EXIF data, keyword tags, hashtags, comments, favorites, text, links, location, entities, objects, entries, places, and users. The system may also create these in temporary post in runtime based on the user or one more user's interests, habits, active participation, ownership, individual, keywords, posts and/or any interaction with the system or other systems where data is available on said user or users.

Embodiments allow users to specify a plethora of access and requests from the user. Within a given system all apps have basic read access by default. Other embodiments extend access such as liking or favoring, commenting, or relationships, users specify based on the use or need of the basic to read any and all data related to a user (e.g. following/followed-by lists, photos, etc.) where in some embodiments basic needs refers to an API and whereby some include default settings. Other features of the API may include comments (create or delete comments), relationships (follow and unfollow users), favor/likes (like and unlike items) while also embodying other functionality that incorporates features similar to creating, posting, publishing, read, get, update, tagging place, tagging users, tagging posts, tagging objects, add/cite objects, add/cite users, add/cite page, adding content to posts, content tokens, app tokens.

The system incorporates various types of data like an image (just one type of digital media) and a user interface like page viewer, action bar and other information like user profile image, username, location, link, crawled information favorites, shares, comments and relating button. The related buttons brings up association related to digital media. The system can relate data and information between digital media and posts through various methods. For example the system can match pixels and colors, bring up the highest ranked digital media or posts, by one or more links or urls, metadata, objects, posts, tags, retags, followers, followers users or by other methods like explained in and between one or more user and relationships. In some embodiments, methods may include using proximity like in, or objects, or products like in. Additionally examples may be taken from a variety disclosed in this invention.

The disclosed invention, while providing a detailed description of the inventions when referencing buttons, buttons with features, implementers, actions, features, implement/features, categories, and sub categories could fall under the same understanding and could be cross compatible with the ways to present with windows, buttons, buttons within buttons, buttons within windows that may be selected to simplify and streamline how information is presented to user(s). Variations of button and/or features could be referred to as multimedia buttons, page slides or widgets where all or most variations are to be executed by an end user. Additionally features and expanding of features from categories to sub-categories could be related on how information is related and presented to the user. In most of the said invention, digital media could come from one or more search results, users, social networks, or databases. Additionally a user or someone who uses or interacts with the said invention could be identified or referred to as a requestor.

Features with buttons may sometimes show with different symbols that may resemble a phone, envelope, heart, star, magnifying glass, tag, user, food, fork, knife, building, city, home, etc. are not meant to limit the scope of the invention. Where symbols and meaning can be changed, or not exist where the equivalent function will still remain. A user may search for keywords along with the digital media, where the photo and keywords are complements to one another and provides additional context to users search query. While also providing additional information and explanation of certain features and action does not limit the ability of various implement/features, features and expanding of features, buttons, etc. from performing or for methods further explained for one button does not limit the function or ability of another button. Buttons and features with buttons vary depending on situations and/or associations. Figures are meant to show examples of various embodiments, while also flow chart illustrations, screenshots, block diagrams, diagrams while also include coupled, links, and paths may include additional or fewer actions and procedures.

Further defining a system local data can be presented to a user for the best results and some of the best deals. For example proximity or near me illustrates a venue to park, steak house, tours, parking deal, show more and something else as well as search options a user can interact with any of these provide by the system, developers, advertisers, third party providers and or third party platforms. Other information and data could be presented to a user like rating, deals, live coupon with and without time restriction, in store coupon, other tags, images, other posts etc.

Post and or digital media may be presented to a user or viewed by a user through a user device. Other information or regions identified or asked question but user or advertisers, or through an API may also include user who created post, or digital media title date, links to questions (that have answers), other posts with or without and or combination of or without digital media, content and/or text, and other deals (i.e. like travel, flights, food, activities etc.). In some cases an active window or menu with options leading to enabling users to perform certain function and/or tasks. The user may have the ability to implement features relating to calling, messaging, Social, Social web, direction, search, of one or more people, places, businesses, objects, landmarks. In some embodiment features presented to the user are more convenient to the user than other features that are based off user configuration and setting, as well as user tendencies. The directions active window could have the name of the association with other information while allowing the user to select a map service location (Bing maps, Google maps, apple maps, Nokia maps), while additional service could be presented, like profile, settings or have the ability to search. After setting a preferred method of directions, the use could be presented with driving, walking, bus routes, time, distances, running times etc. In some embodiments using information on where a user is going could also allow for other forms of advertising like using digital billboards to show an advertisement related to one or more users passing by said billboard.

The said advertising platform may act as a combination or used separately that would include interface, advertising sales, advertising serving platform, and marketplace platform. In some embodiments, the said advertising platform may use demographic profiling, location/proximity profiling, micro targeting, themed advertising, including advertising tracking (and response) whereby information is collected on actions, locate, glance, clicks, or codes. The advertising platform may include may include various specific methods for a computer operating system or by one or more application programs whereby an advertiser or programmer writing applications programs could make requests of the advertising platform (operating systems) or one or more other application. Cookies (session, persistent, tracking, etc.) may aid the said advertising platform to serve the best advertisements for users/requestors and advertisers. Other types of advertisers may include (but not limiting to) print advertising (newspapers, magazines, brochures, fliers), Digital printer advertising (Digital newspaper, digital magazines, digital brochure, digital fliers) outdoor advertising (digital billboards, billboards, kiosks, trade shows, digital trade shows, events), broadcast advertising (TV, Radio, Internet), convert advertising, superstitial advertising, mobile advertising, interstitial advertising, and map advertising. Also included are various formats of text, display pop-up, flash, video, email, onsite-sponsorship. Some basic targeting methods include contextual targeting, behavioral targeting, geo-targeting, proximity targeting, and local advertisings. Similar examples include where an advertiser (including consumer, businesses anyone who has an intent to create an advertisements.) In some embodiments the advertiser is presented with one or more windows that may guide the advertiser to customize and deliver advertisements.

In some embodiments window where an advertiser may make from a selection of buttons. In some embodiments the advertiser will be asked, "I need to create an advertisement" or "I have an advertisement ready to use" between these two question the said invention will be able to determine a plurality of data from the advertiser. Some data would include that the "I need to create an advertisement" the said invention may need to take additional steps to complete guide an advertiser through the completion of creating an advertising campaign. Whereas "I have an advertisement ready to use" is probably not the first time the advertiser has used the said invention and/or has experience creating the advertisements. Regardless of experience there may not be an exclusion of services from the novice to the experienced advertiser. Additional services and or features may be made available to one advertiser and not available to other. For example differences of features may be the result of a fee based system, high value client, and or long term repeat customers. The window may also include a title describing the window, more options that could include a more technical approach to creating advertisements, and/or a button that would advance the advertiser to the subsequent window.

Similar examples illustrate where and advertiser may make from a selection of buttons. In some embodiments the advertiser will be asked the criteria that narrows the scope on the type of advertisements needed by the advertisers, for example determining whether the item to be advertised is one or more product, brand, local business or place, website, company, organization and/or cause, multimedia (music video, photos, etc.) and event (other options may be include). Advertisers may also search for possible additional criteria that may narrow the scope of the advertisement. The window may also include a title describing the window, more options that could include a more technical approach to creating advertisements, and/or a button that would advance (next or skip) the advertiser to the subsequent window. In some embodiments the advertiser will be asked about general information that may include Campaign name and description of the campaign The window may also include a title describing the window, more options that could include a more technical approach to creating advertisements, help, and/or a button that would advance (next or skip) the advertiser to the subsequent window.

In some embodiments the advertiser may be asked to associate images and association within images that may aid in reaching target users farther and faster. The said invention allows for advertisers to find and or upload one or more photos that may broaden reach but refine advertising campaign, while also allowing for people to search faster. For example the image can be auto associated and or manually associated with one or more associations (while also including compliment date that may include keywords links, hastags, urls, etc.). Whereby each association can be further defined with keywords, links, urls, tags, storefront, etc. The window may also include a title describing the window, more options that could include a more technical approach to creating advertisements, help, immediate response for help, and/or a button that would advance (next or skip) the advertiser to the subsequent window. A practical understanding (example) would be like. In some embodiments the advertiser may be asked to enter information that will define the scope of the advertising campaign (advertising in context). Whereby the presented window includes various categories and subcategories that establish a more refined and deeper understanding, for example digital media map, interests, habits, active participation, ownership, individual, keywords. Most windows will contain an area selected category. Although most defining information is option, filling in any additional information may or may not greatly impact advertising campaign and or said invention. In some embodiments including a way to associate advertising to photos taken or relating to various regions around the world. The presented digital media map would be interactive and could zoom in/out, pan to various selectable region as well as identifier areas of interest along with defining a uniform and/or like uniformed area around the identifier). For example identifier is place in between The United States of America and Canada (advertising many mountain and ski towns and mountains) showing a radius of 200 miles. Another example may include an advertiser defined region where a defining area that is not uniform using the identifier (sharing a boarder of Canada and the United States of America near the American Midwest) where the defined area is 355 miles. Other defining criteria for regions of where photos are from may include whole regions/countries, also including other data that a photo would be used to define a photo taken in a certain region. Not excluding and adaptable for photos taken from outer space from this galaxy and others. The window may also include a title describing the window, more options that could include a more technical approach to creating advertisements, help, immediate response for help, and/or a button that would advance (next or skip) the advertiser to the subsequent window.

In some embodiments the advertiser may be asked to enter information about active participation, whereby the advertising would include context of how the advertising campaign is defined. If a user actually does something (a sport like skiing) then the system can actively target to them. The system tries to find out as much as it can about users (target audience) and what users actively participate in. In some embodiments what they want, want to do, and/or are passionate about. This includes hobbies, interests, and other ways users have a repetitive participation in. Additionally an advertiser may be asked target people who own certain product and/or items. Ownership provides an extreme amount of data for advertising campaigns and can identify and establish a link for understanding users and how to target to them. For example owning a Mercedes s550 shows an amount of wealth that advertisers could use to advertise other categories like fashion, electronics, etc. Other embodiments allow the advertiser to be presented with a summery chart or analytics where one or more advertising campaigns are set up. Also presented might be charts, pie graphs, bar graphs that show everything. The said analytics could display information showing how effective the advertisement is by showing potential reach (with resects to budget) and current performance. Some examples include showing on a user device the ability to gain insight and define criteria for advertising campaigns.

In some embodiments the system may round values or a slide show can tag each image. Users may browse content created by other users and filter with limitless possibilities.

Post are created or digital media are shown on, embedded and/or referenced to digital media and/or posts within a system. In some embodiments tags are snapped to the nearest object whereby relating to a position within the digital media that also corresponds to a pixel or group of pixels on a screen. In other words the pixel or group of pixels is the corresponding position.

Within the system regardless of the object tagged provides more valuable information to the tagged object the system allows for users to post on, embed within, reference another new or previously created post or digital media from a post or digital media. New posts can embody one or any combination of text, photos, videos, apps, comments, links, sound, documents, relocation, metadata, third-party content, subscription, and like. Post can also contain no new data except in the context of just identifying a region within digital media, third-party content, locations, etc. or for a feed and sharing to followers.

An example would include sharing something that someone else wrote or posted that was interested (in some embodiments the system defines this as shares within the system whereby may provide a link to the referenced post or digital media). Posts, digital media, content, their party, apps, documents, can be placed or organized into albums or categorized for search. Users within the system can follow favorite, comment and message mostly anything under the umbrella of the system. The system is not classified to one type of interface, for example some deal with buying or selling, others with networking, the disclosed system operates in a different level providing a platform for all types of classifications can run one, furthermore through the system API or portals the community, developers, third-party-partners and like can build and use new and pre-existing system with the disclosed systems. This also includes grouping. The system is assessable to through various types of devices and through applications, networks, web-browsers and third-party providers. For example some embodiments may include relative predictions of embodiments where posts, digital media, documents, shares, or other data and information for one or more users that relate to the viewable post or to the user and the searched content, or to any connects or interactions within the system like favorites or follows whereby the information shown to the user is sourced from any combination of embodiment handled by the system and/or managed by the system, and from third-party providers.

Other embodiments may lead to sorting posts, digital media, documents, or information found within the system, this information can be stored, scored and referred to within the system for one or more users. The system in some embodiments operates passively to maintain, manage, while also collecting information. The system is not defined by who can tag objects or a schema in base more if it is mathematically possible to create. Posts and digital media referring to other posts and digital media can be compiled, organize, grouped and shown to one or more users based on search relevance. In some embodiment tagged photos, posts, or digital media show all or just the most scored information relating to the user. Users will also be able maneuver through the user interface to see others who have tagged or posted to the original whereby creating an interconnected associations throughout the system aiding with multiple levels of functionality and performance.

The disclosure is also not meant to limit video embodiments relating to aspect ratio which describes the proportions, orientations or dimensions of video, screens and/or sequence of images whereby comprising to form a video. Video formats may also include wrappers and codecs where codecs are used inside of a container and because of this video formats can be confusing. Also a user can create tags at a later date.

What is claimed is:

1. A computer implemented method of managing posts for interacting with digital media items, digital media items comprising 3d, 360 degrees, geocoded or spherical digital images and video, comprising:
providing a user application operating on one or more user devices which are operative to view web based digital media items, each of the digital media items comprising a sequence of frames having one or more objects that selectively change position in successive frames in the sequence of frames, the user application for creating posts that refer to one of the one or more objects in select ones of digital media items, the user application defining a select location of the post in each frame of the sequence of frames corresponding to position of the one object, comprising the user and/or the user application identifying the object location in select ones of successive frames in the sequence of frames, and the select location of the post in each frame comprises a select coordinate position;
providing a database system for storing user created posts; and
creating and managing embedded data in user created posts and links to the select location of the post in each frame of the sequence of frames for the one object in select one of digital media items, wherein users interacting with the user application can access user created posts, while viewing the digital media items.

2. The computer implemented method of claim 1, wherein the user defining a select location of the post in each frame comprises tracking the object in successive frames in the sequence of frames.

3. The computer implemented method of claim 1, wherein the select coordinate position changes during the sequence of frames.

4. The computer implemented method of claim 1, wherein the database system stores a plurality of data items each having associated digital data relating to one or more of user basic information, user favorites, user profile, user relationship, user interest, user preferences, or user social connection.

5. The computer implemented method of claim 1, wherein providing a user application further comprises creating posts that refer to previously created posts that refer to digital media items.

6. The computer implemented method of claim 1, wherein users can share posts, and posts that refer to and/or embedded within another post, with no additional digital media, links, or text.

7. The computer implemented method of claim 1, wherein the user application is used with a user device for accessing one or more posts and/or posts that refer to and/or are embedded within another post.

8. The computer implemented method of claim 7 wherein posts that refer to and/or are embedded within any part of another post contain referencing data.

9. The computer implemented method of claim 1, wherein posts comprise one or more documents, digital images, digital video, sounds, digital albums, graphics, augmented representation, links, events, articles, apps, text while also containing one, a plurality and/or combination of data, metadata, metatags, EXIF data, keyword tags, hashtags, comments, favorites, text, links, location, entities, objects, entries, places, and users.

10. A system of managing posts for interacting with web based digital media items digital media items comprising 3d, 360 degrees, geocoded or spherical digital images and video, comprising:
a user interface application operating on one or more user devices which are operative to view web based digital media items, the digital media items comprising a sequence of frames having one or more objects that selectively change position in successive frames in the sequence of frames, the user interface application creating posts that refer to one of the one or more objects in select ones of digital media items, the user interface application defining a select location of the post in each frame of the sequence of frames corresponding to position of the one object, comprising the user and/or the user application identifying the object location in select ones of successive frames in the sequence of frames, and the select location of the post in each frame comprises a select coordinate position;
a database system for storing user created posts; and
a programmed processing system in operative communication with user devices and the database system for creating and managing embedded data in user created posts and links to the select location of the post in each frame of the sequence of frames for the one object in the select locations in select digital media items, wherein users interacting with the user interface application can access user created posts, while viewing the digital media items.

11. The system of claim 10, wherein the user interface application defining a select location of the post in each frame comprises tracking the object in successive frames in the sequence of frames.

12. The system of claim 10, wherein the select coordinate position changes during the sequence of frames.

13. The system of claim 10, wherein the database system stores a plurality of data items each having associated digital data relating to one or more of user basic information, user favorites, user profile, user relationship, user interest, user preferences, or user social connection.

14. The system of claim 10, wherein the user interface application further comprises creating posts that refer to previously created posts that refer to digital media items.

15. The system of claim 10, wherein users can share posts, and posts that refer to and/or embedded within another post, with no additional digital media, links, or text.

16. The system of claim 10, wherein the user interface application is used with a user device for accessing one or more posts and/or posts that refer to and/or are embedded within another post.

17. The system of claim 16 wherein posts that refer to and/or embedded within any part of another post contain referencing data.

18. The system of claim 10, wherein posts comprise one or more documents, digital images, digital video, sounds, digital albums, graphics, augmented representation, links, events, articles, apps, text while also containing one, a plurality and/or combination of data, metadata, metatags, EXIF data, keyword tags, hashtags, comments, favorites, text, links, location, entities, objects, entries, places, and users.

19. The system of claim 10 wherein the user interface application enables user searches which selectively return results that include one or more sequences of frames of a select digital media item or one or more different digital media items.

20. The system of claim 10, wherein a temporary post is created with a sequence of frames comprising of one or more advertisements, documents, digital images, digital video, sounds, digital albums, graphics, augmented representation, links, events, articles, apps, text while also containing one, a plurality and/or combination of data, metadata, metatags, EXIF data, keyword tags, hashtags, comments, favorites, text, links, location, entities, objects.

* * * * *